US 6,359,846 B1

(12) United States Patent
Shoji et al.

(10) Patent No.: US 6,359,846 B1
(45) Date of Patent: Mar. 19, 2002

(54) RECORDING MEDIUM RECORDING APPARATUS AND RECORDING METHOD

(75) Inventors: Mamoru Shoji, Sakai; Takashi Ishida, Yawata; Atsushi Nakamura, Kadoma; Junichi Minamino, Neyagawa, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/395,218

(22) Filed: Sep. 14, 1999

(30) Foreign Application Priority Data

Sep. 14, 1998 (JP) .......................... 10-259908
Dec. 9, 1998 (JP) .......................... 10-350100

(51) Int. Cl.⁷ .............................................. G11B 7/00
(52) U.S. Cl. ................ 369/47.5; 369/59.11; 369/59.12; 369/275.3
(58) Field of Search .............................. 369/47.5, 59.11, 369/59.12, 47.52, 275.3, 116

(56) References Cited

U.S. PATENT DOCUMENTS

| 5,155,719 A |   | 10/1992 | Masakawa |
| 5,513,165 A |   | 4/1996  | Ide et al. |
| 5,517,481 A | * | 5/1996  | Kobayashi et al. ........... 369/58 |
| 5,590,111 A |   | 12/1996 | Kirino et al. |
| 5,636,194 A |   | 6/1997  | Furumiya et al. |
| 5,642,343 A |   | 6/1997  | Toda et al. |
| 5,701,281 A |   | 12/1997 | Sano |
| 5,732,061 A |   | 3/1998  | Kirino et al. |
| 6,069,857 A |   | 5/2000  | Schell et al. |

FOREIGN PATENT DOCUMENTS

| EP | 107295    | 5/1984  |
| EP | 0442566   | 8/1991  |
| EP | 0477892   | 4/1992  |
| EP | 0552936   | 7/1993  |
| EP | 0725397   | 8/1996  |
| EP | 0749114   | 12/1996 |
| EP | 0751509   | 1/1997  |
| EP | 0797193   | 9/1997  |
| EP | 0813194   | 12/1997 |
| JP | 61-243974 | 10/1986 |
| JP | 5-135363  | 6/1993  |
| JP | 5-290437  | 11/1993 |
| JP | 7-93754   | 4/1995  |
| JP | 08287465  | 11/1996 |
| WO | 97/14143  | 4/1997  |

* cited by examiner

Primary Examiner—Nabil Hindi
(74) Attorney, Agent, or Firm—Wenderoth, Lind & Ponack, L.L.P.

(57) ABSTRACT

Optimum movement of first and last signal pulses based on the data pattern is determined before data recording to record marks in the correct position. A specific pattern signal is read from a disc track and digitized with an appropriate slice level by the digitizing circuit (115). A pulse position offset measuring circuit (120) then measures specific edge intervals in the resulting digital signal. Movement of the first and last pulse by the pulse moving circuit (110) is then set so that the offset between the measured edge interval and a predetermined standard edge interval is ideally zero.

12 Claims, 30 Drawing Sheets

Fig. 5A

First Pulse Movement (TF)

| Preceding Space Signal \ Mark Signal | ≥5T | 4T | 3T |
|---|---|---|---|
| ≥5T | 5S5M | 5S4M | 5S3M |
| 4T | 4S5M | 4S4M | 4S3M |
| 3T | 3S5M | 3S4M | 3S3M |

Last Pulse Movement (TL)

| Following Space Signal \ Mark Signal | ≥5T | 4T | 3T |
|---|---|---|---|
| ≥5T | 5M5S | 4M5S | 3M5S |
| 4T | 5M4S | 4M4S | 3M4S |
| 3T | 5M3S | 4M3S | 3M3S |

Fig. 5B

First Pulse Movement (TF)

| Preceding Space Signal \ Mark Signal | ≥5T | 4T | 3T |
|---|---|---|---|
| ≥5T | 5S5MQ | 5S4MQ | 5S3MQ |
| 4T | 4S5MQ | 4S4MQ | 4S3MQ |
| 3T | 3S5MQ | 3S4MQ | 3S3MQ |

Last Pulse Movement (TL)

| Following Space Signal \ Mark Signal | ≥5T | 4T | 3T |
|---|---|---|---|
| ≥5T | 5M5SQ | 4M5SQ | 3M5SQ |
| 4T | 5M4SQ | 4M4SQ | 3M4SQ |
| 3T | 5M3SQ | 4M3SQ | 3M3SQ |

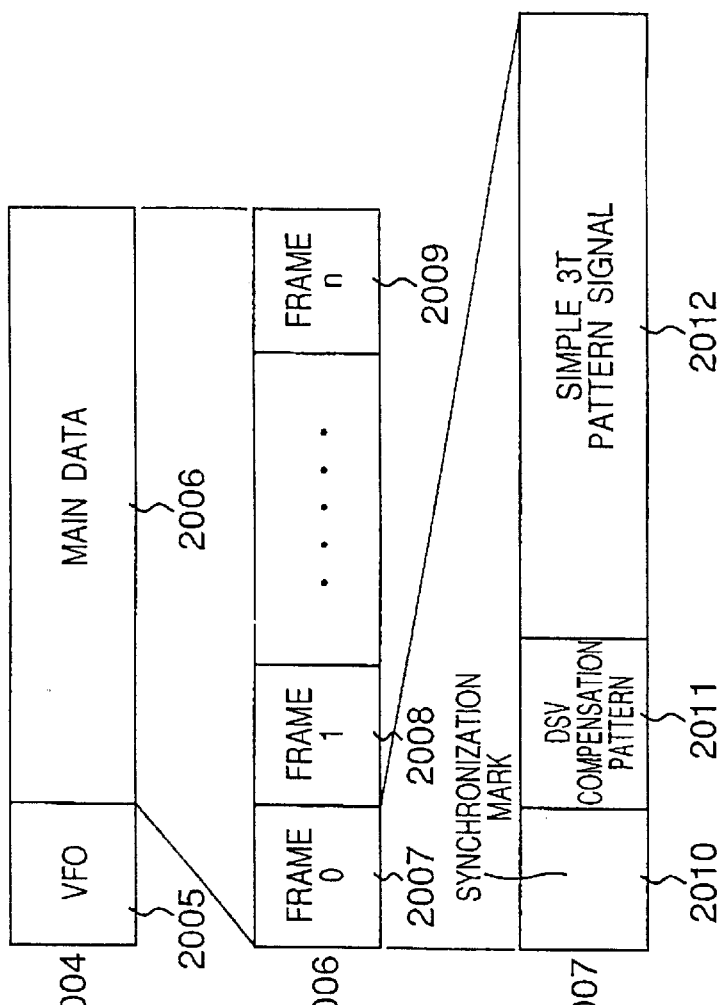
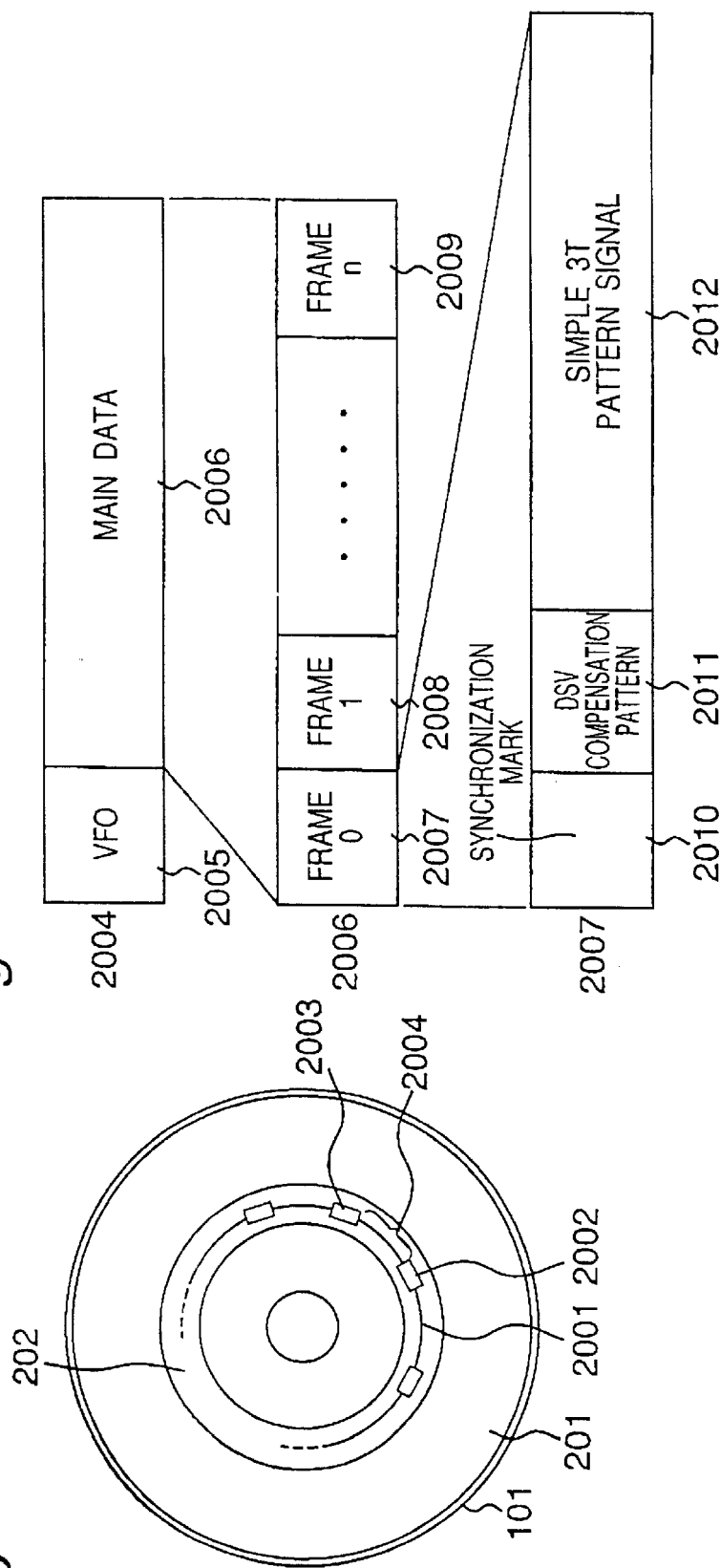
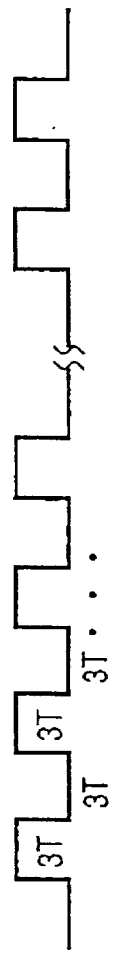

Fig. 34

| | INSIDE CIRCUMFERENCE SIDE | |
|---|---|---|
| PIT AREA | INITIALIZATION ZONE | |
| | CONTROL DATA ZONE | DISC TYPE<br>READ P<br>PULSE ADJUSTMENT METHOD<br>TEMPORARY P INFO (GEN)<br>(PEAK P, BIAS P, MARGIN CONSTANT, ASYMMETRY)<br>OPERATIONAL P INFO (GEN)<br>(PEAK P, BIAS P, MARGIN CONSTANT)<br>ASYMMETRY (GEN)<br>PULSE POSITION INFO (GEN)<br>DISC SPECIFIC INFO |
| | REPEAT THE ABOVE FOR FAIL SAFE | |
| MIRROR AREA | CONNECTION ZONE | |
| RECORDING AREA | GUARD TRACK ZONE 1 | |
| | DISC TEST ZONE 1 | |
| | DRIVE TEST ZONE1 | |
| | RECORDER-SPECIFIC INFO RECORDING ZONE 1 | RECORDER-SPECIFIC INFO 1<br>TEMPORARY P INFO (UNIQUE)<br>(PEAK P, BIAS P, MARGIN CONSTANT, ASYMMETRY)<br>OPERATIONAL P INFO (UNIQUE)<br>(PEAK P, BIAS P, MARGIN CONSTANT)<br>PULSE POSITION INFO (UNIQUE)<br>(ASYMMETRY)<br>P MARGIN INFO |
| | | RECORDER-SPECIFIC INFO 2<br>TEMPORARY P INFO (UNIQUE)<br>(PEAK P, BIAS P, MARGIN CONSTANT, ASYMMETRY)<br>OPERATIONAL P INFO (UNIQUE)<br>(PEAK P, BIAS P, MARGIN CONSTANT)<br>PULSE POSITION INFO (UNIQUE)<br>(ASYMMETRY)<br>P MARGIN INFO |
| | | ⋮ |
| | | RECORDER-SPECIFIC INFO n<br>TEMPORARY P INFO (UNIQUE)<br>(PEAK P, BIAS P, MARGIN CONSTANT, ASYMMETRY)<br>OPERATIONAL P INFO (UNIQUE)<br>(PEAK P, BIAS P, MARGIN CONSTANT)<br>PULSE POSITION INFO (UNIQUE)<br>(ASYMMETRY)<br>P MARGIN INFO |
| | REPEAT THE ABOVE FOR FAIL SAFE | |
| | DISC ERROR MANAGEMENT AREA 1 | |
| | DATA AREA | |

Fig. 35

| | DATA AREA | |
|---|---|---|
| | DISC ERROR MANAGEMENT AREA 2 | |
| | RECORDER-SPECIFIC INFO RECORDING ZONE 2 | RECORDER-SPECIFIC INFO 1<br>TEMPORARY P INFO (UNIQUE)<br>(PEAK P, BIAS P, MARGIN CONSTANT, ASYMMETRY)<br>OPERATIONAL P INFO (UNIQUE)<br>(PEAK P, BIAS P, MARGIN CONSTANT)<br>PULSE POSITION INFO (UNIQUE)<br>(ASYMMETRY)<br>P MARGIN INFO |
| | | RECORDER-SPECIFIC INFO 2<br>TEMPORARY P INFO (UNIQUE)<br>(PEAK P, BIAS P, MARGIN CONSTANT, ASYMMETRY)<br>OPERATIONAL P INFO (UNIQUE)<br>(PEAK P, BIAS P, MARGIN CONSTANT)<br>PULSE POSITION INFO (UNIQUE)<br>(ASYMMETRY)<br>P MARGIN INFO |
| | | ⋮ |
| | | RECORDER-SPECIFIC INFO 3<br>TEMPORARY P INFO (UNIQUE)<br>(PEAK P, BIAS P, MARGIN CONSTANT, ASYMMETRY)<br>OPERATIONAL P INFO (UNIQUE)<br>(PEAK P, BIAS P, MARGIN CONSTANT)<br>PULSE POSITION INFO (UNIQUE)<br>(ASYMMETRY)<br>P MARGIN INFO |
| | REPEAT THE ABOVE FOR FAIL SAFE | |
| | DRRIVE TEST ZONE 2 | |
| | DISC TEST ZONE 2 | |
| | GUARD TRACK ZONE 2 | |

OUTSIDE CIRCUMFERENCE SIDE

REPEAT THE ABOVE FOR FAIL SAFE

Fig. 38

| | DATA | ADJUSTMENT 1ST/LAST | | | | | TEST | RESULT | MEMORY 130 | | | | |
|---|---|---|---|---|---|---|---|---|---|---|---|---|---|
| | | SP | TEMP | OP | ASYM | SP | | | SP | 1ST/LAST | TEMP | OP | ASYM |
| FIG. 2 | 201 | | | | | | 202 | | | | | | |
| FIG.12 | 1202 | 1203 | | | | | 1204 | | △ | | | | |
| FIG.13 | 1302 | | 1303 | | | | | | △ | | | | |
| FIG.14 | 1402 | 1403 | 1404 | | | | | | | | | | |
| FIG.15 | 1502 | | 1503 | △ | | | 1504 | | △ | △ | △ | △ | |
| FIG.16 | 1602 | 1603 | 1604 | △ | △ | | 1605 | | △ | △ | △ | △ | △ |
| FIG.17 | 1702 | | 1703 | △ | △ | △ | 1704 | 1705—△ | | △ | △ | △ | △ |
| FIG.18 | 1802 | 1803 | 1804 | △ | △ | △ | 1805 | 1806—△ | | | | | △ |

[ CONTROL DATA ZONE ]  [ TEST ZONE   DISC-SPECIFIC INFO RECORDING ZONE ]

DATA········· DATA AREA
ADJUSTMENT· AREA FOR RECORDING ADJUSTMENT METHOD WITH EMBOSSED PITS
1ST/LAST······ AREA FOR RECORDING INFO OF MARK START/END POSITIONS WITH EMBOSSED PITS
TEST··········· AREA FOR TEST WRITING FOR OBTAINING INFO OF MARK START/END POSITIONS, OPTIMUM POWER, ETC.
RESULT········ AREA FOR RECORDING THE TEST RESULTS
SP············· INFO SPECIFIC TO THE DISC
TEMP·········· INFO OF TEMPORARY POWER LEVEL INCLUDING PEAK POWER, BIAS POWER, MARGIN CONSTANT,
               AND ASYMMETRY FOR USE IN ADJUSTING 1ST AND LAST PULSE POSITIONS
OP············· INFO OF OPERATIONAL POWER LEVEL INCLUDING PEAK POWER, BIAS POWER AND MARGIN CONSTANT
               FOR USE IN RECORDING DATA IN DATA AREA
ASYM·········· INFO OF ASYMMETRY FOR USE IN DETERMINING THE INITIAL POSITION OF 1ST AND LAST PULSES
△··············· OPTION

RECORDING MEDIUM RECORDING APPARATUS AND RECORDING METHOD

BACKGROUND OF THE INVENTION

1. Field of the Invention

The present invention relates to a data recording medium, a recording apparatus and to a recording method for recording information to this data recording medium.

2. Description of Related Art

Data recording devices for optically recording information, and particularly digital data, to a storage medium are commonly used as a convenient means of mass data storage.

Phase change optical discs are one type of optical data recording medium. To record to a phase change optical disc a semiconductor laser emits an optical beam to a spinning disc to heat and melt a recording film on the disc. The achieved temperature and the cooling process (rate) of the molten film can be regulated by controlling the power of the laser beam, thereby inducing a phase change in the recording film.

When laser power is high, the recording film cools rapidly from a high temperature state and thus becomes amorphous. When a relatively low power laser beam is emitted, the recording film cools gradually from a medium high temperature state, and thus crystallizes. The resulting amorphous parts of the recording film are commonly known as "marks," and the crystallized part between any two marks is known as a "space." Two-value binary information can thus be recorded using these marks and spaces. When a laser beam is emitted at a high power setting to form a mark, the laser is referred to as operating at "peak power." When the laser is emitted at low power to form a space, the laser is said to operate at a "bias power" level.

During data reproduction, a laser beam is emitted at a power level low enough to not induce a phase change, and its reflection is then detected. Reflectivity from an amorphous mark is normally low, and is high from a crystalline space. A read signal can therefore be generated by detecting the difference in light reflected from the marks and spaces.

Data can also be recorded to a phase change disc using a mark position recording method (also known as PPM) or a mark edge recording method (also known as PWM). Mark edge recording normally achieves a higher recording density.

Mark edge recording typically records longer marks than recorded by the mark position recording method. When a laser emits at peak power to a phase change disc, heat accumulation in the recording film results in the mark width increasing radially to the disc towards the end part of the mark. In a direct overwrite recording method this can result inn part of a mark not being overwritten or completely erased, resulting in a significant loss of signal quality due to signal crosstalk between tracks during reproduction.

Recording density can also be increased by shortening the lengths of the recorded marks and spaces, Thermal interference can occur when the spaces, in particular, are shortened beyond a certain point. This thermal interference can result in heat at the trailing edge of a recorded mark travelling through the following space, thus affecting heat distribution at the beginning of the next mark. Heat at the beginning of one recorded mark can also travel back through the preceding space and adversely affect the cooling process of the preceding mark. When such thermal interference occurs with conventional recording methods, the positions of the leading and trailing edges can shift, thus increasing the error rate during data reproduction.

Addressing this problem, Japanese Unexamined Patent Application Publication (kokai) HO7-129959 (U.S. Pat. Nos. 5,490,126 and 5,636,194) teaches a recording method whereby a signal for forming a mark in mark edge recording is analyzed into three parts, a constant width beginning part, a middle part having pulses with a constant period, and a constant width end part, and this signal is then used to drive recording by rapidly switching the output of a two-value laser beam during mark formation.

With this method, the width of the middle part of a long mark is substantially constant and does not spread because laser output is driven with a constant period pulse current producing the minimum power required for mark formation. Jitter at the leading and trailing edges of the mark also does not increase during direct overwrite recording because a constant width laser beam is emitted to the leading and trailing end parts of the mark.

It is also possible to detect whether a mark or spaces before and after a mark is long or short, and change the position at which the leading and trailing parts of a mark are recorded according to the length of the mark and the leading and trailing spaces. This makes it possible to compensate during recording for peak shifts caused by thermal interference.

Japanese Patent Application 5-279513 does not, however, teach a method for determining the optimum positions of the leading and trailing parts of a mark.

If the method of optimizing the leading and trailing edge positions is not defined, the reliability of the optimized recording will be low. Furthermore, even if optimized recording is achieved, it will be at the expense of excessive time spent searching for the optimum position and excessive circuit cost.

A method for changing the leading and trailing edge positions of a mark based on the data being recorded has also been invented as a means of achieving high density data recording. A problem with this method, however, is that the edge of a recorded mark can move due to thermal interference as described above. Such edge movement is also highly dependent upon the disc format and the makeup of the recording film, and if either of these change even slightly, optimized recording cannot be achieved.

With consideration for the above described problems, an object of the present invention is to provide a method and apparatus for easily determining the optimum positions the leading and trailing edges of each mark, thereby achieving optimized recording, even when the disc format, recording film composition, and recording apparatus characteristics vary.

SUMMARY OF THE INVENTION

To achieve these objects, according to the first aspect of the invention, a data recording medium having a plurality of concentric or spiral tracks for recording information represented as marks and spaces between the marks, the marks being formed by emitting to a track recording surface an optical beam modulated by a plurality of drive pulses where the drive pulse count is adjusted according to a length of a mark part in the original signal to be recorded to the track, said data recording medium comprises:

a data recording area for recording data, and a specific information recording area for recording when the data recording medium is loaded into a particular recording device device-specific information specific to the particular recording device, and at least one of a specific first pulse position Tu and a specific last pulse position Td of a drive pulse sequence required by the particular recording device to record said marks to the data recording medium.

According to the second aspect of the invention, in the data recording medium as set forth in the first aspect, the device-specific information includes at least one of the following: a name of the particular recording device manufacturer, a product number, a location where the particular recording device was produced, and a production data.

According to the third aspect of the invention, in the data recording medium as set forth in the first aspect, the specific information recording area further records temporary power information indicative of a power level of an optical beam used for determining at least one of a specific first pulse position Tu and a specific last pulse position Td, said temporary power information including at least one of the following: a peak power setting, bias power setting, margin constant, and asymmetry.

According to the fourth aspect of the invention, in the data recording medium as set forth in the second aspect, the specific information recording area further records a pattern signal for determining said temporary power information.

According to the fifth aspect of the invention, in the data recording medium as set forth in the first aspect, the specific information recording area further records operational power information indicative of a power level of an optical beam used for actual data recording in the data recording area, said operational power information including at least one of the following: a peak power setting, bias power setting, and margin constant.

According to the sixth aspect of the invention, in the data recording medium as set forth in the fifth aspect, the specific information recording area further records a pattern signal for determining said operational power information.

According to the seventh aspect of the invention, in the data recording medium as set forth in the first aspect, said specific information recording area further records an asymmetry information used for determining at least one of a specific first pulse position Tu and a specific last pulse position Td.

According to the eighth aspect of the invention, in the data recording medium as set forth in the first aspect, further comprises:

a control information recording area for prerecording at least one of a typical first drive pulse position Tu and a typical last drive pulse position Td of a drive pulse sequence required for recording said marks to the data recording medium.

According to the ninth aspect of the invention, in the data recording medium as set forth in the first aspect, said specific information recording area is provided for recording at least one of a specific first pulse position Tu and a specific last pulse position Td, and a device-specific information as a data set, said data set being recorded for a plurality of different recording devices.

According to the tenth aspect of the invention, in the recording and reproducing device for recording information to and reproducing information from a data recording medium, said data recording medium having a plurality of concentric or spiral tracks for recording information represented as marks and spaces between the marks, the marks being formed by emitting to a track recording surface an optical beam modulated by a plurality of drive pulses where the drive pulse count is adjusted according to a length of a mark part in the original signal to be recorded to the track, a data recording area for recording data, and a specific information recording area for recording when the data recording medium is loaded into a particular recording device device-specific information specific to the particular recording device, and at least one of a specific first pulse position Tu and a specific last pulse position Td of a drive pulse sequence required by the particular recording device to record said marks to the data recording medium, the recording and reproducing device comprises:

a reading means for reading device-specific information specific to the data recording medium from a particular area of the data recording medium; and memory for storing said read medium-specific information.

According to the eleventh aspect of the invention, in the recording and reproducing device as set forth in the tenth aspect, the medium-specific information includes at least one of the following: a name of the data recording medium manufacturer, a product number, a location where the data recording medium was produced, and a production date.

According to the twelfth aspect of the invention, in the recording and reproducing device as set forth in the tenth aspect, the memory further stores temporary power information indicative of a power level of an optical beam used for determining a specific first pulse position Tu and/or specific last pulse position Td, said temporary power information including at least one of the following: a peak power setting, bias power setting, margin constant, and asymmetry.

According to the thirteenth aspect of the invention, in the recording and reproducing device as set forth in the twelfth aspect, the memory further stores a pattern signal for determining said temporary power information.

According to the 14th aspect of the invention, in the recording and reproducing device as set forth in the tenth aspect, the memory further stores operational power information indicative of a power level of an optical beam used for actual data recording in the data recording area, said operational power information including at least one of the following: a peak power setting, bias power setting, and margin constant.

According to the 15th aspect of the invention, in the recording and reproducing device as set forth in the 14th aspect, the memory further stores a pattern signal for determining said operational power information.

According to the 16th aspect of the invention, in the recording and reproducing device as set forth in the tenth aspect, said memory further records an asymmetry information used for determining at least one of a specific first pulse position Tu and a specific last pulse position Td.

According to the 17th aspect of the invention, in the recording and reproducing device as set forth in the tenth aspect, the memory further stores said specific first pulse position Tu and/or said specific last pulse position Td.

According to the 18th aspect of the invention, in the recording and reproducing device as set forth in the tenth aspect, the memory further stores medium-specific information for a plurality of different data recording media used in the recording and reproducing device.

According to the 19th aspect of the invention, in a recording method for recording to a data recording medium, said data recording medium having a plurality of concentric or spiral tracks for recording information represented as marks and spaces between the marks, the marks being formed by emitting to a track recording surface an optical beam modulated by a plurality of drive pulses where the drive pulse count is adjusted according to a length of a mark part in the original signal to be recorded to the track, a data recording area for recording data, and a specific information recording area for recording when the data recording medium is loaded into a particular recording device device-specific information specific to the particular recording device, and at least one of a specific first pulse position Tu and a specific last pulse position Td of a drive pulse sequence required by the particular recording device to record said marks to the data recording medium, the recording method comprises steps for:

determining said specific first pulse position Tu and/or said specific last pulse position Td; and then recording data to the data recording area.

According to the 20th aspect of the invention, in the recording method as set forth in the 19th aspect, the specific first pulse position Tu is obtained from a length of a mark part and immediately preceding space part in a pattern signal, and the specific last pulse position Td is obtained from a length of a mark part and immediately following space part in a pattern signal.

According to the 21st aspect of the invention, in the recording method as set forth in the 19th aspect, the specific first pulse position Tu is expressed as a time difference TF between a first reference point R1, which is a leading edge of a mark part in the pattern signal to be recorded, and a first edge of the first pulse in a plurality of drive pulses, and specific last pulse position Td is expressed as a time difference TL between a second reference point R2, which as a specific known position relative to a trailing edge of a mark part in the pattern signal to be recorded, and a trailing edge of the last pulse in a plurality of drive pulses.

According to the 22nd aspect of the invention, in the recording method as set forth in the 20th aspect, the pattern signal contains an adjustment signal for obtaining a DSV of 0.

According to the 23rd aspect of the invention, in the recording method as set forth in the 19th aspect, the specific first pulse position Tu and/or specific last pulse position Td is determined by reproducing a specific information recording area of the data recording medium to obtain necessary information.

According to the 24th aspect of the invention, in the recording method as set forth in the 19th aspect, the specific first pulse position Tu and/or specific last pulse position Td is determined by reading information from memory in a particular recording and reproducing device in which the data recording medium is used to obtain necessary information.

According to the 25th aspect of the invention, in the recording method as set forth in the 19th aspect, the information determined for the specific first pulse position Tu and/or specific last pulse position Td is recorded to the specific information recording area of the data recording medium in conjunction with device-specific information specific to the particular recording and reproducing device.

According to the 26th aspect of the invention, in the recording method as set forth in the 19th aspect, the information determined for the specific first pulse position Tu and/or specific last pulse position Td is recorded in memory in a particular recording and reproducing device in conjunction with device-specific information specific to the particular recording and reproducing device.

According to the 27th aspect of the invention, in the recording method as set forth in the 19th aspect, temporary power information indicative of a power level of an optical beam used for determining a specific first pulse position Tu and/or specific last pulse position Td is further recorded to the specific information recording area of the data recording medium, said temporary power information including at least one of the following: a peak power setting, bias power setting, margin constant, and asymmetry.

According to the 28th aspect of the invention, in the recording method as set forth in the 27th aspect, a pattern signal for determining said temporary power information is further recorded to said specific information recording area.

According to the 29th aspect of the invention, in the recording method as set forth in the 19th aspect, operational power information indicative of a power level of an optical beam used for actual data recording in the data recording area is further recorded to the specific information recording area of the data recording medium.

said operational power information including at least one of the following: a peak power setting, bias power setting, and margin constant.

According to the 30th aspect of the invention, in the recording method as set forth in the 29th aspect, a pattern signal for determining said operational power information is further recorded to said specific information recording area.

According to the 31st aspect of the invention, in the recording method as set forth in the 19th aspect, said specific information recording area further records an asymmetry information used for determining at least one of a specific first pulse position Tu and a specific last pulse position Td.

According to the 32nd aspect of the invention, in the recording method for recording to a data recording medium, said data recording medium having a plurality of concentric spiral tracks for recording information represented as marks and spaces between the marks, the marks being formed by emitting to a track recording surface an optical beam modulated by a plurality of drive pulses where the drive pulse count is adjusted according to a length of a mark part in the original signal to be recorded to the track;

a data recording area for recording data, and a specific information recording area for recording when the data recording medium is loaded into a particular recording device device-specific information specific to the particular recording device, and at least one of a specific first pulse position Tu and a specific last pulse position Td of a drive pulse sequence required by the particular recording device to record said marks to the data recording medium, the recording method comprises steps for:

determining emission power of an optical beam for recording said marks; and then determining a specific first pulse position Tu and/or specific last pulse position Td.

According to the 33rd aspect of the invention, in the recording method as set forth in the 32nd aspect, the optical beam emission power is determined by recording a predetermined specified pattern signal to the data recording medium.

According to the 34th aspect of the invention, in the recording method as set forth in the 33rd aspect, the specified pattern signal contains a single signal.

According to the 35th aspect of the invention, in the recording method as set forth in the 33rd aspect, the specified pattern signal contains an adjustment signal for obtaining a DSV of 0.

According to the 36th aspect of the invention, in the recording method as set forth in the 33rd aspect, the specific pattern signal recorded to the data recording medium is reproduced, the reproduced specific pattern signal is compared with a specific pattern signal for recording, and the emission power is set so that a difference between the compared signals is a specific value or less.

According to the 37th aspect of the invention, in the recording method as set forth in the 33rd aspect, the predetermined specific pattern signal is prerecorded to the data recording medium.

According to the 38th aspect of the invention, in the recording method as set forth in the 33rd aspect, the predetermined specific pattern signal is prerecorded in the recording device.

According to the 39th aspect of the invention, in the recording method as set forth in the 33rd aspect, the emission power determined for a specific data recording medium is recorded to said specific data recording medium.

According to the 40th aspect of the invention, in the recording method as set forth in the 33rd aspect, the emission power determined for a specific data recording medium is stored in the recording device in conjunction with the medium-specific information for said specific data recording medium.

According to the 41st aspect of the invention, in the recording method as set forth in the 32nd aspect, temporary power information indicative of a power level of an optical beam used for determining a specific first pulse position Tu and/or specific last pulse position Td is further recorded to the specific information recording area of the data recording medium, said temporary power information including at least one of the following: a peak power setting, bias power setting, margin constant, and asymmetry.

According to the 42nd aspect of the invention, in the recording method as set forth in the 41st aspect, wherein a pattern signal for determining said temporary power information is further recorded to said specific information recording area.

According to the 43rd aspect of the invention, in the recording method as set forth in the 32nd aspect, operational power information indicative of a power level of an optical beam used for actual data recording in the data recording area is further recorded to the specific information recording area of the data recording medium, said operational power information including at least one of the following: a peak power setting, bias power setting, and margin constant.

According to the 44th aspect of the invention, in the recording method as set forth in the 43rd aspect, a pattern signal for determining said operational power information is further recorded to said specific information recording area.

According to the 45th aspect of the invention, in a recording method for recording to a data recording medium, said data recording medium having a plurality of concentric or spiral tracks for recording information represented as marks and spaces between the marks, the marks being formed by emitting to a track recording surface an optical beam modulated by a plurality of drive pulses where the drive pulse count is adjusted according to a length of a mark part in the original signal to be recorded to the track, a data recording area for recording data, and a specific information recording area for recording when the data recording medium is loaded into a particular recording device device-specific information specific to the particular recording device, and at least one of a specific first pulse position Tu and a specific last pulse position Td of a drive pulse sequence required by the particular recording device to record said marks to the data recording medium, the recording method comprises steps for:

determining a specific first pulse position Tu and/or specific last pulse position Td, and then determining emission power of an optical beam for recording said marks.

According to the 46th aspect of the invention, in the recording method as set forth in the 45th aspect, the optical beam emission power is determined by recording a predetermined specified pattern signal to the data recording medium.

According to the 47th aspect of the invention, in the recording method as set forth in the 46th aspect, the predetermined specific pattern signal is prerecorded to the data recording medium.

According to the 48th aspect of the invention, in the recording method as set forth in the 46th aspect, the predetermined specific pattern signal is prerecorded in the recording device.

According to the 49th aspect of the invention, in the recording method as set forth in the 46th aspect, the emission power determined for a specific data recording medium is recorded to said specific data recording medium.

According to the 50th aspect of the invention, in the recording method as set forth in the 46th aspect, the emission power determined for a specific data recording medium is stored in the recording device in conjunction with the medium-specific information for said specific data recording medium.

According to the 51st aspect of the invention, in the recording method as set forth in the 45th aspect, temporary power information indicative of a power level of an optical beam used for determining a specific first pulse position Tu and/or specific last pulse position Td is further recorded to the specific information recording area of the data recording medium, said temporary power information including at least one of the following: a peak power setting, bias power setting, margin constant, and asymmetry.

According to the 52nd aspect of the invention, in the recording method as set forth in the 51st aspect, a pattern signal for determining said temporary power information is further recorded to said specific information recording area.

According to the 53rd aspect of the invention, in the recording method as set forth in the 45th aspect, operational power information indicative of a power level of an optical beam used for actual data recording in the data recording area if further recorded to the specific information recording area of the data recording medium, said operational power information including at least one of the following: a peak power setting, bias power setting, and margin constant.

According to the 54th aspect of the invention, in the recording method as set forth in the 53rd aspect, a pattern signal for determining said operational power information is further recorded to said specific information recording area.

According to the 55th aspect of the invention, in the recording method as set forth in the 45th aspect, said specific information recording area further records an asymmetry information used for determining at least one of a specific first pulse position Tu and a specific last pulse position Td.

According to the 56th aspect of the invention, in a recording method for recording to a data a recording medium, said data recording medium having a plurality of concentric or spiral tracks for recording information represented as marks and spaces between the marks, the marks being formed by emitting to a track recording surface an optical beam modulated by a plurality of drive pulses where the drive pulse count is adjusted according to a length of a mark part in the original signal to be recorded to the track, a data recording area for recording data, and a specific information recording area for recording when the data recording medium is loaded into a particular recording device
device-specific information specific to the particular recording device, and in conjunction therewith
at least one of a specific first pulse position Tu and a specific last pulse position Td of a drive pulse sequence required by the particular recording device to record said marks to the data recording medium, the recording method comprises steps for:

compensating for group delay so that a same group delay level is obtained in a read signal even when the frequency of the recorded signal differs; and then determining a specific first pulse position Tu and/or specific last pulse position Td.

According to the 57th aspect of the invention, in the recording method as set forth in the 56th aspect, wherein group delay compensation is accomplished by recording a test signal having a space signal component of a specific length to the data recording medium.

According to the 58th aspect of the invention, in the recording method as set forth in the 57th aspect, wherein the test signal is an embossed signal prerecorded to the data recording medium.

According to the 59th aspect of the invention, in the recording method as set forth in the 57th aspect, the test signal is prerecorded to a specific area of the data recording medium.

According to the 60th aspect of the invention, in the recording method as set forth in the 57th aspect, the test signal is prerecorded to the recording device.

According to the 61st aspect of the invention, in the recording method as set forth in the 57th aspect, group delay compensation is performed to minimize jitter in the reproduced test signal.

According to the 62nd aspect of the invention, in the recording method as set forth in the 56th aspect, temporary power information indicative of a power level of an optical beam used for determining a specific first pulse position Tu and/or specific last pulse position Td is further recorded to the specific information recording area of the data recording medium, said temporary power information including at least one of the following: a peak power setting, bias power setting, margin constant, and asymmetry.

According to the 63rd aspect of the invention, in the recording method as set forth in the 62nd aspect, a pattern signal for determining said temporary power information is further recorded to said specific information recording area.

According to the 64th aspect of the invention, in the recording method as set forth in the 56th aspect, operational power information indicative of a power level of an optical beam used for actual data recording in the data recording area is further recorded to the specific information recording area of the data recording medium, said operational power information including at least one of the following: a peak power setting, bias power setting, and margin constant.

According to the 65th aspect of the invention, in the recording method as set forth in the 64th aspect, a pattern signal for determining said operational power information is further recorded to said specific information recording area.

According to the 66th aspect of the invention, in the recording method as set forth in the 56th aspect, said specific information recording area further records an asymmetry information used for determining at least one of a specific first pulse position Tu and a specific last pulse position Td.

According to the 67th aspect of the invention, in a data recording medium having a plurality of concentric or spiral tracks for recording information represented as marks and spaces between the marks, the marks being formed by emitting to a track recording surface an optical beam modulated by a plurality of drive pulses where the drive pulse count is adjusted according to a length of a mark part in the original signal to be recorded to the track, said data recording medium comprises:

a data recording area for recording data, and a control data zone for prerecording control data as a sequence of embossed marks and spaces,
said control data including at least one of a first pulse position Tu and a last pulse position Td of a drive pulse sequence required by a recording device to record said marks to the data recording medium, and
temporary power information indicative of a power level of an optical beam used for determining a said first pulse position Tu and/or last pulse position Td,
said temporary power information including at least one of the following: a peak power setting, bias power setting, margin constant, and asymmetry.

According to the 68th aspect of the invention, in a data recording medium having a plurality of concentric or spiral tracks for recording information represented as marks and spaces between the marks, the marks being formed by emitting to a track recording surface an optical beam modulated by a plurality of drive pulses where the drive pulse count is adjusted according to a length of a mark part in the original signal to be recorded to the track, said data recording medium comprises:

a data recording area for recording data, and a control data zone for prerecording control data as a sequence of embossed marks and spaces,
said control data including at least one of a first pulse position Tu and a last pulse position Td of a drive pulse sequence required by a recording device to record said marks to the data recording medium, and
operational power information indicative of a power level of an optical beam used for actual data recording in the data recording area,
said operational power information including at least one of the following: a peak power setting, bias power setting, and margin constant.

According to the 69th aspect of the invention, in a data recording medium having a plurality of concentric or spiral tracks for recording information represented as marks and spaces between the marks, the marks being formed by emitting to a track recording surface an optical beam modulated by a plurality of drive pulses where the drive pulse count is adjusted according to a length of a mark part in the original signal to be recorded to the track, said data recording medium comprises:

a data recording area for recording data, and a control data zone for prerecording control data as a sequence of embossed marks and spaces, said control data including at least one of a first pulse position Tu and a last pulse position Td of a drive pulse sequence required by a recording device to record said marks to the data recording medium, and an asymmetry information used for determining said pulse positions.

Other objects and attainments together will a fuller understanding of the invention will become apparent and appreciated by referring to the following description and claims taken in conjunction with the accompanying drawings.

BRIEF DESCRIPTION OF THE DRAWINGS

FIGS. 5A and 5B show a preferred method of grouping signals according to a method of the present invention;

FIGS. 20A, 20B and 20C show an exemplary recording pattern in a preferred embodiment of the present invention;

FIGS. 34 and 35 show the data format of an optical disc according to a preferred embodiment of the present invention;

FIG. 38 summarizes the features of various embodiment of the present invention.

DESCRIPTION OF THE PREFERRED EMBODIMENTS

The preferred embodiments of the present invention are described below with reference to the accompanying figures.

Figure 1:
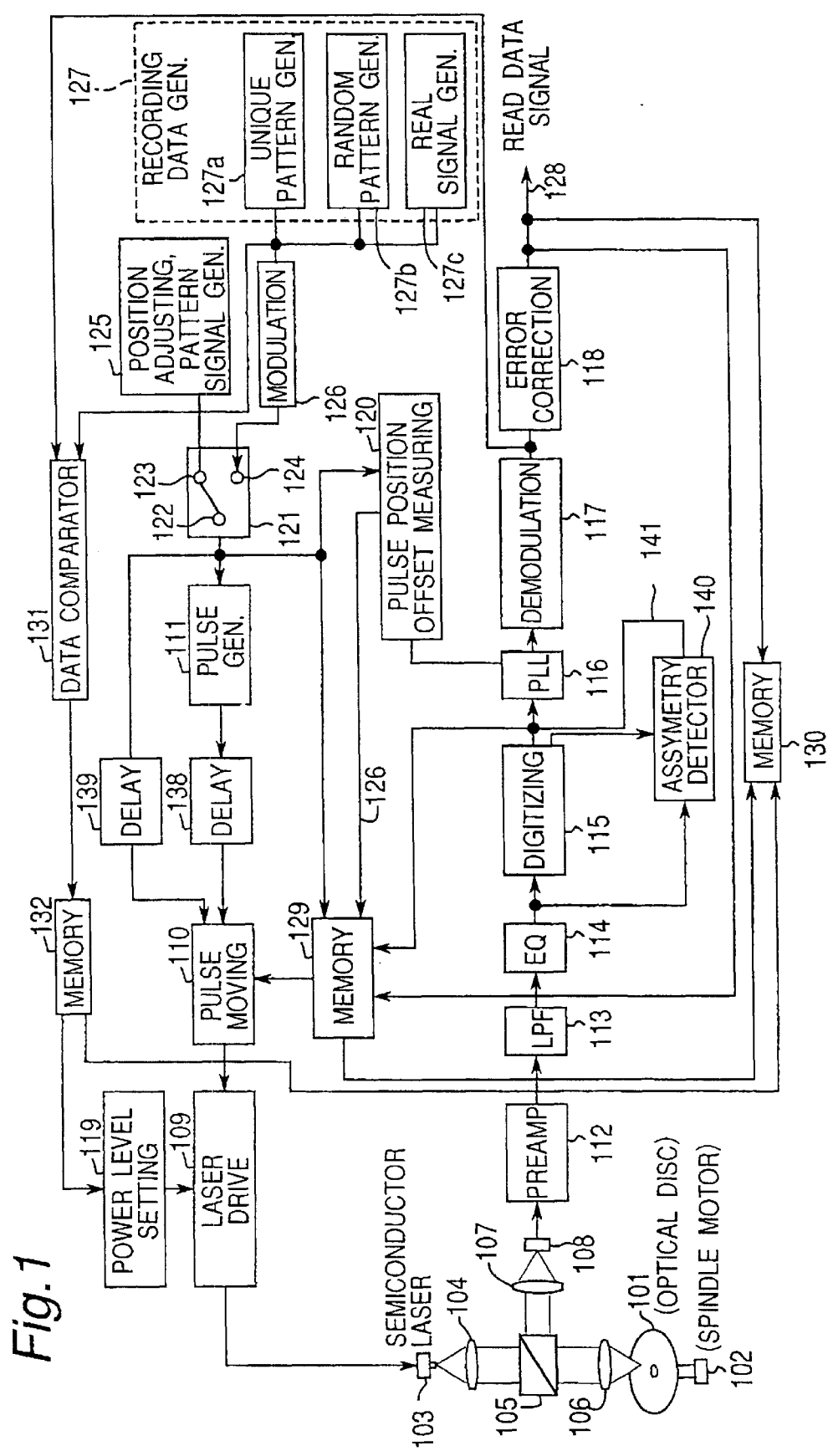
FIG. 1 is a block diagram of a recording device for information according to a preferred embodiment of the present invention.

FIG. 1 is a block diagram of an optical data recording apparatus, referred to below as an optical disc recorder, according to the preferred embodiment of the present invention.

Shown in FIG. 1 are: an optical disc 101, spindle motor 102, semiconductor laser 103, collimeter lens 104, beam splitter 105, objective lens 106, collective lens 107, photodetector 108, laser drive circuit 109, pulse moving circuit 110, pulse generator 111, preamplifier 112, low pass filter 113, reproduction equalizer 114, digitzing circuit 115, PLL 116, demodulation circuit 117, error correction circuit 118, power level setting circuit 119, pulse position offset measuring circuit 120, switch 121, switch contacts 122, 123, and 124, pattern signal generator 125 for pulse position adjusting, modulation circuit 126, recording data generator 127, read data signal 128, memory 129, memory 130, data comparator 131, and memory 132.

The recording data generator 127 further comprises a unique pattern generator 127a, a random pattern generator 127b, and a real signal generator 127c.

Also shown in FIG. 1 are delay circuits 138 and 139, each having the same delay time, and an asymmetry detector 140.

Memory 129 stores two tables which are corrected by the method of the present invention as shown in FIG. 5 with the corrected tables then written back to memory.

Memory 132 stores information used for determining the power level used to drive the laser, and stores the final power setting selected. Note that in this exemplary embodiment of the present invention laser drive power is set to either the above-noted peak power level or bias power level.

Memory 130 stores (1) disc-specific information that is prewritten to the optical disc (such as the name of the optical disc manufacturer, product number, manufacturing location, date of production, disc structure, and recording film composition), (2) the adjustment method as further described below, (3) the above-noted two tables corrected and stored in memory 129, and (4) the selected laser power level stored to memory 132. It is to be noted that memory 130 stores the above contents (1) to (4) for a plurality of different optical discs.

By thus storing this information in memory for a plurality of different optical discs, operations for obtaining information required to prepare the recording device for optimized recording, particularly operations for obtaining the above-noted items (3) and (4), can be skipped when an optical disc is loaded for data recording if the above-noted content (1) to (4) is already stored in memory for the loaded disc. It is therefore possible to immediately begin recording.

Figure 37:
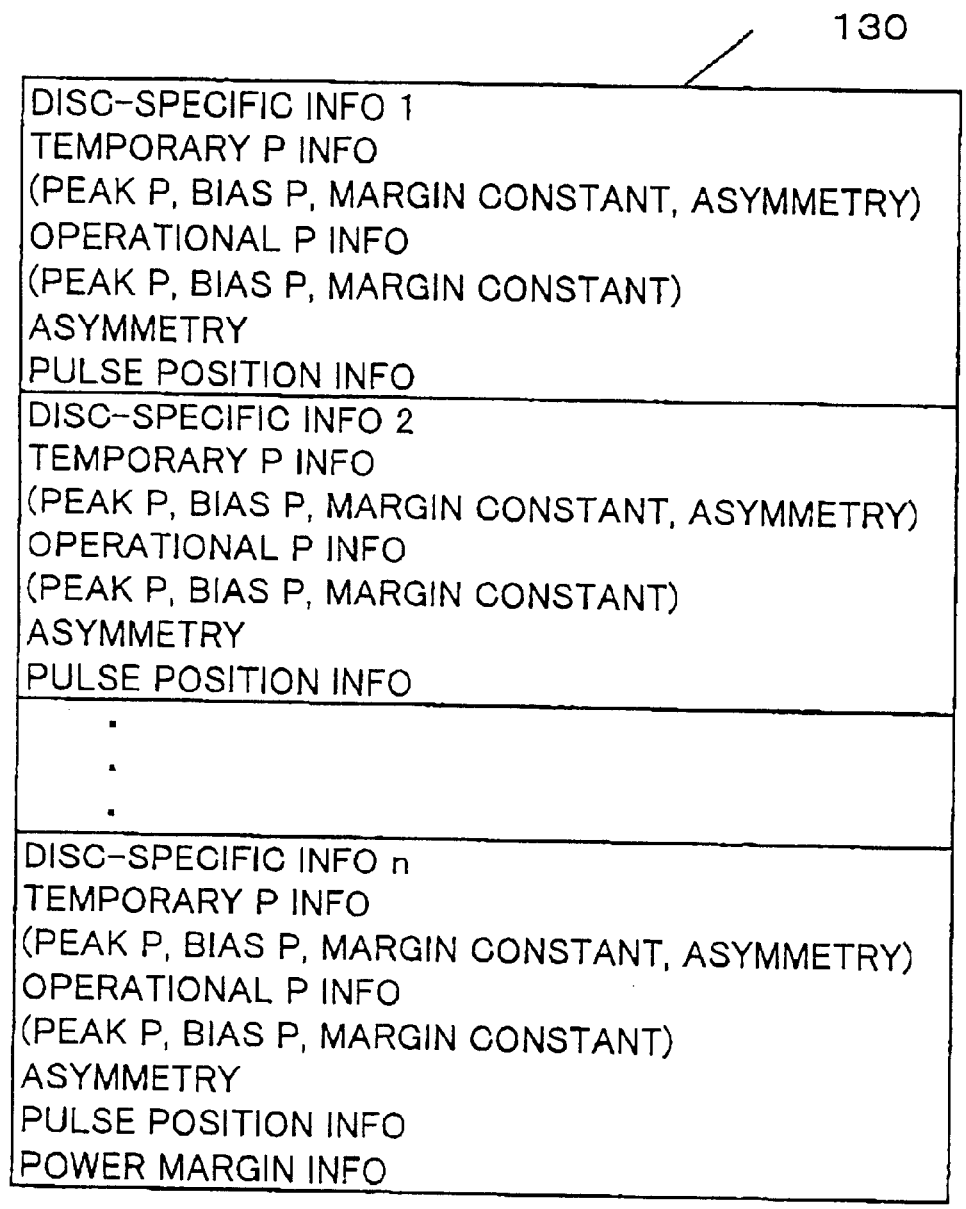
FIG. 37 shows the format of data storage in memory 130 according to a preferred embodiment of the present invention.

A conceptual map for the data layout in memory 130 is shown in FIG. 37. The above-noted content (1) is contained in disc-specific information n; content (2) and (3) is contained in the pulse position information; and content (4) is contained in the temporary power and operational power level information. When a disc is loaded in a recording device, referred to hereafter as a disc recorder, the disc-specific information is read immediately from the disc. The disc-specific information read from disc is then compared with the disc-specific information stored to memory 130 to determine whether the same information is already in memory.

If the same information is not already in memory, such as when a new disc is loaded into the disc recorder for the first time, the disc-specific information, temporary power and operational power level information, and pulse position information are stored as one set of data to memory 130. It is to be noted that anywhere from several seconds to ten several seconds may be required to obtain the temporary power and operational power level information and pulse position informatiohn through a test recording operation as described herein.

If a data set matching the read disc-specific information is already in memory, that is, if the same disc has been previously loaded into the disc recorder, the temporary power and operational power level information and pulse position information for the data set matching the side-specific information read from disc is read from memory 130. The temporary power and operational power level information is then written to memory 132 and the pulse position information is written to memory 129. It is to be noted that because this information can be simply read from memory, the several seconds to ten several seconds required to determine the information through a test recording operation is saved.

It will thus be obvious that if n different discs are loaded into the disc recorder, n sets of disc-specific information, temporary power and operational power level information, and pulse position information will be written to memory 130. In a preferred embodiment of the present invention these n data sets are stored to two or more locations. By storing the data sets to a plurality of locations, the data can be reproduced from a second location, for example, if reading data from one location in memory 130 is disabled due to a scratch or contamination, for example.

Figure 2:
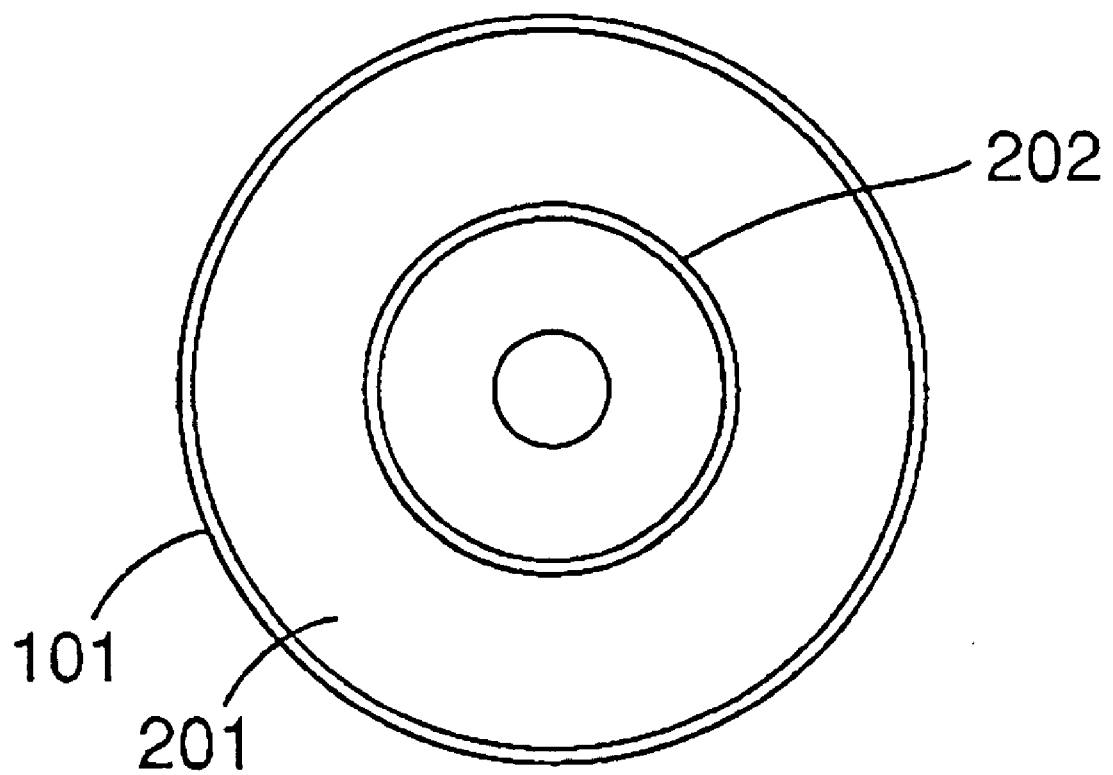
FIG. 2 is a plan view of an optical disc according to a preferred embodiment of the present invention.

FIG. 2 is a plan view of the optical disc 101, which has a data storage area 201 and a writing test zone 202.

It is to be noted that the optical head of the data recorder shown in FIG. 1 comprises the semiconductor laser 103, collimator lens 104, beam splitter 105, objective lens 106, collective lens 107, and photodetector 108. When an optical disc 101 is loaded to the optical data recorder, the optical head moves to the writing test zone 202, which is used for determining the optimum positions for the start position and end position of each mark.

This area for determining the optimum mark start and end positions is an area at the inside circumference area and/or the outside circumference area of the disc, and is outside of the user data recording area. An exemplary area is the drive test zone of the disc. Switch 121 switches contact 122 to contact 123 when writing to the writing test zone 202.

During normal user data writing operations, the switch 121 changes so that contact 122 is conductive to contact 124 so that the output signal form the recording data generator 127 is applied to the pulse generator 111 after it has been modulated by the modulation circuit 126.

The power level setting circuit 119 sets the laser drive circuit 109 to either peak power or bias power. At this time the output signal from pattern signal generator 125 is passed by switch 121 to the pulse generator 111. Signal flow from the pulse generator 111 is described further below with reference to FIG. 3.

Figure 3:
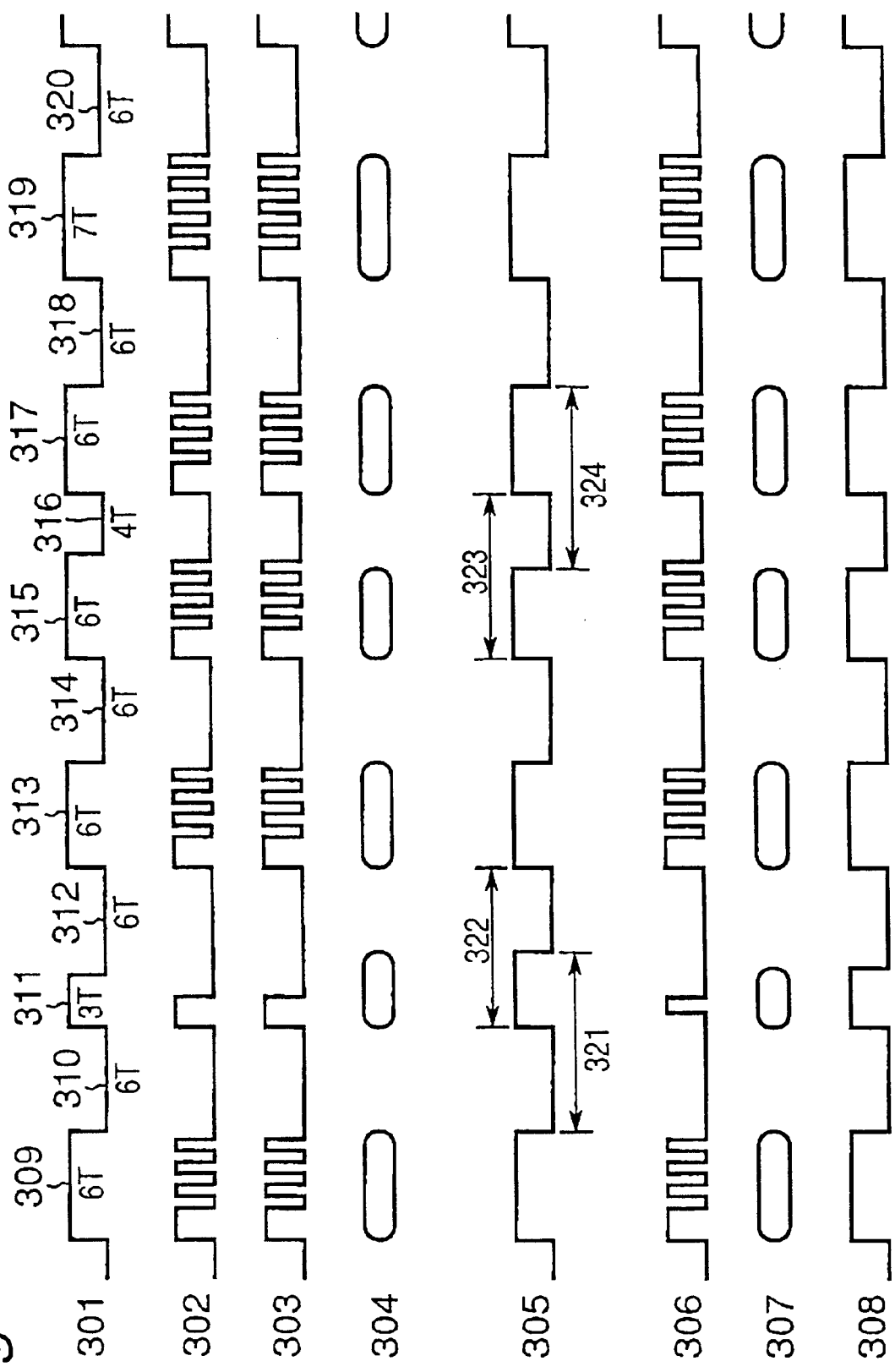
FIGS. 3 and 6 to 9 are used to described signal processing according to a method of the present invention.

Shown in FIG. 3 are a first pattern signal 301, which is the output signal from the pattern signal generator 125; output signal 302 from the pulse generator 111; output signal 303 from the pulse moving circuit 110; and mark pattern 304 formed in the recording track of the optical disc 101 as a result of modulating laser power output between peak power and bias power levels according to output signal 303. It is to be noted that while signals 301, 302, and 303 are not generated on the same time base, for convenience they are shown with corresponding parts in each signal aligned vertically.

In first pattern signal 301, mark parts 309, 311, 313, 315, 317, and 319 are the parts of the signal whereby a mark is to be formed on the disc, and space parts 310, 312, 314, 316, 318, and 320 are the parts of the signal that appear as a space on disc. It is further assumed below that mark part 309 follows space part 320 such that first pattern signal 301 comprises a repeating pattern of parts 309 to 320.

For example, when data generated by (2, 10) run-length limited modulation is recorded using a mark edge recording method, the marks and spaces have a shortest length of 3T and a longest length of 11T where T is the reference period. Mark part 309 is a 6T signal (a 6T mark part below), space part 310 is a 6T space, 311 is a 3T mark, 312 is a 6T space, 313 is a 6T mark, 314 is a 6T space, 315 is a 6T mark, 316 is a 4T space, 317 is a 6T mark, 318 is a 6T space, 319 is a 7T mark, and 320 is a 6T space.

Note that if DSV is the difference of the sum of mark and space length in a specific period, a reproduction signal with a small dc component or low frequency component can be obtained when the marks and spaces are reproduced by inserting signals 319 and 320 whereby a DSV of substantially zero can be obtained; note that signals 319 and 320 are inserted only when DSV is otherwise not zero. Reproducing a signal with many dc components or low frequency components can result in the digitizing circuit 115 erroneously generating a signal with the wrong sequency of 0s and 1s.

To prevent this, a 7T mark part 319 is inserted to the first pattern signal 301 as a compensation signal assuring that the DSV is substantially 0. More specifically, first pattern signal 301 is generated so that the sum (34T) of the periods of marks parts 309, 311, 313, 315, 317, and 319 is equal to the sum (34T) of the space parts 310, 312, 314, 316, 318, and 320. DSV is calculated by adding the periods of the mark parts as positive values and the periods of the space parts as negative values. As a result, the DSV of first pattern signal 301 is 0.

This first pattern signal 301 is converted to a pulse sequence by the pulse generator 111, resulting in pulse generator output signal 302. Pulse output from the pulse generator 111 corresponding to marks of lengths from 3T to 11T is shown in FIG. 4.

Figure 4:
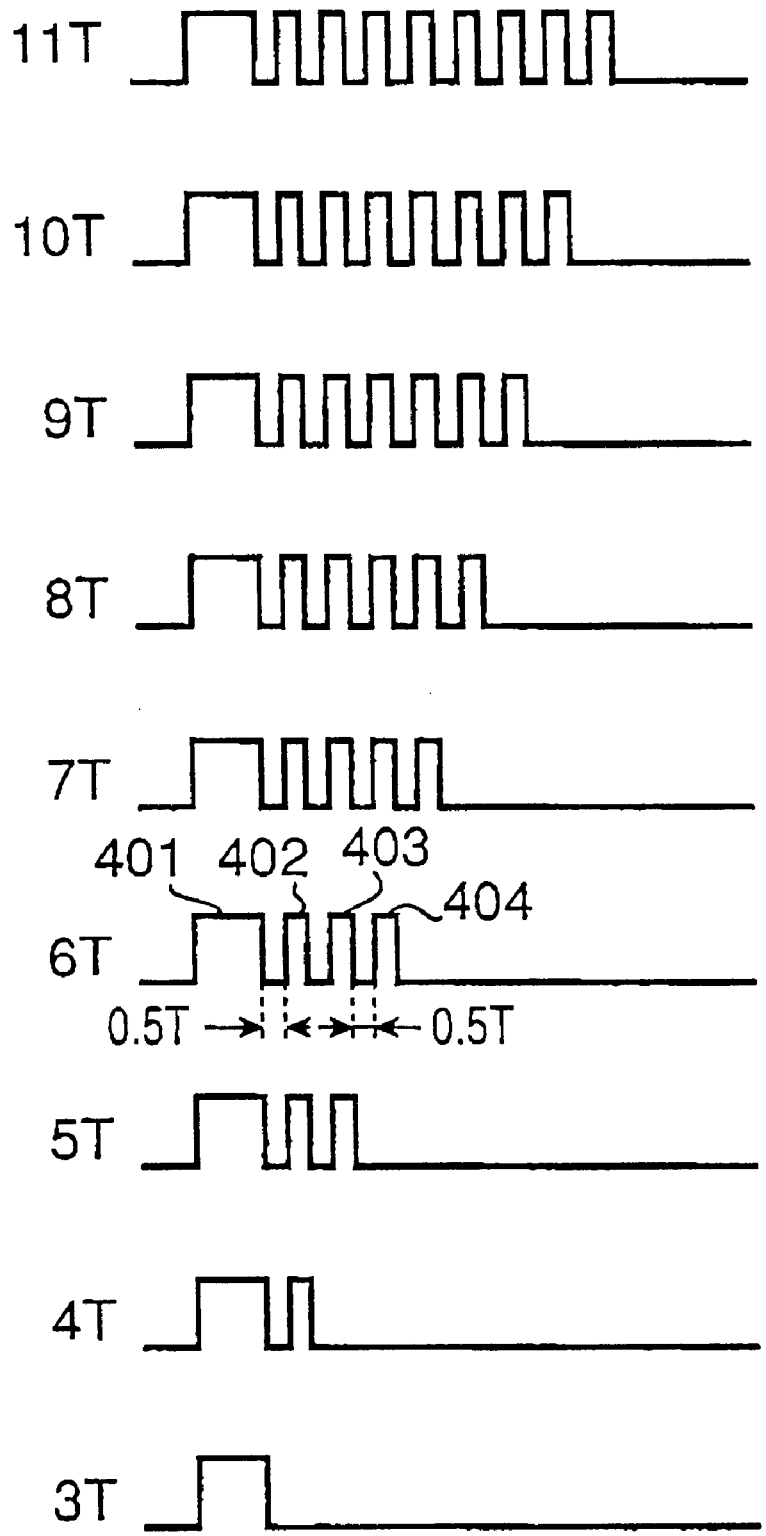
FIG. 4 shows recording pulse sequences according to a method of the present invention.

Referring by way of example to a 6T signal in FIG. 4, the pulse at the start of the signal is referred to as the first pulse 401, and the pulse at the end of the signal is the last pulse 404. The pulses between the first pulse 401 and last pulse 404 are referred to as multiple pulses 402 and 403, and have a constant period.

In a 6T mark there are two multiple pulses 402 an 403, in a 7T mark there are three, and in a 5T mark there is one. It will thus be obvious that the number of multiple pulses 402 between the first and last pulses increases by one with each 1T increase in signal length, and decreases one with each 1T decrease in signal length. A 4T mark, therefore comprises only the first and last pulses, and has no multiple pulses 402 or 404 therebetween. In addition, a 3T mark comprises just one pulse.

It is to be noted that in this exemplary embodiment of the present invention the time-base length of the first pulse is 1.5T, the last pulse is 0.5T, and the length of the multiple pulses is also 0.5T. The invention shall not be so limited, however, and the length, count, or period of these pulses can be varied as necessary according to the structure of the optical disc 101.

The pulse generator output signal 302 is input to the pulse moving circuit 110, which generates and outputs a signal 303 in which the positions of the first pulse and last pulse are moved. FIG. 5 shows the combinations of marks and spaces used for shifting the first pulse and last pulse positions.

FIG. 5 (a) shows the pulse movement tables after correction by the method of this present invention, and FIG. 5 (b) shows the tables before correction. Symbols 3S3M, 4S3M, and so forth in the tables in FIG. 5 (a) are a type of address, and are indicative of the signal type as well as the value written to that address. When read as an address, the value 3S3M, for example, represents a signal in which a 3T mark follows a 3T space. As will be described more fully below, the value of the first pulse movement TF stored at the place indicated by 3S3M is the movement required when a 3T mark follows a 3T space.

These first pulse movement TF values are obtained by, for example, a trial and error process using a particular optical test disc, and the resulting values are compiled in the tables in FIG. 5 (a). The content of the completed table is stored for all optical discs having the same structure as the optical test disc. Predetermined initial values are stored in the table on the left in FIG. 5 (b) for the first pulse. The table on the right in FIG. 5 (b) stores the initial values before correcting last pulse movement.

The position of the first pulse, that is, first drive pulse position Tu, changes according to the length of the mark and the immediately preceding space. In this preferred embodiment, the marks and spaces are separated into three groups, that is, 3T, 4T, and 5T or longer. A total of nine different pulse positions are therefore defined.

The position of the last pulse, that is, last drive pulse position Td, likewise changes according to the length of the mark and the immediately following space. In this preferred embodiment, the marks and spaces are separated into three groups, that is, 3T, 4T, and 5T or longer. A total of nine different pulse positions are therefore defined.

It is to be noted that a preferred method for determining first and last pulse movement is taught in the related Japanese Patent Application 11-185298, U.S. patent application Ser. No. 09/352,211, and European Patent Application No. 99113060.0, which were filed by the present inventor and are incorporated herein by reference.

Figure 33:
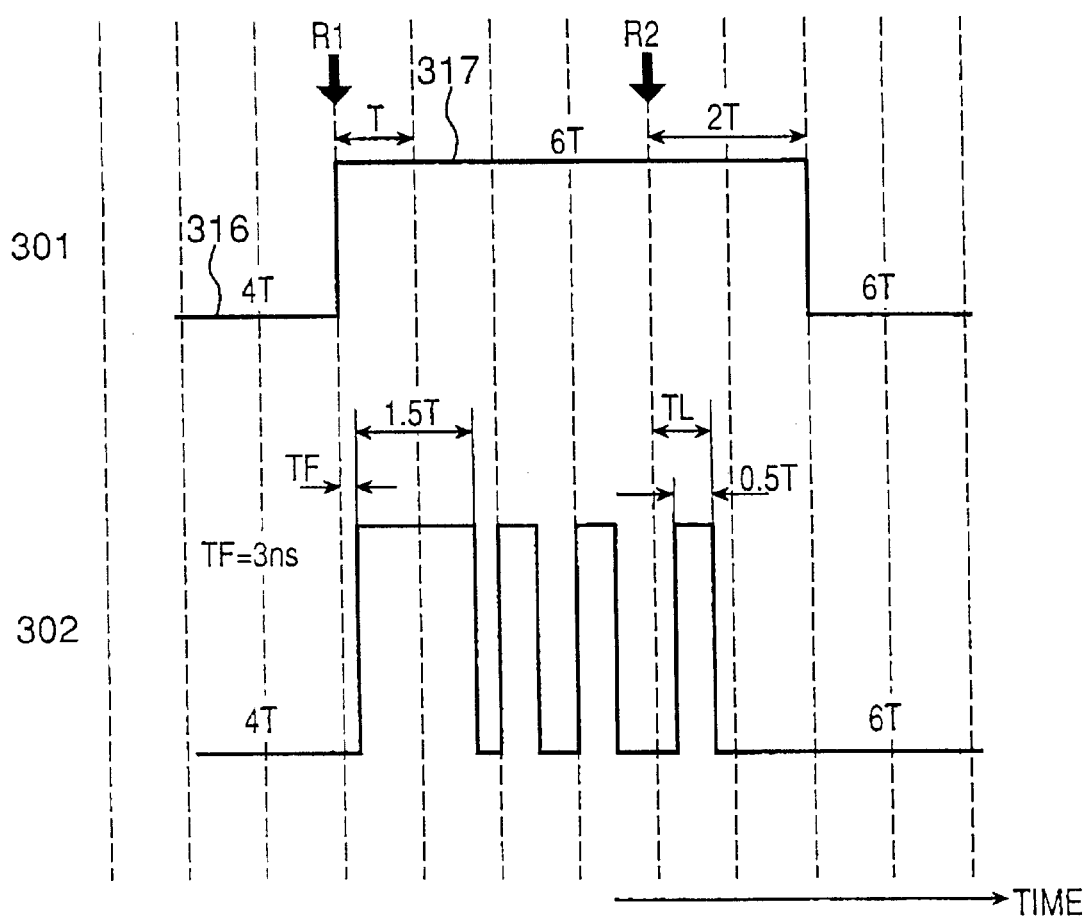

FIG. 33 is an enlarged view of the 6T mark 317 in the first pattern signal 301 shown in FIG. 3, and the corresponding part in the pulse generator output signal 302. As shown in the figure, a 4T space 316 is immediately before the 6T mark 317. A 4T space followed by a 6T mark belongs to the 4S5M group in the left table in FIG. 5 (a). Correcting the initial first pulse movement TF stored for this group is described below.

The pattern signal generator 125 in the optical data recorder shown in FIG. 1 generates a first pattern signal 301. This first pattern signal 301 is sent to the pulse generator 111, delay circuit 139, pulse position offset measuring circuit 120, and memory 129. As noted above, the two tables shown in FIG. 5 (b) are prestored to memory 129. The pulse position offset measuring circuit 120 also stores the first pattern signal 301, which is used for comparison with the reproduction signal during data reproduction. The pulse generator 111 generates the output signal 302 required for recording the pattern signal. Referring to the signals shown on the top two rows in FIG. 4, for example, the pulse generator 111 generates a first pulse 401 corresponding to the rising edge of the mark in the first pattern signal 301, the outputs multiple pulses 402 and 403, and last pulse 404.

The pulse generator output signal 302 is delayed a predetermined period by the delay circuit 138, and then passed to the pulse moving circuit 110. This predetermined period is 13T in this exemplary embodiment. The first pattern signal 301 is analyzed in memory 129 to determine to which of the 18 signal groups, that is, 3S3M, 3S4M, 3S5M, 4S3M, 4S4M, 4S5M, 5S3M, 5S4M, 5S5M, 3M3S, 4M3S, 5M3S, 3M4S, 4M4S, 5M4S, 3M5S, 4M5S, and 5M5S, the signal in the preceding 10T or longer period belongs. For example, if a 4T space 316 is followed by a 6T mark 317 in the first pattern signal 301 from the pattern signal generator 125, memory 129 detects that the signal belongs to the 4S5M group. Memory 129 therefore reads and outputs to the pulse moving circuit 110 the amount of movement stored in the table at 4S5MO. The initial 4S5MO movement value is read from the table the first time a movement value is read. The pulse moving circuit 110 then moves the first pulse of the pulse generator output signal 302 supplied thereto after a predetermined delay based on the initial movement value read from 4S5MO.

Movement of the first pulse is described in further detail below with reference to FIG. 1 and FIG. 33. When the pulse moving circuit 110 is notified by memory 129 that a pattern belonging to a specific group will soon arrive from the delay circuit 139, it also receives the first pulse movement TF for that pattern from the memory 129. For example, when the memory 129 informs the pulse moving circuit 110 that a pattern belonging to the 4S5M group, that is, a 4T space 316 following by a 6T mark 317, will arrive from the delay circuit 139, it also sends the first pulse movement TF read for the 4S5MO group. The pulse moving circuit 110 then begins counting first pulse movement TF at the rising pulse edge of the 6T mark 317 received from the delay circuit 139, that is, at time R1 in FIG. 33. Output of the first pulse from the delay circuit 138 is delayed for the period counted by the pulse moving circuit 110, that is, for pulse movement TF.

When first pulse movement TF is referenced to the rising edge R1 of the first pattern signal 301, for example, first pulse movement TF is expressed as the time difference from reference time R1 as shown in FIG. 33. In this exemplary embodiment, pulse movement TF is approximately 3 ns. It is to be noted that the first pulse is moved without changing the pulse width.

The pattern signal shown in FIG. 3 contains signal components belonging to four of the 18 groups in the table shown in FIG. 5 (a): type 3M5S in period 321, type 5S3M in period 322, type 4S5M in period 323, and type 5M4S in period 324. Each of the pulse signal components correspond to these four types in first pattern signal 301 is therefore moved.

The laser is then driven according to these moved pulses to record the actual marks. The resulting marks 304 are shown in FIG. 3. In this preferred embodiment of the present invention, the first pattern signal 301 comprising elements 309 to 320 as shown in FIG. 3 is output repeatedly and recorded around one track. When recording one complete track is thus completed, the track is reproduced. Reproduction includes converting an optical signal from the photodetector 108 to an electrical signal, and the processing this electrical signal with preamplifier 112, low pass filter 113, reproduction equalizer 114, and digitizing circuit 115 to obtain reproduction signal 305. The reproduction signal 305 is input to pulse position offset measuring circuit 120. The reproduction signal 305 from a single track is thus input repeatedly to the pulse position offset measuring circuit 120. The pulse position offset measuring circuit 120 thus reads each of the periods 321, 322, 323, and 324 associated with different signal types multiple times, and calculates the average for each period.

The pulse position offset measuring circuit 120 compares the periods 321, 322, 323, 324 corresponding to the types obtained in the recorded first pattern signal 301 during recording, and the averages for the same periods obtained from the reproduction signal 305 to detect whether any shifting in pulse position has occurred. Using by way of example the signals recorded and reproduced as described above, the combined time of the 4T space 316 and 6T mark 317 in the first pattern signal 301 is compared with the average obtained for the corresponding period 324 in the reproduction signal 305, and the difference therebetween is obtained. If there is a difference, the pulse position offset measuring circuit 120 determines that the pulse position shifted, and the calculated difference is therefore sent to memory 129. Because this difference is the result of the initial movement value 4S5MO, this initial movement value 4S5MO is increased or decreased in memory 129 according to the difference, thereby correcting the stored movement value. This corrected value is then overwritten to type 4S5M.

It is to be noted that the stored movement value is corrected and overwritten to 4S5M using a single feedback loop (through 110, 109, 108, 112, 115, 120, 126, 129) in the above exemplary embodiment. It will be obvious, however, that a plurality of feedback loops can be alternatively used to correct the value of the first pulse movement TF as shown in FIG. 33.

Movement of the last pule position is similarly corrected. That is, last pulse position movement changes according to the mark length and the length of the following space. In this exemplary embodiment marks and spaces are separated into three groups based on length, 3T, 4T, and 5T or longer, and pulse position movement is defined for each of the nine possible mark/space combinations. The last pulse movement TL is then calculated using the same method used to calculate first pulse movement TF.

As shown in FIG. 33, last pulse movement TL is corrected in the same manner as the first pulse movement TF described above. This last pulse movement TL is the time interval from the time reference R2 offset 2T forward of the trailing edge of the mark to the trailing edge of the last pulse, and is corrected by means of the loop described above with reference to the first pulse. The last pulse movement TL is approximately 11 ns in this exemplary embodiment. It is to be also noted that the width of the last pulse does not change even though the amount of last pulse movement TL changes, and in this exemplary embodiment the pulse width remains the same with the pulse simply shifted on the time axis.

The output signal 306 from the pulse moving circuit 110 obtained using the corrected pulse movement tables shown in FIG. 5 (a), the marks 307 recorded as a result of this output signal 306, and the reproduction signal 308 reproduced from these marks 307, are also shown in FIG. 3. While the reproduction signal 305 obtained using the original, uncorrected pulse movement table (FIG. 5 (b)) is not identical to the original pattern signal 301, there is substantially no difference between the reproduction signal 308 obtained using the corrected pulse movement table (FIG. 5 (a)) and the original pattern signal 301.

Figure 6:
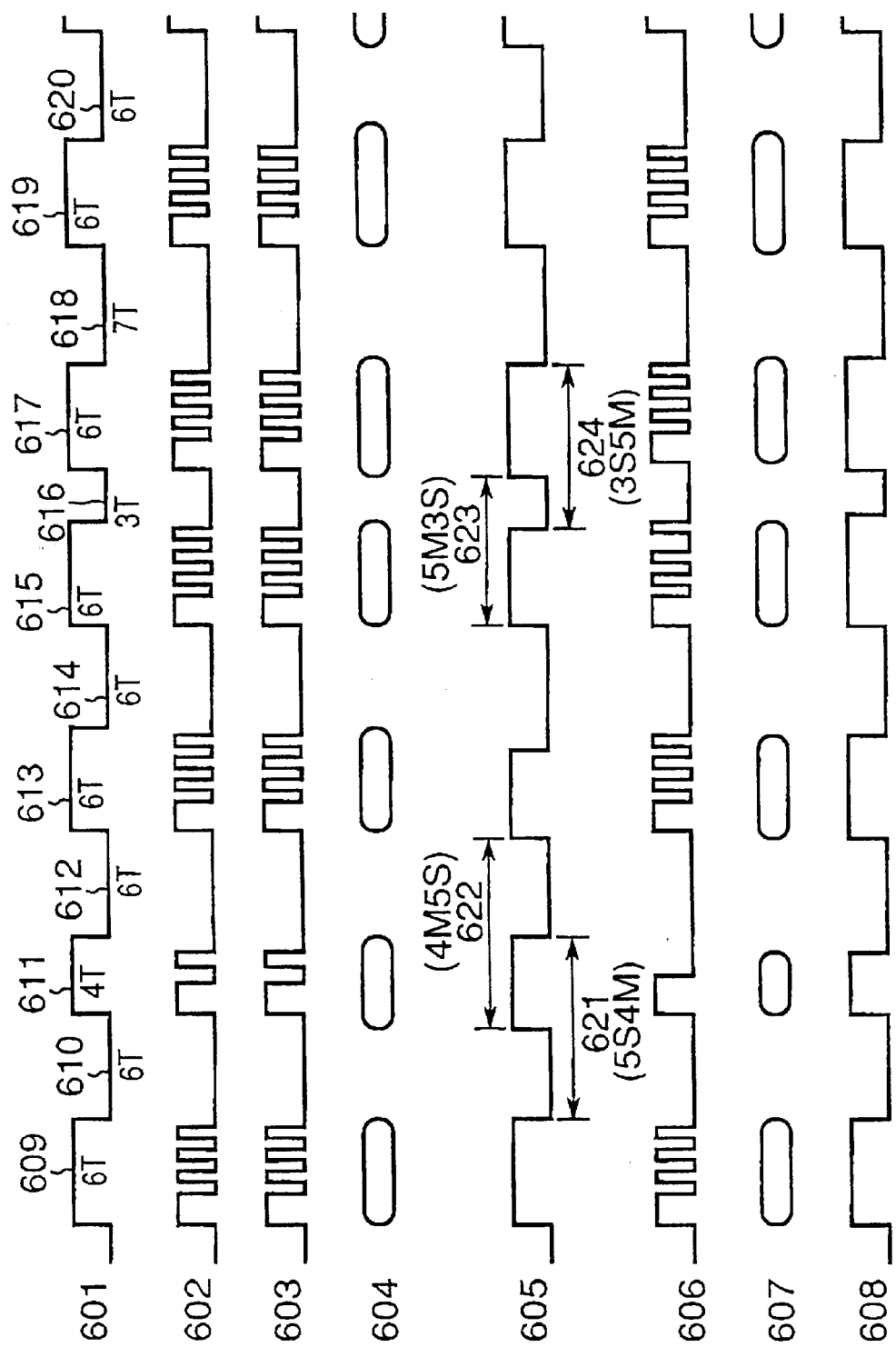
Figure 7:
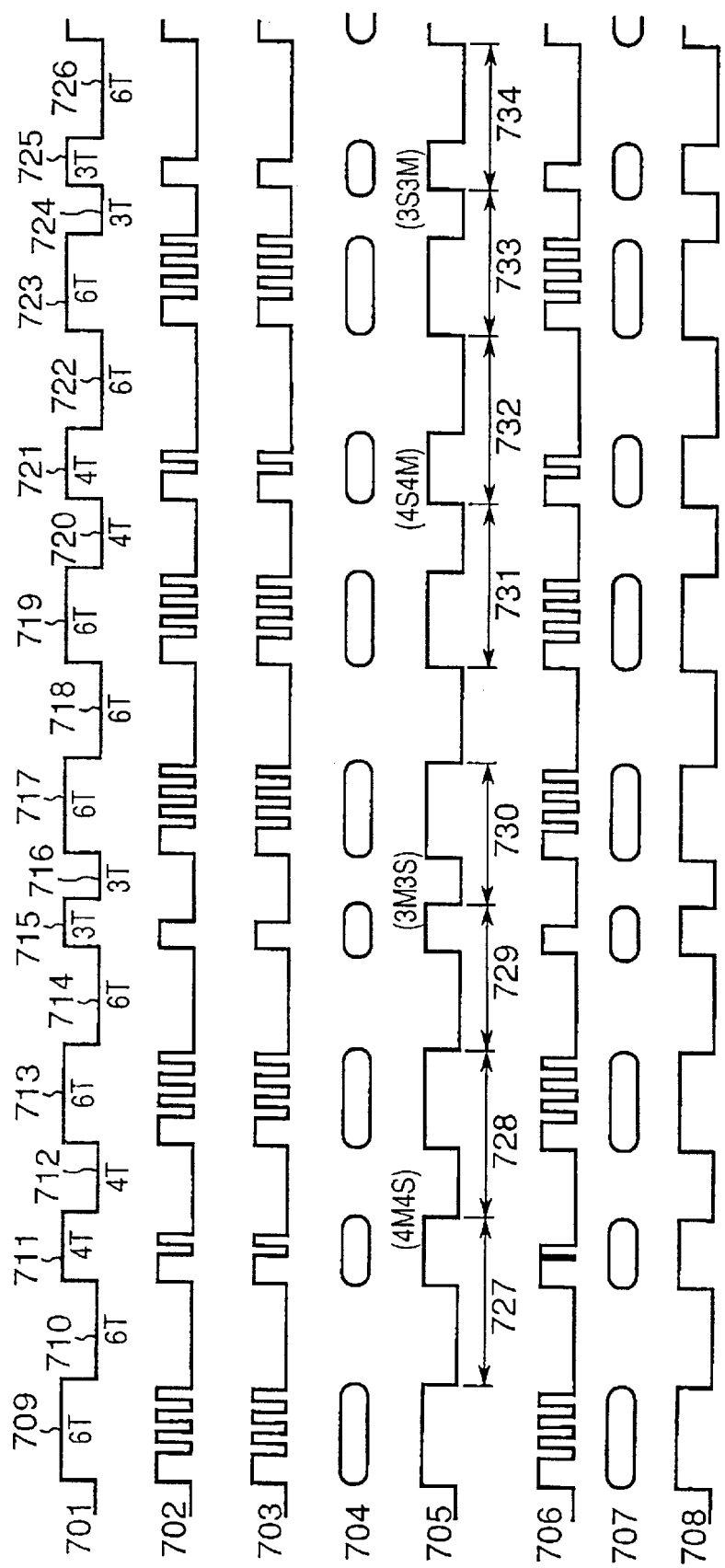
Figure 8:
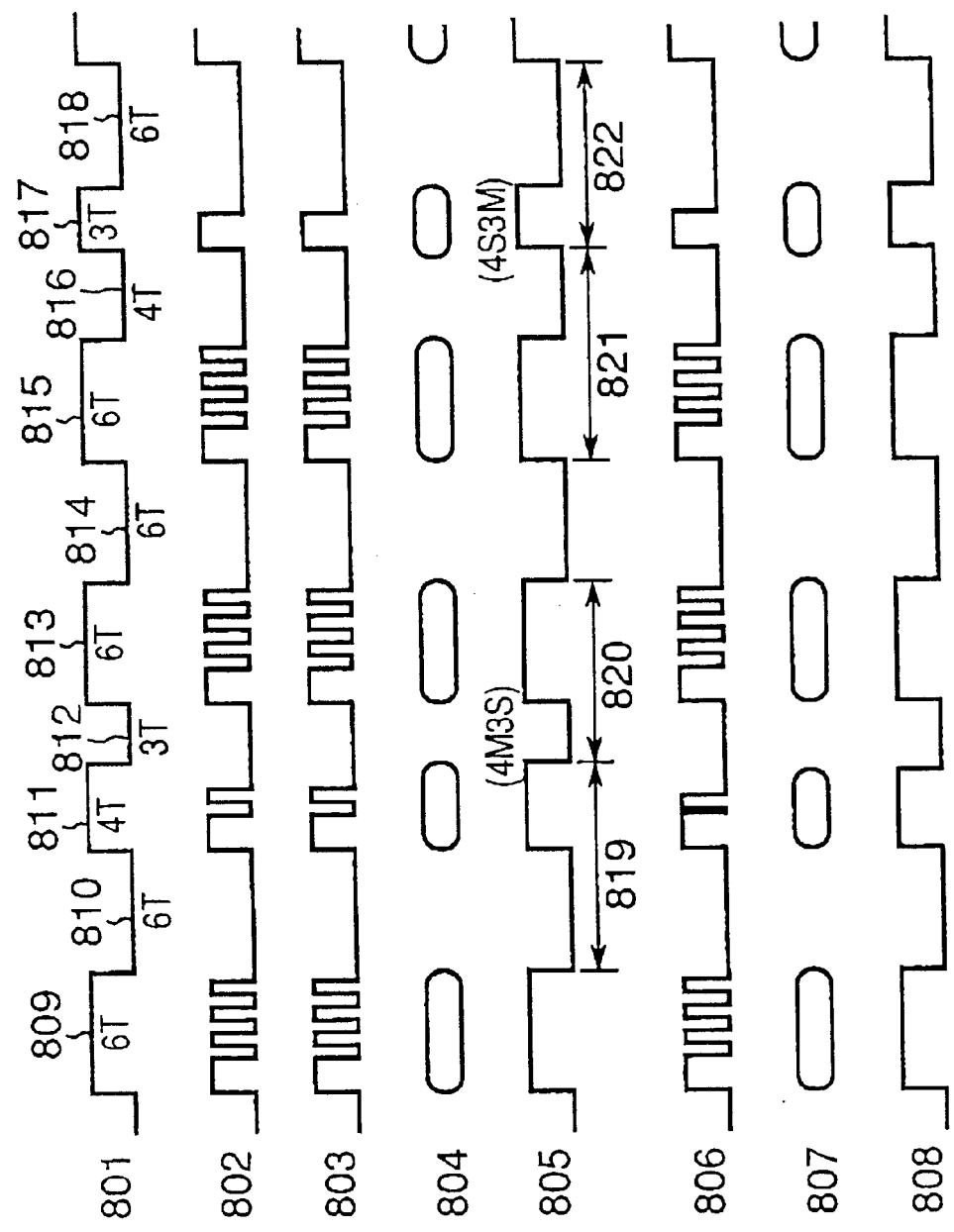
Figure 9:
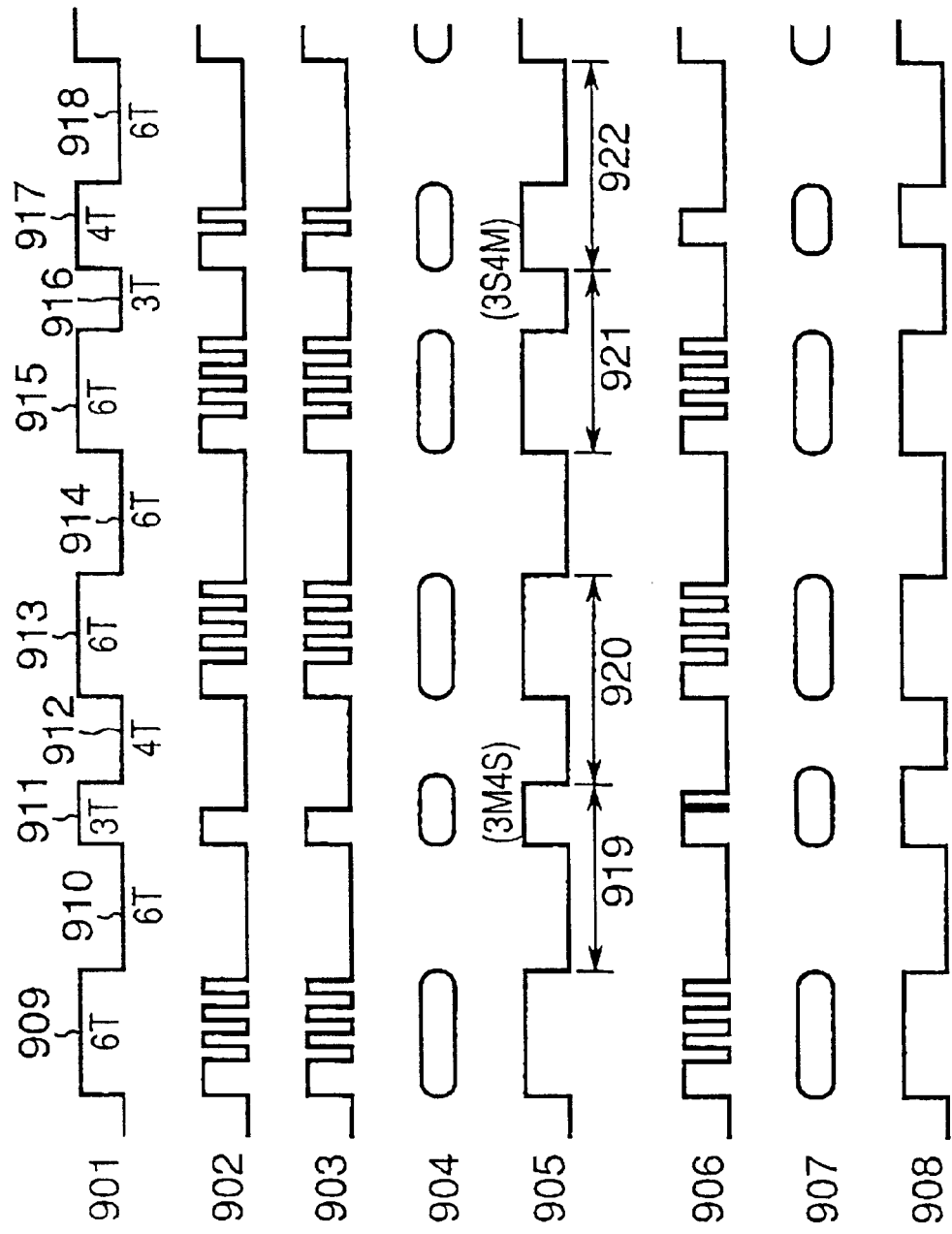

It is to be noted that four of the eighteen pulse movement values are corrected as described above using the first pattern signal 301 shown in FIG. 3. The other values are similarly corrected using other pattern signals. More specifically, types 4M5S, 5S4M, 3S5M, and 5M3S are corrected using a pattern signal 601 as shown in FIG. 6; types 4M4S, 3M3S, 4S4M, 3S3M are corrected using a pattern signal 701 as shown in FIG 7: types 4M3S, 4S3M are corrected using a pattern signal 801 as shown in FIG. 8; and types 3M4S, 3S4M are corrected using a pattern signal 901 as shown in FIG. 9.

Figure 32:
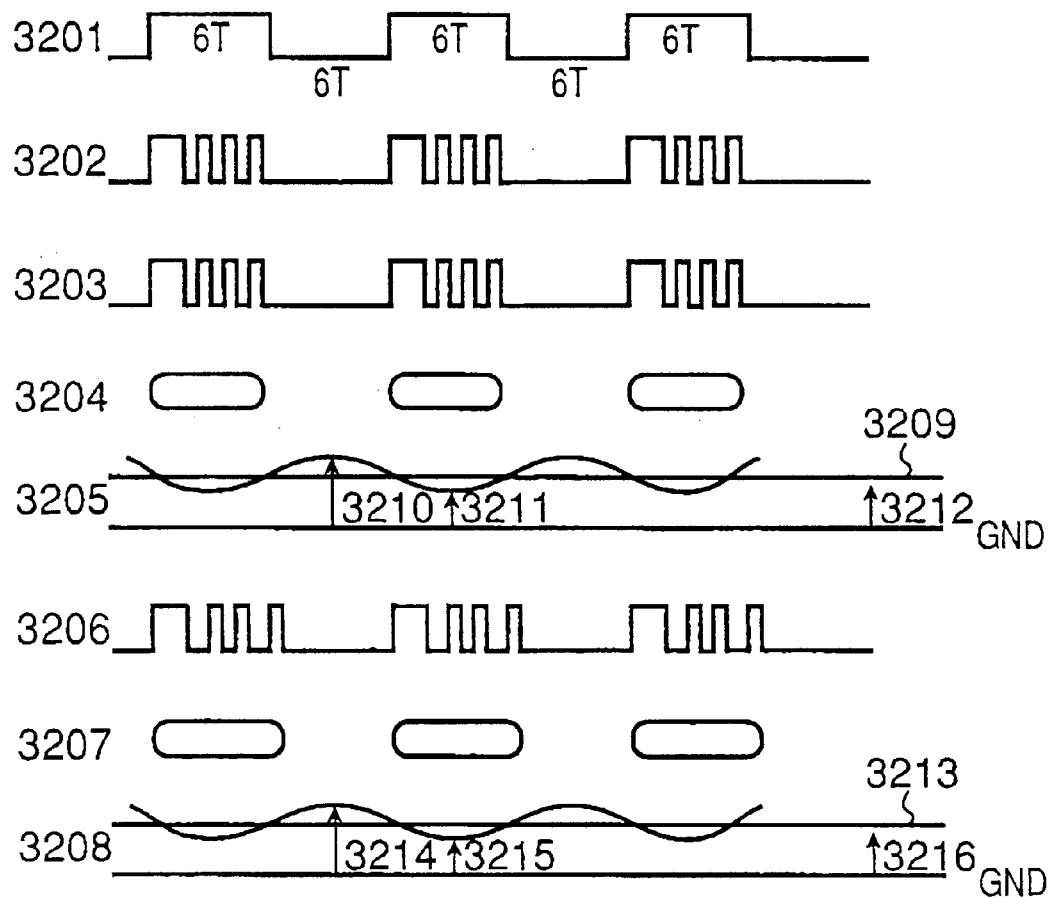
FIGS. 32, 33 and 36 are used to describe signal processing by a method according to a preferred embodiment of the present invention.

It is to be noted that types 5M5S and 5S5M can be corrected using a pattern signal 3201 as shown in FIG. 32, or a default value therefor can be simply defined. It is to be noted that types 5M5S and 5S5M are preferably corrected before the other types. This is because these marks and spaces have the longest period and are therefore affected by thermal interference. The delay period is therefore small, and can be used as a reference value for determining the other delay periods.

It is to be noted that a predetermined initial value is set as shown in FIG. 5 (b) before pattern signal recording. These initial values can be separately determined from experience, or they can be all set to the same value. If the same initial value is used for all, the value, for example, 1 ns, stored for the first pulse movement in a 5S5M pattern in the left table in FIG. 5 (b), for example, is preferably stored for all patterns. In the case of the right table in FIG. 5 (b), the value stored for 5M5S is used. Note, further, that in this case the value set for the 5S5M pattern is determined so that the time between first pulse 401 and multiple pulse 402 is 0.5T as shown in FIG. 4, and the value set for 5M5S is determined so that the time between multiple pulse 403 and the last pulse 404 is 0.5T.

It will also be obvious that the values set for 5S5M and 5M5S can also be determined using other methods. An example is shown in FIG. 32.

As shown in FIG. 32, the pattern signal 3201 of the pattern signal generator 125 in this example has a single period of 6T. Also shown are output signal 3202 from the pulse generator 111; output signal 3203 from the pulse moving circuit 110; and marks 3204 formed in the recording track of the optical disc 101 as a result of modulating laser power output between peak power and bias power levels according to output signal 3203. It is to be noted that while signals 3201, 3202, and 3203 are not generated on the same time base, for convenience they are shown with corresponding parts in each signal aligned vertically.

The pattern signal 3201 in this case represents marks and spaces with a simple 6T period, and thus contains types 5S5M and 5M5S of the eighteen pattern types shown in FIG. 5 (a). The laser is then driven based on drive signal 3203 in FIG. 32 to record the marks 3204. In this exemplary embodiment, pattern signal 3201 in FIG. 32 is repeatedly recorded around one complete circumference of the recording track. When this track is recorded, is then reproduced. Reproduction includes converting an optical signal from the photodetector 108 to an electrical signal, and the processing this electrical signal with preamplifier 112, low pass filter 113, and reproduction equalizer 114. The reproduction signal 3205 from the reproduction equalizer 114 is applied to asymmetry measuring circuit 140 and digitizing circuit 115.

The digitizing circuit 115 adjusts the slice level signal 3209 so that the output level corresponding to a mark and the output level corresponding to a space in the output signal of the digitizing circuit are at equal intervals, and applies this slice level signal 3209 to the asymmetry measuring circuit 140.

The asymmetry measuring circuit 140 compares the average of the high 3211 and low 3210 peak values of the reproduction signal 3205 with the slice level signal 3209. When the difference or ratio therebetween is outside a predetermined range of tolerance, the lengths of the marks 3204 and spaces are not equal. This difference is attributable to a shift in the first pulse and last pulse positions. Initial movement values 5S5MO and 5M5SO are therefore corrected according to the sign of the difference so that, for example, the first pulse and last pulse each move the same time-base distance in opposite directions. The corrected values are then overwritten to memory 129.

It is to be noted that the stored movement values are corrected and overwritten to 5M5S and 5S5M using a single feedback loop (through 110, 109, 108, 112, 115, 140, 129) in the above exemplary embodiment. It will be obvious, however, that a plurality of feedback loops can be alternatively used. As a result, 5S5M and 5M5S values whereby 6T marks can be recorded at the correct length can be obtained. By thus correcting the physical length of a mark used as a reference, marks in other groups can also be recorded at the correct length, and recording with less jitter can be achieved.

The options shown in FIG. 38 are now described.

Figure 15:
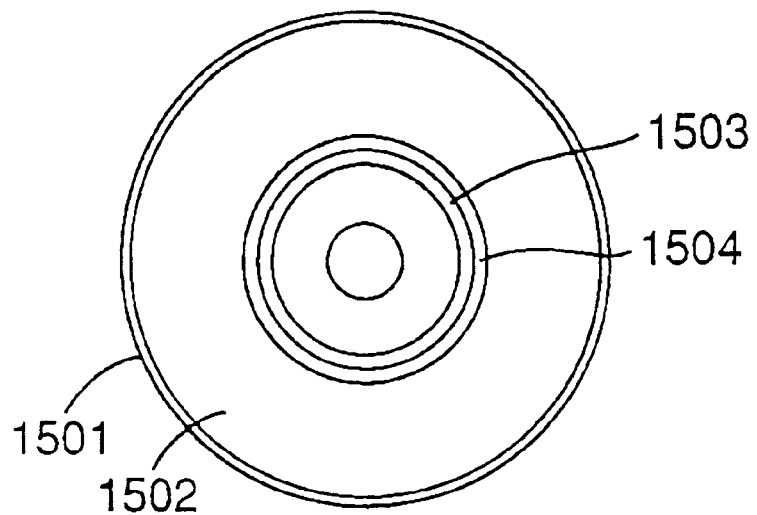

The asymmetry information can likewise be recorded to area 1503 of the optical disc 1501 shown in FIG. 15 in addition to the optimum or typical leading and trailing mark edge positions recorded during manufacture. Generally, it is preferable to have a smaller amount of asymmetry value. The optimum asymmetry value slightly varies relatively to difference discs due to, e.g., the structure of the recording film of the disc.

For example, in FIG. 32, when the calculated result of:

$$((3215+3214)/2 - 3216)/(3215-3214)$$

is 1.05 representing the optimum asymmetric value for the disc measured, the calculated value 1.05 of a further modified value of 1.05 is stored so as to enable precise adjustment of the value to be stored in the settings 5S5M and 5M5S.

The output signal 303 from the pulse moving circuit 110 is input to the laser drive circuit 109 whereby laser power is modulated so that the laser emits at peak power while output signal 303 is high, and emits at bias power while the signal is low, to form a mark sequence 304 as shown in FIG. 3.

During reproduction, the collimator lens 104 converts the laser beam emitted from the semiconductor laser 103 to parallel light, which is then incident on the beam splitter 105. Light passing the beam splitter 105 is focused to a light spot by the object lens 106, and emitted to the optical disc 101.

Light reflected from the optical disc 101 is then collected by the objective lens 106, and passed back to the beam splitter 105. Light reflected by the beam splitter 105 is collected by collective lens 107, and focused on photodetector 108.

The photodetector 108 converts light incident thereon to an electrical signal, which is then amplified by the preamplifier 112. The output signal from the preamplifier 112 is then passed through the low pass filter 113 whereby high frequency signal components are blocked. The reproduction equalizer 114 then equalizes the signal, which is next binarized by the digitizing circuit 115 using a predetermined slice level. A reproduction signal 305 converted to a sequence of 0s and 1s is thus output from the digitizing circuit 115 to the pulse position offset measuring circuit 120. The pulse position offset measuring circuit 120 measures the interval between specific edges or measures edge interval jitter, in this exemplary embodiment the pulse position offset measuring circuit 120 measures the specific edge intervals 321, 322, 323, and 324 in the reproduction signal 305.

If the measured edge interval 321 in FIG. 3 is longer than the normal 9T interval, the setting for last pulse movement 3M5S in FIG. 5 (a) is reduced by the difference between the measured interval 321 and the normal 9T interval from the current setting of 3M5SO by way of bus 126. The setting for first pulse movement 5S3M in FIG. 5 (a) is similarly increased from the current 5S5MO setting by the difference between the edge interval 322 and the normal 9T interval by way of bus 126 if the edge interval 322 is longer than the normal 9T interval. The values stored for 4S5M and 5M4S are likewise corrected based on the measured edge intervals 323 and 324.

When these four settings are updated, the first pattern signal 301 is again recorded and the edge intervals are measured. This process is repeated until the difference between the normal interval and the measured edge interval is below a predetermined threshold level simultaneously for all four edge intervals.

When recording the first pattern signal is completed, a second pattern signal is recorded. Shown in FIG. 6 are second pattern signal 601, which is the output signal from the pattern signal generator 125; output signal 602 from the pulse generator 111; output signal 603 from the pulse moving circuit 110; and mark pattern 604 formed in the recording track of the optical disc 101 based on output signal 603. The first pulse settings 5S4M and 3S5M, and last pulse settings 4M5S and 5M3S in FIG. 5 (a) are then updated using the same method described above using the first specific pattern signal 301.

When recording the second pattern signal is completed, a third pattern signal is recorded. Shown in FIG. 7 are third pattern signal 701, which is the output signal from the pattern signal generator 125; output signal 702 from the pulse generator 111; output signal 703 from the pulse moving circuit 110; and mark pattern 704 formed in the recording track of the optical disc 101 based on output signal 703.

In FIG. 7, the 10T period of 710 and 711 (a 6T space and 4T mark) and the 10T period of 712 and 713 (a 4T mark and 6T space >>712 is a 4T SPACE and 713 is a 6T MARK in FIG. 7) overlap and appear as a continuous wave. Measures signal 710–711 and the next measured signal 712–713 therefore overlap, and it is difficult to accurately separate and analyze the measured signals. Utilizing the fact that jitter is minimized if the two 10T periods are substantially the same length, a jitter meter can therefore be substituted for measurement. Other than these signal periods, the same method used with the first pattern is applied to set and update the first pulse settings 4S4M and 3S3M, and last pulse settings 4M4S and 3M3S in FIG. 5 (a).

The conditions obtaining the least edge jitter with this third pattern signal and the correct edge interval time are the same. For example, if edge intervals 729 and 730 occur at the correct 9T time interval, jitter at a 9T edge interval will also be the lowest. Therefore, if either edge interval is offset from the normal 9T time, jitter at a 9T edge interval will increase.

When recording the third pattern signal is completed, a fourth pattern signal is recorded. Shown in FIG. 8 are fourth pattern signal 801, which is the output signal from the pattern signal generator 125; output signal 802 from the pulse generator 111; output signal 803 from the pulse moving circuit 110; and mark pattern 804 formed in the recording track of the optical disc 101 based on output signal 803. The first pulse setting 4S3M and last pulse setting 4M3S in FIG. 5 (*a*) are updated using the same method used with the first pattern signal.

When recording the fourth pattern signal is completed, a fifth pattern signal is recorded. Shown in FIG. 9 are fifth pattern signal 901, which is the output signal from the pattern signal generator 125; output signal 902 from the pulse generator 111; output signal 903 from the pulse moving circuit 110; and mark pattern 904 formed in the recording track of the optical disc 101 based on output signal 903. The first pulse setting 3S4M and last pulse setting 3M4S in FIG. 5 (*a*) are updated using the same method used with the fourth pattern signal.

It is therefore possible with the method according to this preferred embodiment to compensate during recording for the effects of heat accumulation and thermal interference during recording, and thus record a mark/space pattern with little jitter, by determining before data recording the mark start position from the length of the recorded mark and the length of the space preceding the mark, and determining the mark end position from the length of the recorded mark and the length of the space following thereafter.

It is also possible to determine the optimum mark start and mark end positions for a specific combination of optical disc and disc recorder because the disc recorder performing the actual recording operation determines the optimal mark start and edge positions through a test recording operation.

Furthermore, this preferred embodiment of the present invention records first through fifth specific test patterns to determine the pulse position offset whereby edge intervals occur at the correct time interval and jitter is minimized. It will be obvious to one with ordinary skill in the related art, however, that other specific test patterns or adjustment methods can be alternatively used insofar as the test recording enables the mark start and end positions to be determined according to the input signal.

As noted above, the first pulse setting 5S5M and last pulse setting 5M5S used for marks and spaces of 5T and longer are applicable to all marks before pattern signal recording. However, as indicated by the three first pulse positions settings 5S5M, 4S5M, and 3S5M, the mark length is the same in each setting and only the length of the preceding space differs. There is therefore a simple comparative relationship between the three settings, that is: 5S5M<4S5M<3S5M, or 5S5M>4S5M>3S5M.

Figure 10:
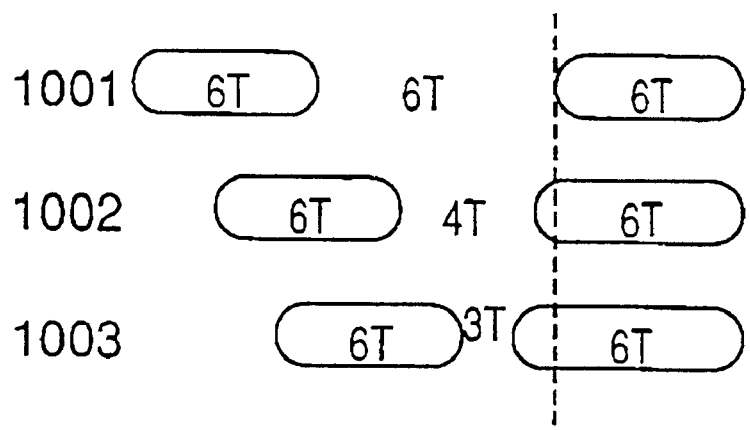
FIGS. 10 and 11 are used to describe interpolation of the initial values used for edge position adjustment according to a preferred embodiment of the present invention.

Fig. 10 shows marks formed when the first pulse settings are in the relationship 5S5M<4S5M<3S5M. Note that as the space becomes shorter, heat from the preceding mark travels through the space, resulting in the leading edge of the following mark being formed earlier and the length of the mark to increase.

Figure 11:
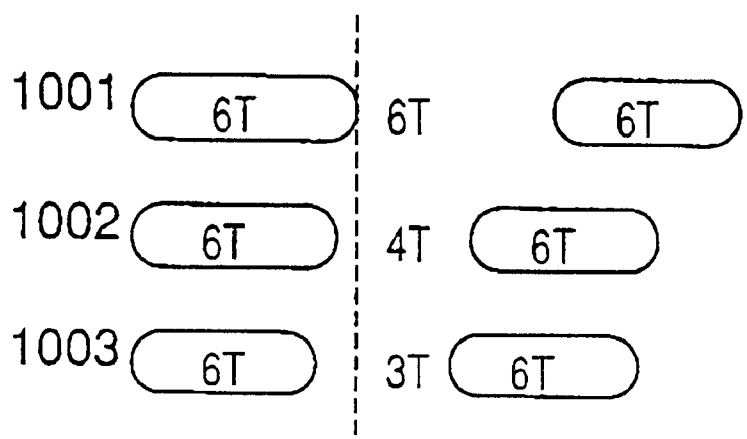

FIG. 11 shows marks formed when the last pulse settings are in the relationship 5S5M<4S5M<3S5M. Note that as the space becomes shorter, heat from the following mark travels back through the space to the preceding mark, thus retarding cooling at the trailing edge of the preceding mark and resulting in mark elongation.

It should be noted that the direction and degree of change in the mark start and end positions as a result of different space lengths depends on the disc structure and composition of the recording film. However, by using the above-noted simple relationship between the first and last pulse settings, it is possible to reduce the number of test recordings needed to determine the optimum settings. For example, once the 5S5M and 3S5M settings are determined for the first pulse position, the average of these two settings can be substituted for the initial 4S5M setting used in the test recording sequence for determining the optimum 4S5M setting.

Once the 5S4M and 5S5M first pulse position settings are determined, it is likewise possible to substitute the 4S4M setting for the initial 3S4M setting, of if 5S4M<4S4M, for example, to use the difference between 4S4M and 5S4M subtracted from the 4S4M setting for the initial 3S4M setting to reduce the number of test recordings needed to determine the optimum setting for 3S4M.

It is thus possible to reduce the number of necessary test recordings needed to determine the optimum settings by utilizing the vertical relationship shown in the table in FIG. 5 (*a*) between the settings.

It should be further noted that while the present preferred embodiment of the invention describes shifting the first and last pulse positions according to specific combinations of marks and spaces to be recorded, the present invention shall not be so limited. It is also possible, for example, to apply the same method of the present invention to optimize pulse width in a recording method in which the first and last pulse width is adjusted. This is further described below with reference to FIG. 12.

Figure 12:
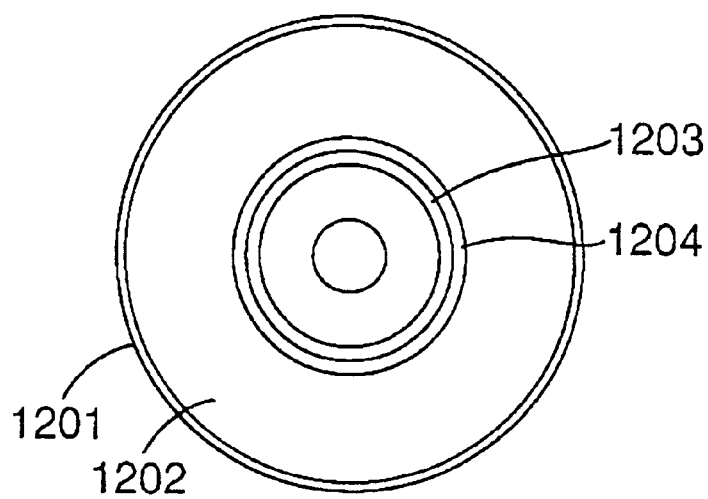
FIGS. 12 to 18 are plan views of exemplary optical discs according to preferred embodiments of the present invention.

FIG. 12 is a plan view of an optical disc 1201. In this exemplary embodiment user data is recorded to data area 1202. Information indicative of the method used to adjust the first pulse and last pulse according to the input data signal is recorded to area 1203 at the inside circumference area of the disc using a sequence of pits and lands (marks and spaces). Between the data area 1202 and adjustment method recording area 1203 is a test recording area 1204. Using this disc format, it is possible to determine whether recording is optimized by moving the first and last pulse positions, or by varying the first and last pulse width, by reading the adjustment method recording area 1203 before starting test recording.

Figure 13:
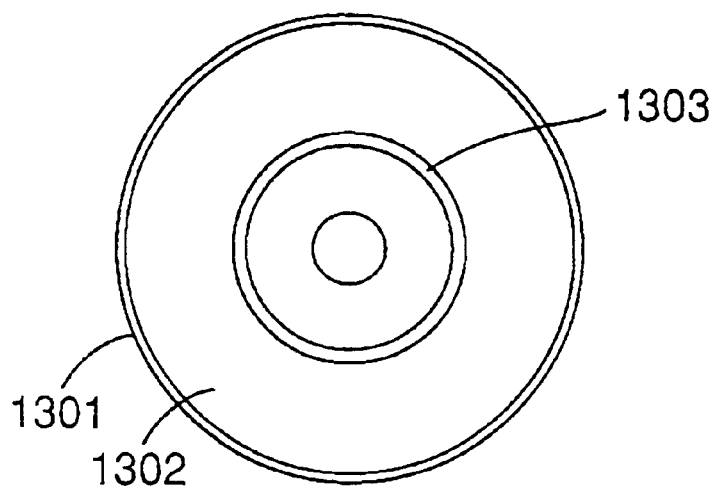

Operation when an optical disc 1301 formatted as shown in FIG. 13 is loaded into a disc recorder as shown in FIG. 1 is described next below.

The optical disc 1301 has a user data area 1302 and an area 1303 for recording at the time of disc production either an optimized or typical pulse position value for either the leading or trailing mark edge. More specifically, area 1303 records either the first drive pulse position Tu or last drive pulse position Td value. Note further that area 1303 is recorded at the inside circumference of the disc using a sequence of pits and lands (marks and spaces).

When this optical disc 1301 is loaded into the disc recorder, the optical head moves to area 1303 to read the optimum position information for the leading and trailing mark edges. The read data signal 128 is then input to the memory 129, and the optimum position information for the leading and trailing mark edges is set in the pulse moving circuit 110 via bus.

By thus reproducing the leading and trailing mark edge position information optimized for an input signal from area 1303 of the optical disc 1301 and setting up the disc recorder for recording based on this information, optimized recording can be achieved with optical discs having different formats and recording films without first performing the test recording operation described above.

It will be further obvious that this optimized position information recorded to area 1303 need not be obtained for all discs that can be used in the recorder. That is, if the variation between discs is sufficiently small, the values obtained for one disc can be prerecorded as typical optimized position information for other discs having the same format and recording film composition.

Figure 14:
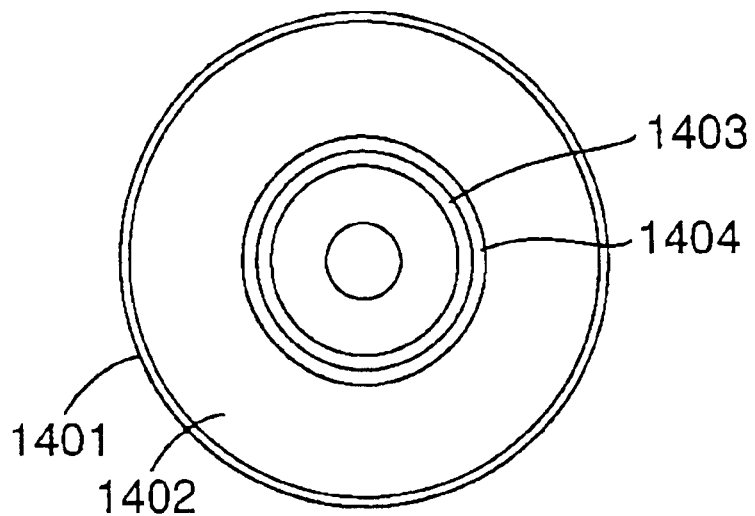

FIG. 14 is a plan view of another optical disc 1401. With this disc user data is recorded to data area 1402. Information indicative of the method used to adjust the first pulse and last pulse according to the input data signal is recorded to area 1403 at the inside circumference area of the disc using a sequence of pits and lands (marks and spaces). Recording area 1404 at the inside circumference of the disc is used during disc production to record either optimized or typical position information for the first or last mark edge position using a sequence of pits and lands (marks and spaces). Using this disc format, it is possible to determine whether recording is optimized by moving the first and last pulse positions, or by varying the first and last pulse width, by reading area 1403.

It is to be noted that if there are differences in the disc recorder affecting data recording, for example, variations in the shape of the light spot incident on the optical disc, the leading and trailing mark edge positions needed for optimized recording will also differ. In this case the optimized or typical values stored to a particular area of the disc during disc production can be used as the initial values used in a test recording operation. Compared with starting test recording using a uniform default value regardless of differences in disc format and recording film composition, the number of test patterns recorded and the time required for determining the optimum mark edge positions for data recording can be reduced in this case by starting the optimization operation with the optimum or typical values prerecorded during disc production. This is further described below with reference to FIG. 15.

FIG. 15 is a plan view of another optical disc 1501. With this disc format user data is recorded to data area 1502. Recording area 1503 at the inside circumference of the disc is used during disc production to record either optimized or typical position information for the first or last mark edge position using a sequence of pits and lands (marks and spaces). Between the data area 1502 and area 1503 is a test recording area 1504. With this format the information recorded to area 1503 is read first and test recording is then performed in area 1504 to record with greater optimization than is possible if recording is optimized using a single setting.

Figure 16:
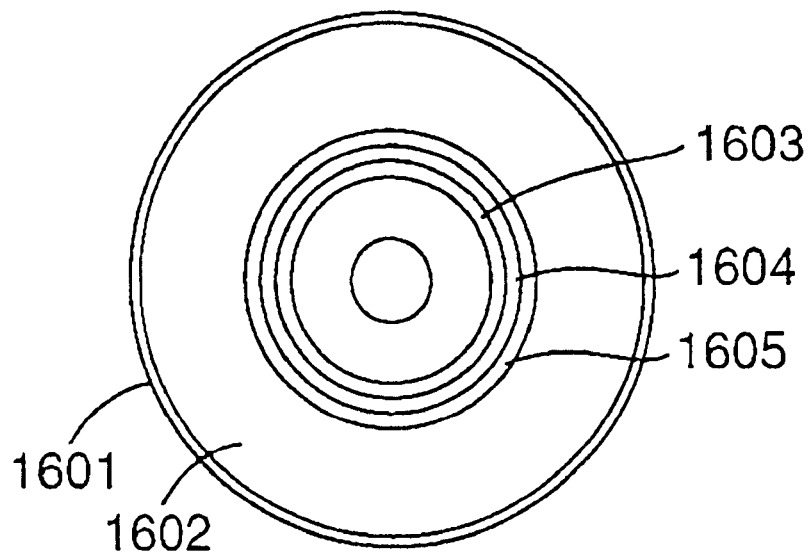

FIG. 16 is a plan view of yet another optical disc 1601. With this disc format user data is recorded to data area 1602. Information indicative of the method used to adjust the first pulse and last pulse according to the input data signal is recorded to area 1603 at the inside circumference area of the disc using a sequence of pits and lands (marks and spaces). Recording area 1604 at the inside circumference of the disc is used during disc production to record either optimized or typical position information for the first or last mark edge position using a sequence of pits and lands (marks and spaces).

Area 1603 can be read with this disc format to determine whether recording is optimized by moving the first and last pulse positions, or by varying the first and last pulse width.

Between the data area 1602 and area 1604 is a test recording area 1605. With this format areas 1603 and 1604 can be read first and test recording then performed in area 1605 to record with greater optimization than is possible if recording is optimized using a single setting.

Figure 17:
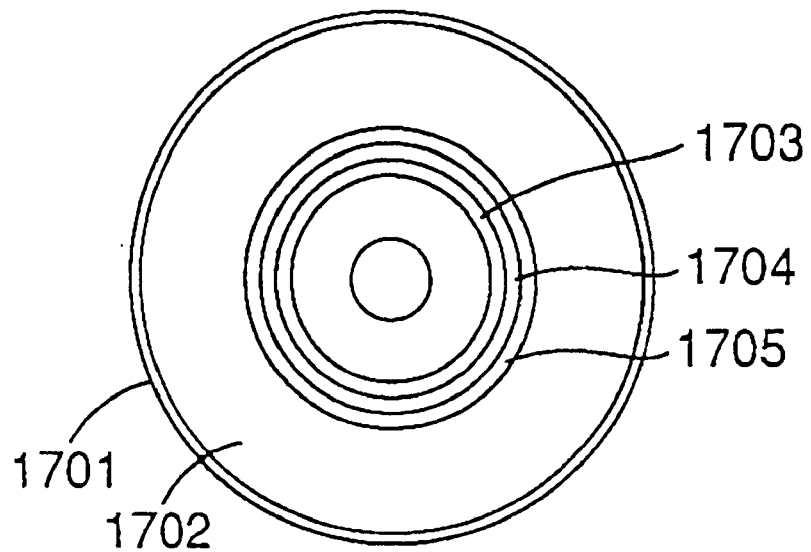

Operation when an optical disc 1701 formatted as shown in FIG. 17 is loaded into a disc recorder as shown in FIG. 1 is described next below.

This optical disc 1701 has a user data area 1702 and an area 1703 at the inside circumference of the disc for recording at the time of disc production either optimized or typical position information (general or default) for the first or last mark edge position using a sequence of pits and lands (marks and spaces). Area 1704 is a test recording area. Area 1705 is used for recording the optimized leading and trailing mark edge positions determined by the test recording operation, that is, the result of the test recording operation.

Further preferably in this case information specific to the disc recorder that performed the test recording is also recorded to area 1705. This recorder-specific information typically includes the name of the disc recorder manufacturer, product number, where the disc recorder was manufactured, and the date of manufacture.

By thus recording the optimized results of the test recording and information specific to the recorder whereby these optimized recording values are determined to area 1705, this information can be reproduced when the optical disc 1701 is subsequently loaded into a disc recorder. If the disc recorder is the same as that by which the information was recorded, the optimized leading and trailing mark edge position information can be read directly from disc, and optimized recording reflecting the specific characteristics of that disc recorder can be achieved without requiring another test recording operation.

It will also be obvious that a plurality of sets of test recording results and recorder-specific information can be recorded to area 1705.

Furthermore, when this optical disc 1701 is loaded in a disc recorder for data recording, area 1705 is reproduced to obtain the specifically optimized leading and trailing mark edge position information, and test recording is then performed in area 1704, the number of signal patterns that must be repeatedly recorded to determine the optimum edge positions can be reduced, and the time required for such optimization can be reduced, compared with test recording operations using either a unique edge position setting or the mark and space sequence of optimized or typical leading and trailing mark edge positions prerecorded during disc production.

Figure 18:
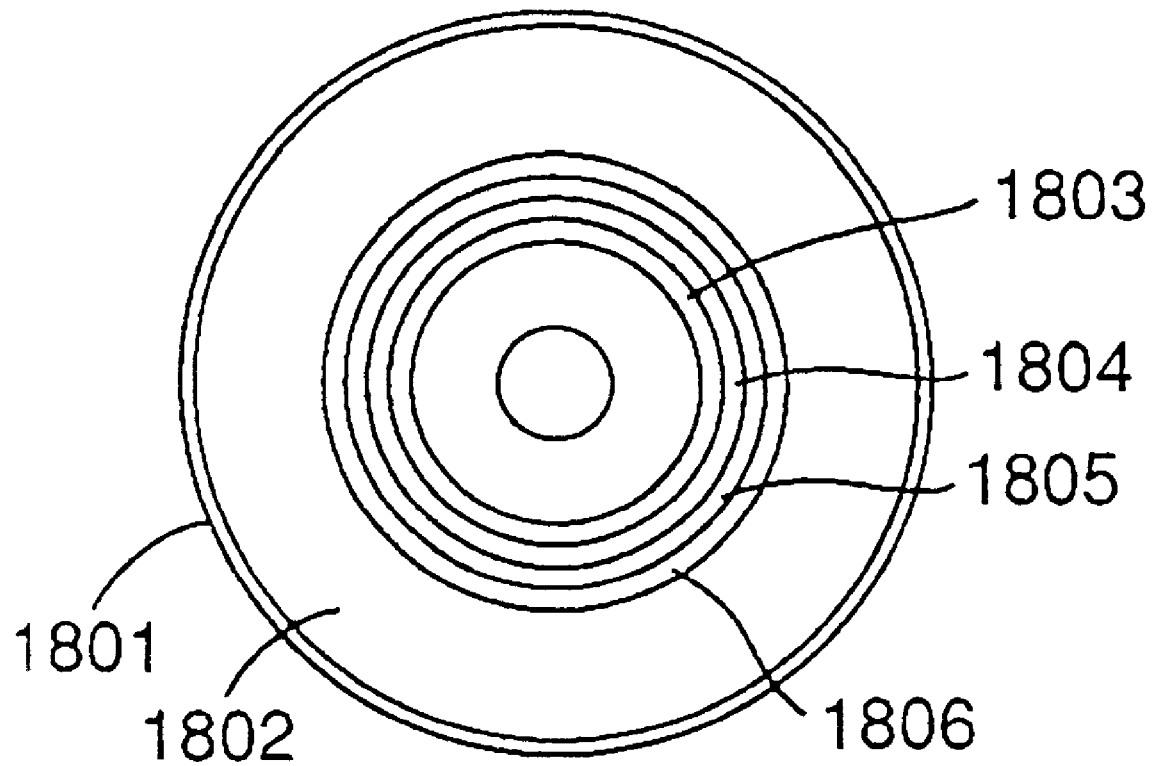

FIG. 18 is a plan view of yet another optical disc 1801. This optical disc 1801 has a user data area 1802; an area 1803 at the inside circumference of the disc for recording information indicative of the method used to adjust the first pulse and last pulse according to the input data signal using a sequence of pits and lands (marks and spaces); an area 1804 at the inside circumference of the disc for recording at the time of disc production either optimized or typical position information (general) for the first or last mark edge position using a sequence of pits and lands (marks and spaces); a test recording area 1805; and an area 1806 for recording the optimized leading and trailing mark edge position determined by the testing recording operation, that is, the result of the test recording operation.

With an optical disc 1801 thus formatted, area 1803 can be read to determine whether recording is optimized by moving the first and last pulse positions, or by varying the first and last pulse width.

Further preferably in this case information specific to the disc recorder that performed the test recording is also recorded to area 1806. This recorder-specific information typically includes the name of the disc recorder manufacturer, product number, where the disc recorder was manufactured, and the date of manufacture.

By thus recording the optimized results of the test recording and information specific to the recorder whereby these optimized recording values are determined to area 1806, this information can be reproduced when the optical disc 1801 is subsequently loaded into a disc recorder. If the disc recorder is the same as that by which the information was recorded, the optimized leading and trailing mark edge position information can be read directly from disc, and optimized recording reflecting the specific characteristics of that disc recorder can be achieved without requiring another test recording operation.

It will also be obvious that a plurality of sets of test recording results and recorder-specific information can be recorded to area 1806.

The formats of the optical discs shown in FIG. 2 and FIG. 12 through FIG. 18 are summarized in the table in FIG. 38. Information shown as optionally added in the table in FIG. 38 is described below.

In addition to optimization method information, area 1203 in optical disc 1201 shown in FIG. 12 can store information specific to the optical disc 1201, such as the manufacturer's name, product number, date and place of production, disc format, and recording film composition. In this case this disc-specific information and the leading and trailing mark edge position information obtained by test recording are stored to memory 130 of the disc recorder.

When a new optical disc is loaded, this disc-specific information and mark edge position information is read and stored to memory 130. Disc-specific information and mark edge position information for various discs, that is, discs from different manufacturers and different versions of a disc, is thus accumulated in memory 130.

When a disc that was previously loaded and recorded to by the disc recorder is again loaded, the disc-specific information is read from area 1203 of the loaded disc and used to reference the matching disc-specific information in memory 130 to fetch therefrom the matching specific mark edge position information. This eliminates the need for repeatedly recording signal patterns to determine the optimum position information, or reduces the number of test recording operations required, and in both cases shortens the required optimization time.

In addition to the leading and trailing mark edge position information, area 1503 in optical disc 1501 shown in FIG. 15 can store information specific to the optical disc 1501, such as the manufacturer's name, product number, date and place of production, disc format, and recording film composition. In this case this disc-specific information and the leading and trailing mark edge position information obtained by test recording are stored to memory 130 of the disc recorder.

When a disc that was previously loaded and recorded to by the disc recorder is again loaded, the disc-specific information if read from area 1503 of the loaded disc and used to reference the matching disc-specific information in memory 130 to fetch therefrom the matching specific mark edge position information. This eliminates the need for repeatedly recording signal patterns to determine the optimum position information, or reduces the number of test recording operations required, and in both cases shortens the required optimization time.

In addition to the optimization method information, area 1603 in optical disc 1601 shown in FIG. 16 can also store the above-noted information specific to the optical disc 1601. In this case this disc-specific information and the leading and trailing mark edge position information obtained by test recording are stored to memory 130 of the disc recorder.

When a disc 1601 that was previously loaded and recorded to by the disc recorder is again loaded, the disc-specific information is read from area 1603 of the loaded disc and used to reference the matching disc-specific information in memory 130 to fetch therefrom the matching specific mark edge position information. Again, this eliminates the need for repeatedly recording signal patterns to determine the optimum position information, or reduces the number of test recording operations required, and in both cases shortens the required optimization time.

In addition to the leading and trailing mark edge position information, area 1703 in optical disc 1701 shown in FIG. 17 can also store the above-noted information specific to the optical disc 1701. In this case this disc-specific information and the leading and trailing mark edge position information obtained by test recording are stored to memory 130 of the disc recorder.

When a disc 1701 that was previously loaded and recorded to by the disc recorder is again loaded, the disc-specific information is read from area 1703 of the loaded disc and used to reference the matching disc-specific information in memory 130 to fetch therefrom the matching specific mark edge position information. Again, this eliminates the need for repeatedly recording signal patterns to determine the optimum position information, or reduces the number of test recording operations required, and in both cases shortens the required optimization time.

In addition to the optimization method information, area 1803 in optical disc 1801 shown in FIG. 18 can also store the above-noted information specific to the optical disc 1801. In this case this disc-specific information and the leading and trailing mark edge position information obtained by test recording are stored to memory 130 of the disc recorder.

When a disc 1801 that was previously loaded and recorded to by the disc recorder is again loaded, the disc-specific information is read from area 1803 of the loaded disc and used to reference the matching disc-specific information in memory 130 to fetch therefrom the matching specific mark edge position information. Again, this eliminates the need for repeatedly recording signal patterns to determine the optimum position information, or reduces the number of test recording operations required, and in both cases shortens the required optimization time.

A disc format according to this preferred embodiment of the present invention is described next with reference to FIG. 34 and FIG. 35. It is to be noted that FIGS. 34 and 35 together show a single disc format table starting from the pit area and mirror area at the inside circumference of the disc at the top of the table in FIG. 34 and proceeding to the recording area continuing from FIG. 34 to the outside circumference of the disc in FIG. 35.

The pit area comprises an initialization zone and a control data zone on the outside circumference side of the initialization zone. The initialization zone at the inside circumference of the disc prevents the servo from going completely off track if the optical head happens to move to the inside circumference side of the target address. The control data zone stores disc-specific information such as the disc type, read power level, pulse adjustment method, temporary power and operational power level information, first and last pulse position information, the optical disc manufacturer, lot number, and product number. The content of the control data zone is typically recorded a plurality of times to prevent the disc from becoming unreadable as a result of scratches or soiling.

The mirror area simply links the pit area with the data recording area. Nothing is recorded to the mirror area and no signals are reproduced therefrom. It is therefore easy to detect if the optical head passes over the mirror area, and the optical head can therefore be more accurately positioned to a specific location on the disc.

The recording area comprises guard track zone 1, disc test zone 1, drive test zone 1, recorder-specific information recording zone 1, disc error management area 1, the data area, disc error management area 2, recorder-specific information recording zone 2, drive test zone 3, disc test zone 2, and guard track zone 2.

The servo may still be unstable immediately after leaving the mirror zone. The guard track zone 1 is therefore blank.

The disc test zone 1 is used by the disc manufacturer. The power level used for recording and the optimum pulse position information are determined using this disc test zone 1.

The drive test zone 1 is used by the disc recorder. By separating the disc test zone and drive test zone, the disc manufacturer can record other desirable information to the disc test zone.

The recorder-specific information recording zone 1 is the area to which data specific to a new disc recorder is recorded each time the disc is loaded into a new disc recorder for recording. When the disc is loaded into a disc recorder, recorder-specific information 1–n is read from the recorder-specific information recording zone 1 to determine whether data specific to that disc recorder is already stored in the recorder-specific information recording zone 1. The recorder-specific information of the disc recorder to which the optical disc is loaded is also contained in memory 130. A CPU (not shown in the figures) controlling the memory 130 can determine whether the same recorder-specific information is already present.

If the same information has not already been recorded, that is, if the disc is loaded into a new disc recorder, the recorder-specific information, temporary power and operational power level information, and pulse position information are stored as one data set to the recorder-specific information recording zone 1. From several seconds to ten several seconds may be required to determine the temporary power and operational power level information and pulse position information in this case by means of a test recording operation.

If the same information has already been recorded, that is, if the disc has been previously used in the same disc recorder, the temporary power and operational power level information and pulse position information belonging to the recorder-specific information data set identical to the data read from the recorder-specific information recording zone 1 is read from memory. This temporary power and operational power level information is then sent to memory 132, and the pulse position information is sent to memory 129. It is to be noted that because this information can be read directly from disc, the several seconds to ten several seconds needed for a test recording operation to determine this information can be saved.

If a disc thus formatted is written to by n different disc recorders, n sets of recorder-specific information, temporary power and operational power level information, and pulse position information will be recorded to the disc. In a preferred embodiment of the present invention these n data sets are recorded to a plurality of locations on the disc, such as at the inside circumference and outside circumference of the disc. By thus recording the data sets to more than one disc location, a scratch or soiling preventing reading the data from one location does not completely disable the disc because the data can be read from the other location. It is also possible to record the same information a plurality of times to the recorder-specific information recording zone 1.

If the recorder-specific information is read and the disc recorder determines that the optical disc was previously written to by that disc recorder, the content recorded for the test recording operation can be simplified. Information unique to a particular combination of disc recorder and optical disc is recorded a plurality of times to prevent problems arising from the data becoming unreadable as a result of scratches or soiling. The recorder-specific information recording zone also reserves areas for recording this information by a plurality of disc recorders. This is because there are minute differences in laser power in different disc recorders.

The disc error management area 1 is reserved for managing disc errors.

The data areas is for recording user data.

Disc error management area 2 is likewise reserved for managing disc errors.

The recorder-specific information recording zone 2 stores the same information stored to recorder-specific information recording zone 1, that is, information unique to a particular combination of optical disc and disc recorder by which the optical disc was recorded. By providing a recorder-specific information recording zone at both the inside circumference and outside circumference sides of a disc, the information can be reproduced from one area when it cannot be reproduced from the other area as a result of disc damage or soiling.

The drive test zone 2 is used for test recording by the disc recorder in the same manner as drive test zone 1. By providing a drive test zone at both the inside circumference and outside circumference sides of a disc, the information can be reproduced from one area when it cannot be reproduced from the other area as a result of disc damage or soiling. If the disc is greatly warped, it is also possible to perform the test recording operation at both inside and outside circumference zones to interpolate the best recording parameters based on a particular radical position.

The disc test zone 2 is also used for test recording operations by the disc manufacturer in the same manner as disc test zone 1. By providing a disc test zone at both the inside circumference and outside circumference sides of a disc it is possible to determine the effect of disc warpage on recording, and use this information as an inspection and shipping standard.

Guard track zone 2 is also blank and is not used for recording. By providing guard track zone 2 at the outside circumference edge of the disc, it is possible to prevent the servo from going completely off track if the optical head happens to move beyond the target address.

The above-described disc zones and recording areas are managed using their disc address, which the disc recorder reads and used to determine the disc layout and zone/area locations.

The relationship between these zones an areas and the areas shown in FIG. 2 and FIGS. 12 to 18 is shown in FIG. 38.

It is to be noted that information specific to the data storage area 201, that is, the disc manufacturer, product number, production date and location, disc format, and recording film type, can also be recorded to the optical disc shown in FIG. 2. It will also be obvious that in this case the disc-specific information as well as the leading and trailing mark edge position information are stored to memory 130 of the disc recorder.

When a disc that was previously loaded and recorded to by the disc recorder is again loaded, the disc-specific information is read from the loaded disc and used to reference the matching disc-specific information in memory 130 to fetch therefrom the matching specific mark edge position information. This eliminates the need for repeatedly recording signal patterns to determine the optimum position information, or reduces the number of test recording operations required, and in both cases shortens the required optimization time.

It is to be noted that in the above-described preferred embodiments the optimum leading and trailing mark edge positions are determined by test recording, but this test recording operation can be preceded by an operation for optimizing the output power levels, including both peak power and bias power levels, of the laser beam used for the test recording operation. The laser power level thus optimized before mark edge positions are optimized is referred to herein as the "temporary power level." This is in contrast to the operational power level, which is the laser power level optimized after optimizing the mark edge positions.

The temporary power level is the power level used to determine the optimum leading and trailing mark edge positions. The operational power level is the power level used for actual recording in the data area. Variations in laser power from the optimum emission level cause various problems. These problems are described below.

The optimum leading and trailing mark edge positions depend on various optical disc characteristics as well as the laser power used for test recording. If laser power changes greatly, the optimum leading and trailing mark edge positions cannot be determined, even if they are determined, recording quality will be poor. The reason for this is described with reference to FIG. 19.

Figure 19:
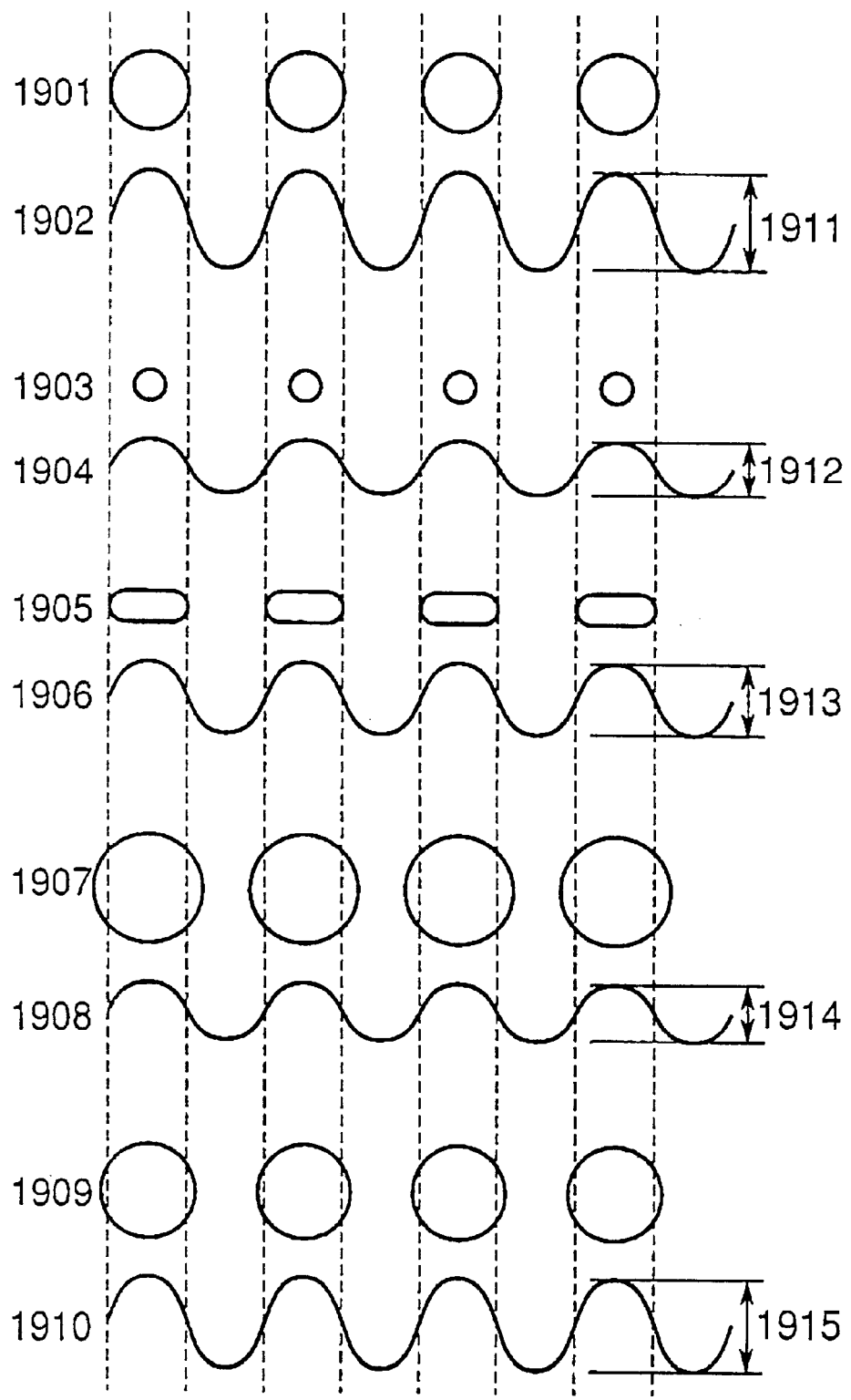
FIG. 19 is used to describe determining the temporary power emission level before edge position adjustment according to a preferred embodiment of the present invention.

FIG. 19 shows mark shapes and the resulting reproduction signal when a 3T signal, that is, the shortest mark length signal is recorded with different laser power levels. Marks 1901 result from an optimized laser power setting. Note the mark length and space length are substantially equal. The amplitude 1911 of the resulting reproduction signal 1902 is therefore high.

Marks 1903 result from a too-low laser power setting. Note that mark length is shorter than the space length. Because mark and space length is not the same, the amplitude 1912 of the resulting reproduction signal 1904 is lower than amplitude 1911.

Marks 1905 result when the laser is driven at the power level used to produce marks 1903 but the emission time is longer than that producing marks 1903. By thus increasing emission time, mark length and space length are made substantially equal, but the mark width is narrower than that of marks 1901 formed at the optimized laser power setting. The amplitude 1913 of the resulting reproduction signal 1906 is therefore lower than amplitude 1911.

Marks 1907 result from a too-high laser power setting. Note that marks are longer than the spaces. Because mark and space length is not the same, the amplitude 1914 of the resulting reproduction signal 1908 is lower than amplitude 1911.

Marks 1909 result when the laser is driven at the power level used to produce marks 1907 but the emission time is shorter than that producing marks 1907. By thus decreasing emission time, mark length and space length are more nearly equal, but the high laser power setting prevents formation of equal length marks and spaces. The amplitude 1915 of the resulting reproduction signal 1910 is therefore lower than amplitude 1911.

It will thus be obvious that when laser power is low, the resulting marks cannot be formed with sufficient width, and when laser power is high the marks and spaces cannot be formed with the same length. As a result it may not be possible to achieve optimal recording results. By determining the best laser power setting before the test recording operation for determining the best leading and trailing mark edge positions, optimized data recording can be more reliably achieved.

It is necessary to determine both the peak and bias power levels. A preferred method for determining the peak power level is described first below.

When a optical disc 101 is loaded, the optical head moves to writing test zone 202 for determining the best power level. Switch 121 is conductive through contacts 122 and 124 at this time.

The power level setting circuit 119 first sets the default peak and bias power levels to the laser drive circuit 109. The output signal from unique pattern generator 127a of the recording data generator 127 is then modulated by the modulation circuit 126, and passed through switch 121 to the pulse generator 111 for conversion to a pulse signal. This pulse signal is then passed through delay circuit 138 to the pulse moving circuit 110 from which a signal in which the leading and trailing pulse edges are shifted is output.

Signal patterns output from the modulation circuit 126 are shown in FIG. 20. These signal patterns can be prestored to the optical disc or in the disc recorder.

FIG. 20(a) shows the sector format of the optical disc 101, comprising a data storage area 201, writing test zone 202, track 2001, addresses 2002 and 2003, and sectors 2004.

The format of sectors 2004 is shown in FIG. 20(b). Each sector 2004 comprises main data 2006 and a VFO signal 2005 for PLL 116 synchronization (see FIG. 1). The VFO signal has a simple 4T period.

The main data 2006 comprises a plurality of frames 2007, 2008, 2009. Each frame comprises a synchronization mark for synchronizing the start of data reproduction, a DSV compensation pattern 2011 for resetting the DSV to 0, and a simple 3T pattern signal 2012. Note that the DSV is the difference of marks and spaces within a specific period in the sync mark. A typical 3T pattern signal 2012 is shown in FIG. 20(c). Note that by resetting the DSV of the recording signal pattern to 0, the DSV compensation pattern 2011 enables the signal pattern to be correctly digitized during reproduction.

It is to be noted that while simple 3T pattern signals are frequently used in this exemplary embodiment of the invention, a 4T or other pattern signal can be used in place of the 3T pattern signal 2012 insofar as the signal has a simple repeating pattern. By recording such a simple pattern signal, an appropriate laser power setting can be determined even when the optimum leading and trailing mark edge positions are not yet determined and recording quality will therefore be low using a random pattern signal. Note, further, that the memory required for data comparator 131 can be reduced by comparing signals before and after modulation.

If a 4T pattern signal is used in place of a 3T pattern signal 2012, the VFO signal will also have a 4T period, thereby preventing asymmetry between the VFO signal part and the main data, and enabling more accurate digitization.

It is to be noted that while signals containing a simple 3T pattern are frequently used in this exemplary embodiment, patterns comprising signal groups contained in a signal type having the same optimum adjustment of leading and trailing mark edge positions cam be alternatively used. By recording signal groups from the same signal type, an appropriate laser power setting can be determined even when the optimum leading and trailing mark edge positions are not yet determined are recording quality will therefore be low using a random pattern signal containing all signal types.

The output signal from pulse moving circuit 110 is input to the laser drive circuit 109, which drives the semiconductor laser to emit at peak and bias power levels according to this output signal and thereby form a sequence of marks on the disc.

When recording ends the mark sequence is reproduced, and the output signal from demodulation circuit 117 is input to the data comparator 131. The output signal from unique pattern generator 127a is also input to data comparator 131. The data comparator 131 thus compares the recording data and the reproduced data and detects, for example, a byte error rate (BER).

Figure 21:
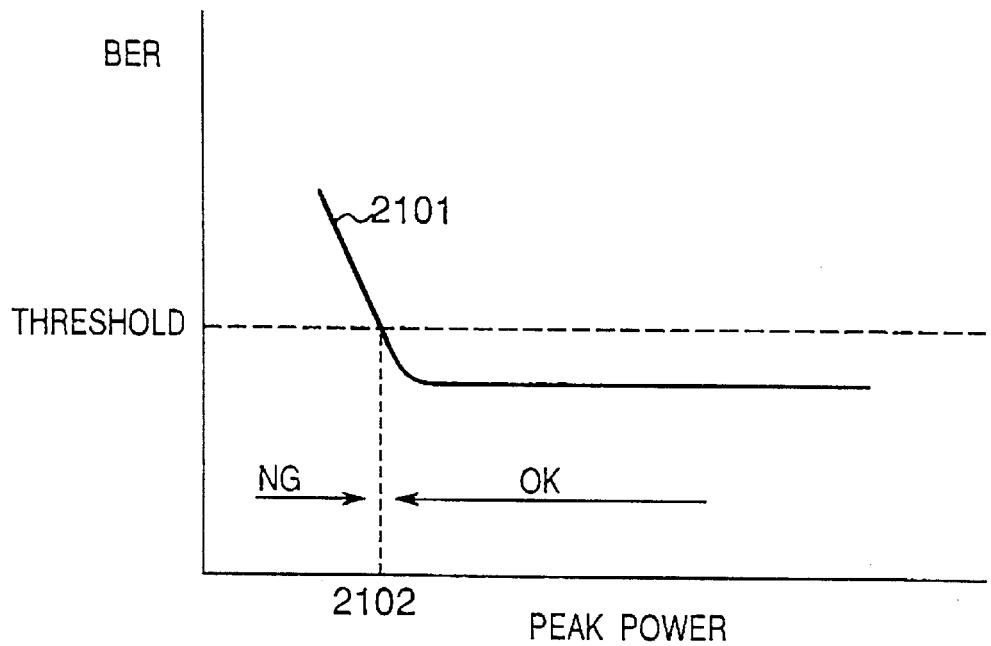
FIG. 21 is used to describe a method for determining the peak power level before edge position adjustment according to a preferred embodiment of the present invention.

FIG. 21 shows the relationship between peak power and BER. Peak power is on the X axis and BER on the Y axis in FIG. 21. If reproduction conditions are equal, a low BER generally indicates more accurate recording. Bias power is therefore fixed and the peak power varied while this record and reproduce loop is repeated to find the peak power 2102 (typically approximately 8 mW) at which the BER reaches a specific threshold value. A predefined martin is then added to this peak power 2102 level to set the peak power level, typically approximately 10 mW. It is to be noted that by appropriately controlling this added margin the peak power level can be optimized for the test recording operation determining the optimum leading and trailing mark edge positions. Note, further, that this margin can be applied to the peak power level obtaining a BER of a particular threshold value by multiplying the peak power level by a margin constant (such a 1.2) or adding thereto a margin constant such as 2 mW.

A method for determining bias power is described next. The peak power setting determined by the power level setting circuit 119 as described above and the initial bias power setting are first set to the laser drive circuit 109. The modulation circuit 126 then outputs a random signal according to the random pattern signal from the random pattern generator 127b of the recording data generator 127, and the pattern is recorded using the above power settings. The modulation circuit 126 then generates a signal containing many 3T patterns according to a signal from the unique pattern generator 127a of the recording data generator 127, and this pattern is recorded using the above power settings.

When recording ends the mark sequence is reproduced, and the output signal from demodulation circuit 117 is input to the data comparator 131. The output signal from recording data generator 127 is also input to data comparator 131. The data comparator 131 thus compares the recording data and the reproduced data and detects, for example, a byte error rate (BER).

Figure 22:
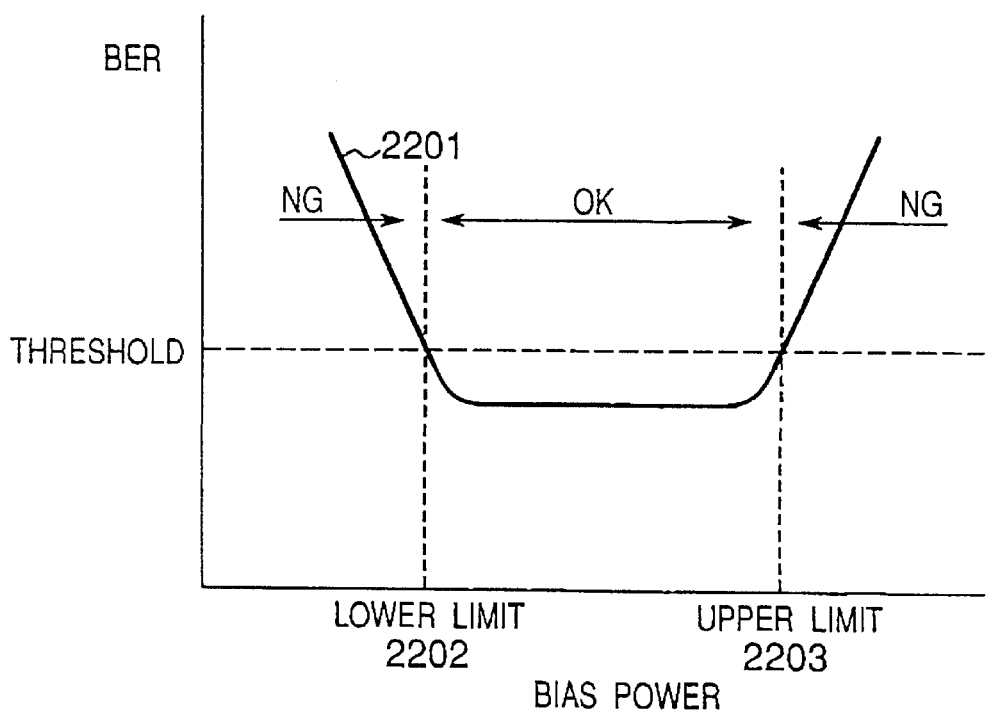
FIGS. 22 and 23 are used to describe a method for determining the bias power level before edge position adjustment according to a preferred embodiment of the present invention.

FIG. 22 shows the relationship between bias power and BER. Bias power is on the X axis and BER on the Y axis in FIG. 22. If reproduction conditions are equal, a low BER generally indicates more accurate recording. Peak power is therefore fixed and the bias power varied while this record and reproduce loop is repeated to find the low 2202 and high 2203 bias power settings at which the BER reaches a specific threshold value. Note that these low and high bias power settings are typically approximately 3 mW and 7 mW, respectively. The average, 5 mW in this case, between these low and high bias power levels is then used as the bias power level for test recording obtaining the optimum leading and trailing mark edge positions.

Figure 23:
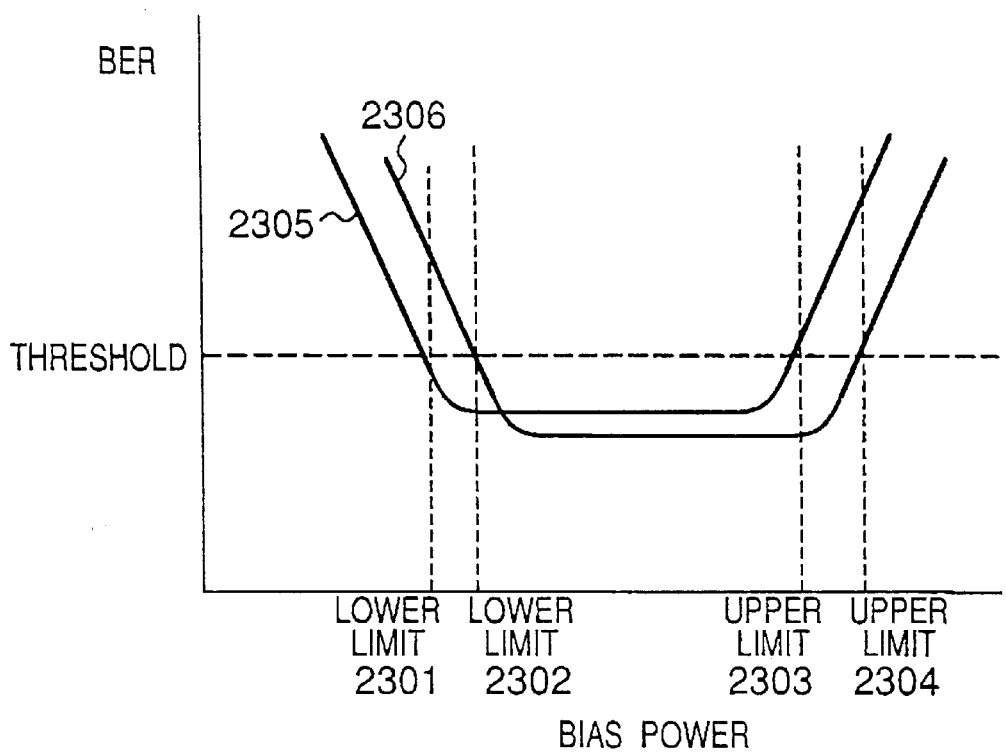

A further method for determining the bias power setting is described next with reference to FIG. 23. In this method a signal containing many simple 3T patterns is recorded after recording a random signal and the BER is detected. A random signal is then recorded again, a signal containing many simple 11T patterns is recorded, and the BER is detected. The high and low bias power levels are then determined for the 3T pattern signal and the 11T pattern signal, and the average of the greater of the two low settings, level 2302 in this case, and the lesser of the two high settings, level 2303 in this case, is obtained and used as the bias power level for test recording obtaining the optimum leading and trailing mark edge positions.

When there is a difference between the bias power range at which the BER is a specific threshold value or less when the 3T signal having the shortest interval is recorded, and the bias power range at which the BER is a specific threshold value or less when the 11T signal having the longest interval is recorded, the bias power level can be more appropriately set by using the average of the ranges in which both are below this threshold value.

It is therefore possible as described above to achieve more accurate recording by determining an optimum emission power level for the test recording operation before performing the test recording operation to determine the optimum leading and trailing mark edge positions.

It will also be obvious that by the disc recorder that actually records the leading and trailing mark edge determining the best laser power settings through test recording to the actual disc to be used for recording, recording optimized for a specific combination of disc recorder and a specific optical disc can be achieved.

It will yet further be obvious that while this preferred embodiment of the present invention detects the BER as a means of detecting reproduction signal quality, the present invention shall not be so limited and various other methods of detecting reproduction signal quality, such as by detecting the jitter, can be alternatively used.

Figure 36:
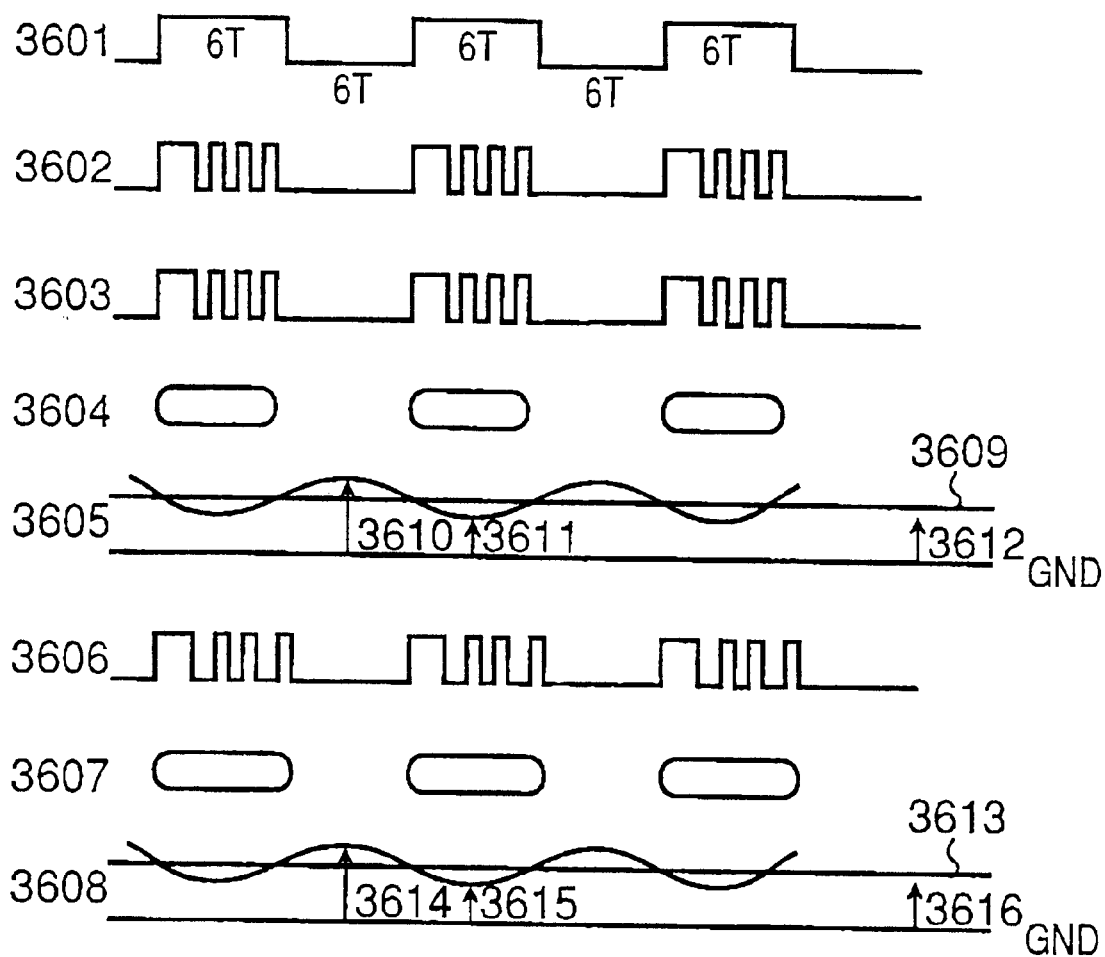

Another method of determining the peak power level is described below with reference to FIG. 36. This method detects asymmetry using a simple 6T pattern signal. Shown in FIG. 36 are the 6T pattern signal 3601 output from pattern signal generator 125; the output signal 3602 of the pulse generator 111; output signal 3603 from pulse moving circuit 110; and the mark pattern 3604 formed in the track on optical disc 101 by modulating laser output between peak and bias power levels according to signal 3603. It is to be noted that while signals 3601, 3602, and 3603 are not generated on the same time base, for convenience they are shown with corresponding parts in each signal aligned vertically.

The pattern signal in this case represents marks and spaces with a simple 6T period, and thus contains types 5S5M and 5M5S of the eighteen pattern types shown in FIG. 5(a). The laser is then driven based on drive signal 3603 in FIG. 36 to record the marks 3604. In this exemplary embodiment, pattern signal 3601 in FIG. 36 is repeatedly recorded around one complete circumference of the recording track. When this track is recorded, it is then reproduced. Reproduction includes converting an optical signal from the photodetector 108 to an electrical signal, and then processing this electrical signal with preamplifier 112, low pass filter 113, and reproduction equalizer 114. The reproduction signal 3605 from the reproduction equalizer 114 is applied to asymmetry measuring circuit 140 and digitizing circuit 115.

The digitizing circuit 115 adjusts the slice level signal 3609 so that the output level corresponding to a mark and the output level corresponding to a space in the output signal of the digitizing circuit are at equal intervals, and applies this slice level signal 3609 to the asymmetry measuring circuit 140.

The asymmetry measuring circuit 140 compares the average of the high 3611 and low 3610 peak values of the reproduction signal 3605 with the slice level signal 3609. When the difference or ratio therebetween is outside a specified range, the peak power setting is off. The peak power setting is therefore adjusted according to the sing of this difference or ratio. This 6T pattern signal recording, reproduction, and asymmetry measurement loop is then repeated until the detected asymmetry is within a specific range.

The options shown in FIG. 38 are described further below.

In addition to the optimum or typical leading and trailing mark edge positions recorded to area 1503 of the optical disc 1501 shown in FIG. 15 during manufacture, the temporary power level information used for adjusting the leading and trailing mark edge positions can be recorded. Note that this temporary power level information includes the peak power, bias power, margin constant, and asymmetry information. It is also possible to record all or just part of this temporary power level information. This is also true of the other optical discs described below.

When this optical disc is loaded, area 1503 is read to obtain the temporary power level information. Test recording is then performed to determine the specific bias power level. The ratio between the typical peak and bias power level information read from area 1503 is then obtained. This ratio can then be multiplied with the specific bias power level obtained by test recording to obtain the specific peak power setting. It is to be noted that the specific bias power level is obtained through test recording to compensate for deterioration of the laser, lens fogging, and other factors causing a loss of laser power. Test recording for determining the specific peak power setting can therefore be omitted, and the time required to determine the conditions for optimized recording can be shortened.

It will be obvious that if there is no variation in laser power, the typical peak and bias power values read from area 1503 can be used as read.

In addition, when the peak power level is obtained by detecting asymmetry, less asymmetry is generally better but the optimum asymmetry setting will vary slightly according to such factors as the recording film composition.

Referring to FIG. 36 for example, if peak power is optimal when the calculated result of ((3615+3614)/2−3616)/(3615−3614) is 1.05, a more precise peak power setting can be obtained by recording this optimal asymmetry value (that is, either 1.05 or the result of a specific operation applied to 1.05) to disc.

Furthermore, when the peak power level is obtained by detecting the BER, the optimum margin added will vary slightly according to such factors as the recording film composition. For example, if the optimum peak power is the value at 1.2 times the threshold value, a more precise peak power setting can be obtained by recording this optimal margin (that is, 1.2 or the result of a specific operation applied to 1.2) to disc.

In addition to the optimum or typical leading and trailing mark edge positions recorded to area 1604 of the optical disc 1601 shown in FIG. 16 during manufacture, the temporary power level information used for adjusting the leading and trailing mark edge positions can be recorded. Note that this temporary power level information includes the peak power, bias power, margin constant, and asymmetry information.

When this optical disc is loaded, area 1604 is read to obtain the temporary power level information. Test recording is then performed to determine the specific bias power level. The ratio between the typical peak and bias power level information read from area 1064 is then obtained. This ratio can then be multiplied with the specific bias power level obtained by test recording to obtain the specific peak power setting. Test recording for determining the specific peak power setting can therefore be omitted, and the time required to determine the conditions for optimized recording can be shortened.

It will be obvious that if there is no variation in laser power, the typical peak and bias power values read from area 1604 can be used as read.

In addition, when the peak power level is obtained by detecting asymmetry, less asymmetry is generally better but the optimum asymmetry setting will vary slightly according to such factors as the recording film composition.

Referring to FIG. 36 for example, if peak power is optimal when the calculated result of ((3615+3614)/2−3616)/(3615−3614) is 1.05, a more precise peak power setting can be obtained by recording this optimal asymmetry value (that is, either 1.05 or the result of a specific operation applied to 1.05) to disc.

Furthermore, when the peak power level is obtained by detecting the BER, the optimum margin added will vary slightly according to such factors as the recording film composition. For example, if the optimum peak power is the value at 1.2 times the threshold value, a more precise peak power setting can be obtained by recording this optimal margin (that is, 1.2 or the result of a specific operation applied to 1.2) to disc.

In addition to the optimum or typical leading and trailing mark edge positions recorded to area 1703 of the optical disc 1701 shown in FIG. 17 during manufacture, the temporary power level information used for adjusting the leading and trailing mark edge positions can be recorded. Note that this temporary power level information includes the peak power, bias power, margin constant, and asymmetry information.

When this optical disc is loaded, area 1703 is read to obtain the temporary power level information. Test recording is then performed to determine the specific bias power level. The ratio between the typical peak and bias power level information read from area 1703 is then obtained. This ratio can then be multiplied with the specific bias power level obtained by test recording to obtain the specific peak power setting. Test recording for determining the specific peak power setting can therefore be omitted, and the time required to determine the conditions for optimized recording can be shortened.

It will be obvious that if there is no variation in laser power, the typical peak and bias power values read from area 1703 can be used as read.

In addition, when the peak power level is obtained by detecting asymmetry, less asymmetry is generally better but the optimum asymmetry setting will vary slightly according to such factors as the recording film composition.

Referring to FIG. 36 for example, if peak power is optimal when the calculated result of ((3615+3614)/2−3616)/(3615−3614) is 1.05, a more precise peak power setting can be obtained by recording this optimal asymmetry value (that is, either 1.05 or the result of a specific operation applied to 1.05) to disc.

Furthermore, when the peak power level is obtained by detecting the BER, the optimum margin added will vary slightly according to such factors as the recording film composition. For example, if the optimum peak power is the value at 1.2 times the threshold value, a more precise peak power setting can be obtained by recording this optimal margin (that is, 1.2 or the result of a specific operation applied to 1.2) to disc.

In addition to the leading and trailing mark edge positions determined by test recording and recorded to area 1705 of the optical disc 1701 shown in FIG. 17, the temporary power level information used for adjusting the leading and trailing mark edge positions can be recorded. Note that this temporary power level information includes the specific peak power, specific bias power, margin constant, and asymmetry information.

When this optical disc is again loaded into the same disc recorder, area 1705 is read to obtain specific temporary power level information, such as the specific bias power setting. If the specific bias power setting is the same as the typical bias power setting recorded to area 1705, test recording for determining the specific peak power setting and the optimum leading and trailing mark edge positions can therefore be omitted, and the time required to determine the conditions for optimized recording can be shortened.

It is also possible in this case to quickly obtain the optimum temporary power setting using the information recorded to area 1705 when the margin constant, asymmetry information, and other temporary power information recorded to area 1703 is unreadable due to a disc error, soiling, or other problem.

In addition to the optimum or typical leading and trailing mark edge positions recorded to area 1804 of the optical disc 1801 shown in FIG. 18 during manufacture, the temporary power level information used for adjusting the leading and trailing mark edge positions can be recorded. Note that this temporary power level information includes the peak power, bias power, margin constant, and asymmetry information.

When this optical disc is loaded, area 1804 is read to obtain the temporary power level information. Test recording is then performed to determine the specific bias power level. The ratio between the typical peak and bias power level information read from area 1804 is then obtained. This ratio can then be multiplied with the specific bias power level obtained by test recording to obtain the specific peak power setting. Test recording for determining the specific peak power setting can therefore be omitted, and the time required to determine the conditions for optimized recording can be shortened.

It will be obvious that if there is no variation in laser power, the typical peak and bias power values read from area 1804 can be used as read.

In addition, when the peak power level is obtained by detecting asymmetry, less asymmetry is generally better but the optimum asymmetry setting will vary slightly according to such factors as the recording film composition.

Referring to FIG. 36 for example, if peak power is optimal when the calculated result of ((3615+3614)/2−3616)/(3615−3614) is 1.05, a more precise peak power setting can be obtained by recording this optimal asymmetry value (that is, either 1.05 or the result of a specific operation applied to 1.05) to disc.

Furthermore, when the peak power level is obtained by detecting the BER, the optimum margin added will vary slightly according to such factors as the recording film composition. For example, if the optimum peak power is the value at 1.2 times the threshold value, a more precise peak power setting can be obtained by recording this optimal margin (that is, 1.2 or the result of a specific operation applied to 1.2) to disc.

In addition to the leading and trailing mark edge positions determined by test recording and recorded to area 1806 of the optical disc 1801 shown in FIG. 18, the temporary power level information used for adjusting the leading and trailing mark edge positions can be recorded. Note that this temporary power level information includes the specific peak power, specific bias power, margin constant, and asymmetry information.

When this optical disc is again loaded into the same disc recorder, area 1806 is read to obtain specific temporary power level information, such a the specific bias power setting. If the specific bias power setting is the same as the typical bias power setting recorded to area 1806, test recording for determining the specific peak power setting and adjusting leading and trailing mark edge positions according to the data can therefore be omitted, and the time required to determine the conditions for optimized recording can be shortened.

It is also possible in this case to quickly obtain the optimum temporary power setting using the information recorded to area 1806 when the margin constant, asymmetry information, and other temporary power information recorded to area 1803 is unreadable due to a disc error, soiling, or other problem.

If information specific to the optical disc 1201, such as the disc manufacturer, product number, production data and location, disc format, and recording film type, is stored to area 1203 of the optical disc 1201 shown in FIG. 12 in addition to the adjustment method information, this disc-specific information and the temporary power level information (such as peak power, bias power, margin constant, asymmetry information) used for adjusting the leading ad trailing mark edge positions can be stored to memory 130 of the disc recorder.

When this optical disc is then loaded, area 1203 is read to detect whether the disc-specific information is already in memory 130. If it is, test recording is then performed to determine the specific bias power level. The ratio between the typical peak and bias power level information in memory 130 is then obtained. This ratio can then be multiplied with the specific bias power level obtained by test recording to obtain the specific peak power setting. Test recording for determining the specific peak power setting can therefore be omitted, and the time required to determine the conditions for optimized recording can be shortened.

If information specific to the optical disc 1501, such as the disc manufacturer, product number, production date and location, disc format, and recording film type, is stored to area 1503 of the optical disc 1501 shown in FIG. 15 in addition to the leading and trailing mark edge position information, this disc-specific information and the temporary power level information (such as peak power, bias power, margin constant, asymmetry information) used for adjusting the leading and trailing mark edge positions can be stored to memory 130 of the disc recorder.

When this optical disc is then loaded, area 1503 is read to detect whether the disc-specific information is already in memory 130. If it is, test recording is then performed to determine the specific bias power level. The ratio between the typical peak and bias power level information in memory 130 is then obtained. This ratio can then be multiplied with the specific bias power level obtained by test recording to obtain the specific peak power setting. Test recording for determining the specific peak power setting can therefore be omitted, and the time required to determine the conditions for optimized recording can be shortened.

In addition, if the margin constant, asymmetry information, or other temporary power level information cannot be read from area 1503 because of a disc error or soiling, the optimum temporary power level can still be quickly obtained because this unreadable information is in memory 130.

If information specific to the optical disc 1601, such as the disc manufacturer, product number, production date and location, disc format, and recording film type, is stored to area 1603 of the optical disc 1601 shown in FIG. 16 in addition to the adjustment method information, this disc-specific information and the temporary power level information (such as peak power, bias power, margin constant, asymmetry information) used for adjusting the leading and trailing mark edge positions can be stored to memory 130 of the disc recorder.

When this optical disc is then loaded, area 1603 is read to detect whether the disc-specific information is already in memory 130. If it is, test recording is then performed to determine the specific bias power level. The ratio between the typical peak and bias power level information in memory 130 is then obtained. This ratio can then be multiplied with the specific bias power level obtained by test recording to obtain the specific peak power setting. Test recording for determining the specific peak power setting can therefore be omitted, and the time required to determine the conditions for optimized recording can be shortened.

In addition, if the margin constant, asymmetry information, or other temporary power level information cannot be read from area 1603 because of a disc error or soiling, the optimum temporary power level can still be quickly obtained because this unreadable information is in memory 130.

If information specific to the optical disc 1701, such as the disc manufacturer, product number, production date and location, disc format, and recording film type, is stored to area 1703 of the optical disc 1701 shown in FIG. 17 in addition to the leading and trailing mark edge position information, this disc-specific information and the temporary power level information (such as peak power, bias power, margin constant, asymmetry information) used for adjusting the leading ad trailing mark edge positions can be stored to memory 130 of the disc recorder.

When this optical disc is then loaded, area 1703 is read to detect whether the disc-specific information is already in memory 130. If it is, test recording is then performed to determine the specific bias power level. The ratio between the typical peak and bias power level information in memory 130 is then obtained. This ratio can then be multiplied with the specific bias power level obtained by test recording to obtain the specific peak power setting. Test recording for determining the specific peak power setting can therefore be omitted, and the time required to determine the conditions for optimized recording can be shortened.

In addition, if the margin constant, asymmetry information, or other temporary power level information cannot be read from area 1703 or 1705 because of a disc error or soiling, the optimum temporary power level can still be quickly obtained because this unreadable information is in memory 130.

In addition, if area 1705 is overwritten by a different disc recorder, the optimum temporary power level setting can be obtained quickly by reading the information from memory 130.

If information specific to the optical disc 1801, such as the disc manufacturer, product number, production date and location, disc format, and recording film type, is stored to area 1803 of the optical disc 1801 shown in FIG. 18 in addition to the adjustment method information, this disc-specific information and the temporary power level information (such as peak power, bias power, margin constant, asymmetry information) used for adjusting the leading and trailing mark edge positions can be stored to memory 130 of the disc recorder.

When this optical disc is then loaded, area 1803 is read to detect whether the disc-specific information is already in memory 130. If it is, test recording is then performed to determine the specific bias power level. The ratio between the typical peak and bias power level information in memory 130 is then obtained. This ratio can then be multiplied with the specific bias power level obtained by test recording to obtain the specific peak power setting. Test recording for determining the specific peak power setting can therefore be omitted, and the time required to determine the conditions for optimized recording can be shortened.

In addition, if the margin constant, asymmetry information, or other temporary power level information cannot be read from area 1803 or 1805 because of a disc error or soiling, the optimum temporary power level can still be quickly obtained because this unreadable information is in memory 130.

In addition, if area 1805 is overwritten by a different disc recorder, the optimum temporary power level setting can be obtained quickly by reading the information from memory 130.

It is to be noted that while the specific peak power setting is determined in this exemplary embodiment after determining the specific bias power setting, it is also possible to determine the specific peak power setting first and then the specific bias power setting.

Furthermore, the optimum leading and trailing mark edge positions are determined by test recording to a specific area as described above. It is alternatively possible, however, to determine the above specific bias and peak power settings, and then determine the operational power level setting of the laser beam used for data recording.

Referring to FIG. 5(*a*), for example, if the setting for the first pulse position 3S5M or last pulse position 3S5M differs greatly from the initial value for determining the peak power of the temporary power level, the margin used to determine the peak power may be low. For example, while the disc can normally be recorded properly even when the effective temporary power level drops 2 mW if the disc area to be written is soiled, it may not be possible to record correctly when there is only a 1 mW drop if the margin is too low.

By setting the operational power level, however, a more reliable power margin can be assured for optimized recording.

While it is necessary to determine both the peak and bias power levels, a preferred method for determining the peak power level is described first below. In this case, switch 121 is conductive through contacts 122 and 124.

The power level setting circuit 119 first sets the default peak and bias power levels to the laser drive circuit 109 based on data read from memory 132. The output signal from random pattern generator 127*b* of the recording data generator 127 is then modulated by the modulation circuit 126, and passed through switch 121 to the pulse generator 111 for conversion to a pulse signal. This pulse signal is then passed to the pulse moving circuit 110 from which a signal in which the leading and trailing pulse edges are shifted is output.

It is to be noted that the signal output from modulation circuit 126 is a random signal in which the DSV is 0.

The output signal from pulse moving circuit 110 is input to the laser drive circuit 109, which drives the semiconductor laser to emit at peak and bias power levels according to this output signal and thereby form a sequence of marks on the disc.

When recording ends the mark sequence is reproduced, and the output signal from demodulation circuit 117 is input to the data comparator 131. The output signal from random pattern generator 127b is also input to data comparator 131. The data comparator 131 thus compares the recording data and the reproduced data ad detects, for example, a byte error rate (BER).

Figure 24:
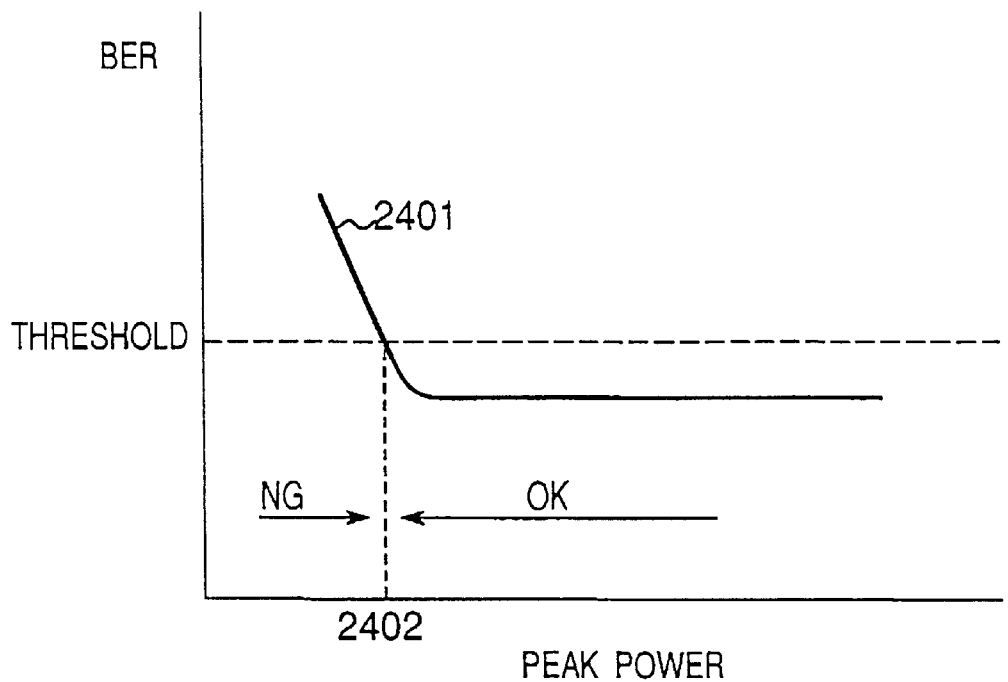
FIG. 24 is used to describe a method for determining the peak power level after edge position adjustment according to a preferred embodiment of the present invention.

FIG. 24 shows the relationship between peak power and BER. Peak power is on the X axis and BER on the Y axis in FIG. 24. If reproduction conditions are equal, a low BER generally indicates more accurate recording. Bias power is therefore fixed and the peak power varied while this record and reproduce loop is repeated to find the peak power 2402 (typically approximately 8 mW) at which the BER reaches a specific threshold value. A predefined margin is then added to this peak power 2402 level to set the peak power level, typically approximately 10 mW. It is to be noted that by appropriately controlling this added margin the peak power level can be optimized for data recording. Note, further, that the margin can be applied to the peak power level obtaining a BER of a particular threshold value by multiplying the peak power level by a constant factor (such as 1.2) or adding thereto a constant such as 2 mW.

A method for determining bias power is described next. The peak power setting determined by the power level setting circuit 119 as described above and the initial bias power setting are first set to the laser drive circuit 109. The modulation circuit 126 then outputs a random a random signal according to the random pattern signal from the random pattern generator 127b, and the pattern is recorded using the above power settings.

When recording ends the mark sequence is reproduced, and the output signal from demodulation circuit 117 is input to the data comparator 131. The output signal from random pattern generator 127b is also input to data comparator 131. The data comparator 131 thus compares the recording data and the reproduced data and detects, for example, a byte error rate (BER).

Figure 25:
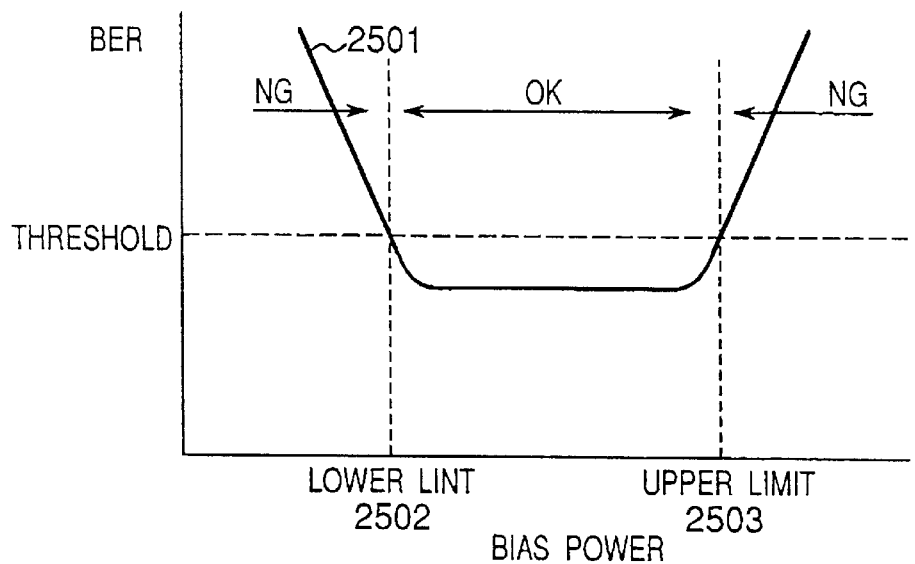
FIG. 25 is used to describe a method for determining the bias power level after edge position adjustment according to a preferred embodiment of the present invention.

FIG. 25 shows the relationship between bias power and BER. Bias power is on the X axis and BER on the Y axis in FIG. 25. If reproduction conditions are equal, a low BER generally indicates more accurate recording. Peak power is therefore fixed and the bias power varied while this record and reproduce loop is repeated to find the low 2502 and high 2503 bias power settings at which the BER reaches a specific threshold value. Note that these low and high bias power settings are typically approximately 3 mW and 7 mW, respectively. The average, 5 mV in this case, between these low and high bias power levels is then used as the bias power level for test recording obtaining the optimum leading and trailing mark edge positions.

It is therefore possible as described above to achieve more accurate recording by determining an optimum emission power level for data recording operation after determining the optimum leading and trailing mark edge positions.

It will also be obvious that by the disc recorder that actually records the leading and trailing mark edge determining the best laser power settings through test recording to the actual disc to be used for recording, recording optimized for a specific combination of disc recorder and a specific optical disc can be achieved.

It will yet further be obvious that while this preferred embodiment of the present invention detects the BER as a means of detecting reproduction signal quality. The present invention shall not be so limited and various other methods of detecting reproduction signal quality, such as by detecting the jitter, can be alternatively used.

The options shown in FIG. 38 are described yet further below.

In addition to the optimum or typical leading and trailing mark edge positions recorded to area 1503 of the optical disc 1501 shown in FIG. 15 during manufacture, the operational power level information can be recorded. Note that this operational power level information includes the peak power, bias power, and margin constant. It is also possible to record all or just part of this operational power level information. This is also true of the other optical discs described below.

When this optical disc is loaded, area 1503 is read to obtain the operational power level information. Test recording is then performed to determine the specific bias power level. The ratio between the typical peak and bias power level information read from area 1503 is then obtained. This ratio can then be multiplied with the specific bias power level obtained by test recording to obtain the optimum specific peak power setting. Test recording for determining the specific peak power setting can therefore be omitted, and the time required to determine the conditions for optimized recording can be shortened.

It will be obvious that if there is no variation in laser power, the typical peak and bias power values read from area 1503 can be used as read.

Furthermore, when the peak power level is obtained by detecting the BER, the optimum margin added will vary slightly according to such factors as the recording film composition. For example, if the optimum peak power is the value at 1.2 times the threshold value, a more precise peak power setting can be obtained by recording this optimal margin (that is, 1.2 or the result of a specific operation applied to 1.2) to disc.

It should be further noted that if the operational power level information for adjusting the leading and trailing mark edge positions is not recorded to area 1503, the temporary power level information can be used. Conversely, the operational power level information can be used to obtain the temporary power level.

The operational power level information can likewise be recorded to area 1604 of the optical disc 1601 shown in FIG. 16 in addition to the optimum or typical leading and trailing mark edge positions recorded during manufacture.

When this optical disc is loaded, area 1604 is read to obtain the operational power level information. To determine the specific bias power level, for example, the ratio between the typical peak and bias power level information read from area 1604 is then obtained. After the specific peak power is determined, this ratio can be multiplied with the specific peak power to predict the optimum specific bias power setting. Test recording for determining the specific bias power setting can therefore be omitted, and the time required to determine the conditions for optimized recording can be shortened.

It is to be noted that if the power level information for adjusting the leading and trailing mark edge positions is not recorded to area 1604, the optimum bias power setting before edge position adjustment can be predicted by determining the power level information after edge position adjustment. For example, to determine the bias power setting before edge position adjustment, the pre-adjustment peak power setting is determined, the ratio between the peak power and bias power determined after such adjustment and recorded to area 1604 is calculated, and this ratio is then applied to the pre-adjustment peak power setting to predict the optimum bias power setting before edge position adjustment.

The operational power level information can likewise be recorded to area 1703 of the optical disc 1701 shown in FIG. 17 in addition to the optimum or typical leading and trailing mark edge positions recorded during manufacture.

When this optical disc is loaded, area 1703 is read to obtain the operational power level information. Bias power is then determined through test recording, the ratio between the peak and bias power values read from area 1703 is then calculated, and this ratio is multiplied by the bias power value obtained from test recording to obtain the optimum peak power setting. Test recording for determining the specific peak power setting can therefore be omitted, and the time required to determine the conditions for optimized recording can be shortened.

It should be further noted that if the temporary power level information for adjusting the leading and trailing mark edge positions is not recorded to area 1703, the operational power level information can be used. First, the operational power setting recorded to area 1703 is read. The bias power setting of the temporary power level information is then obtained by test recording, and the ratio between the peak and bias power settings of the operational power level setting is calculated. The optimum peak power level of the temporary power level information can then be calculated by multiplying this ratio with the bias power setting of the temporary power level information. Test recording for determining the specific peak power setting of the temporary power level can therefore be omitted, and the time required to determine the conditions for optimized recording can be shortened.

The operational power level information can likewise be recorded to area 1705 of the optical disc 1701 shown in FIG. 17 in addition to the leading and trailing mark edge positions determined by test recording.

In this case, when the optical disc is loaded to a disc recorder for recording, area 1705 is read to obtain the temporary power level information. If the bias power setting determined through test recording is the same as the bias power setting recorded to area 1705, subsequent test recording for determining the specific peak power setting can be omitted, and the time required to determine the conditions for optimized recording can be shortened.

The operational power level information can likewise be recorded to area 1804 of the optical disc 1801 shown in FIG. 18 in addition to the optimum or typical leading and trailing mark edge positions recorded during manufacture.

When the optical disc is loaded, area 1804 is read to obtain the operational power level information. Bias power is then determined through test recording, the ratio between the peak and bias power values read from area 1804 is then calculated, and this ratio is multiplied by the bias power value obtained from test recording to obtain the optimum peak power setting. Test recording for determining the specific peak power setting can therefore be omitted, and the time required to determine the conditions for optimized recording can be shortened.

It should be further noted that if the temporary power level information for adjusting the leading and trailing mark edge positions is not recorded to area 1804, the operational power level information can be used. First, the operational power setting recorded to area 1804 is read. The bias power setting of the temporary power level information is then obtained by test recording, and the ratio between the peak and bias power settings of the operational power level setting is calculated. The optimum peak power level of the temporary power level information can then be calculated by multiplying this ratio with the bias power setting of the temporary power level information. Test recording for determining the specific peak power setting of the temporary power level can therefore be omitted, and the time required to determine the conditions for optimized recording can be shortened.

The operational power level information can likewise be recorded to area 1806 of the optical disc 1801 shown in FIG. 18 in addition to the leading and trailing mark edge positions determined by test recording.

In the case, when the optical disc is next loaded to a disc recorder for recording, area 1806 is read to obtain the temporary power level information. If the bias power setting determined through test recording is the same as the bias power setting recorded to area 1806, subsequent test recording for determining the specific peak power setting can be omitted, and the time required to determine the conditions for optimized recording can be shortened.

It is to be noted that while the specific peak power is determined after detecting the specific bias power setting in this exemplary embodiment, it is alternatively possible to determine the specific peak power setting and then the specific bias power setting.

If information specific to the optical disc 1201, such as the disc manufacturer, product number, production date and location, disc format, and recording film type, is stored to area 1203 of the optical disc 1201 shown in FIG. 12 in addition to the adjustment method information, this disc-specific information and the operational power level information (such as peak power, bias power, margin constant used for adjusting the leading and trailing mark edge positions can be stored to memory 130 of the disc recorder.

When this optical disc is then loaded, area 1203 is read to detect whether the disc-specific information is already in memory 130. If it is, test recording is then performed to determine the specific bias power level. The ratio between the peak and bias power level information in memory 130 is then obtained. This ratio can then be multiplied with the specific bias power level obtained by test recording to obtain the specific peak power setting. Test recording for determining the specific peak power setting can therefore be omitted, and the time required to determine the conditions for optimized recording can be shortened.

If the temporary power level information for adjusting the leading and trailing mark edge positions is not recorded to memory 130, the operational power level information can be used. First, the operational power setting recorded to area 1203 is read. The bias power setting of the temporary power level information is then obtained by test recording, and the ratio between the peak and bias power settings of the operational power level setting is calculated. The optimum peak power level of the temporary power level information can then be calculating by multiplying this ratio with the bias power setting of the temporary power level information. Test recording for determining the specific peak power setting of the temporary power level can therefore be omitted, and the time required to determine the conditions for optimized recording can be shortened.

If information specific to the optical disc 1601, such as the disc manufacturer, product number, production data and location, disc formal, and recording film type, is stored to area 1603 of the optical disc 1601 shown in FIG. 16 in addition to the adjustment method information, this disc-specific information and the operational power level information (such as peak power, bias power, margin constant) used for adjusting the leading and trailing mark edge positions can be stored to memory 130 of the disc recorder.

When this optical disc is then loaded, area 1603 is read to detect whether the disc-specific information is already in memory 130. If it is, test recording is then performed to determined the specific bias power level. The ratio between the peak and bias power level information in memory 130 is then obtained. This ratio can then be multiplied with the specific bias power level obtained by test recording to obtain the specific peak power setting. Test recording for determining the specific peak power setting can therefore be omitted, and the time required to determine the conditions for optimized recording can be shortened.

If the temporary power level information for adjusting the leading and trailing mark edge positions is not recorded to memory 130, the operational power level information can be used. First, the operational power setting recorded to area 1603 is read. The bias power setting of the temporary power level information is then obtained by test recording, and the ratio between the peak and bias power settings of the operational power level setting is calculated. The optimum peak power level of the temporary power level information can then be calculated by multiplying this ratio with the bias power setting of the temporary power level information. Test recording for determining the specific peak power setting of the temporary power level can therefore be omitted, and the time required to determine the conditions for optimized recording can be shortened.

If information specific to the optical disc 1801, such as the disc manufacturer, product number, production date and location, disc format, and recording film type, is stored to area 1803 of the optical disc 1801 shown in FIG. 18 in addition to the adjustment method information, this disc-specific information and the operational power level information (such as peak power, bias power, margin constant) used for adjusting the leading and trailing mark edge positions can be stored to memory 130 of the disc recorder.

When the optical disc is then loaded, area 1803 is read to detect whether the disc-specific information is already in memory 130. If it is, test recording is then performed to determine the specific bias power level. The ratio between the peak and bias power level information in memory 130 is then obtained. This ratio can then be multiplied with the specific bias power level obtained by test recording to obtain the specific peak power setting. Test recording for determining the specific peak power setting can therefore be omitted, and the time required to determine the conditions for optimized recording can be shortened.

If the temporary power level information for adjusting the leading and trailing mark edge positions is not recorded to memory 130, the operational power level information can be used. First, the operational power setting recorded to area 1803 is read. The bias power setting of the temporary power level information is then obtained by test recording, and the ratio between the peak and bias power settings of the operational power level setting is calculated. The optimum peak power level of the temporary power level information can then be calculated by multiplying this ratio with the bias power setting of the temporary power level information. Test recording for determining the specific peak power setting of the temporary power level can therefore be omitted, and the time required to determine the conditions for optimized recording can be shortened.

It is to be noted that the optimum positions of the leading and trailing mark edges are determined in this exemplary embodiment of the present invention assuming an ideal reproduction path from the recording medium to the digitizing circuit. It will be obvious, however, that reproduction systems with less than ideal performance characteristics are also possible.

Figure 26:
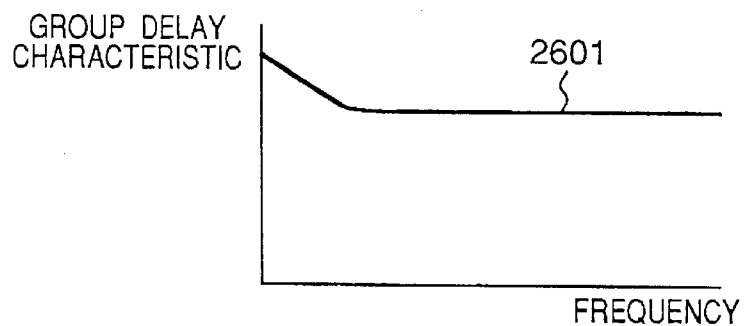
FIG. 26 shows the frequency characteristic of group delay in the reproduction system of a disc recorder according to a preferred embodiment of the present invention.

FIG. 26 shows the group delay frequency characteristics of the reproduction system in an actual disc recorder. Although a flat group delay to signal frequency characteristic is the ideal, a group delay characteristic 2601 that is not flat as shown in FIG. 26 is also possible. When the frequency characteristic of the group delay characteristic is not constant, edge shifting may occur in signals with mark and space combinations of various lengths. If the first drive pulse position Tu and last drive pulse position Td are determined in a disc recorder subject to edge shifting, this edge shift component will be included in Tu and Td. While this is not particularly a problem when the disc is then reproduced on the same disc recorder, reproduction performance will be degraded as a result of edge shifting when the disc is read on a disc recorder with a flat group delay characteristic.

Figure 27:
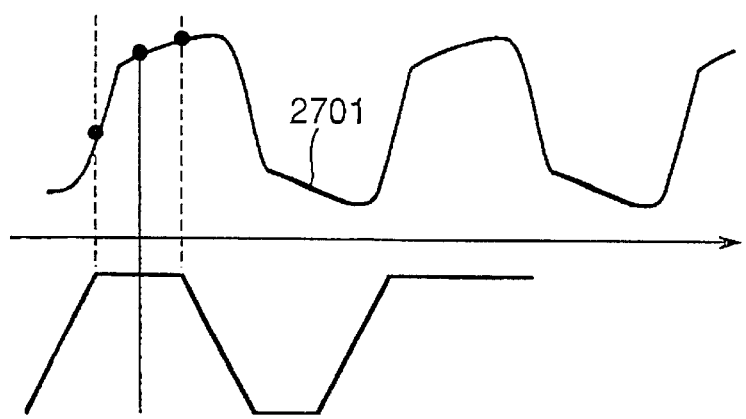
FIG. 27 shows a data reproduction signal in a preferred embodiment of the present invention.

FIG. 27 shows the read signal generated by a disc recorder having a group delay characteristic that is not flat. While the signal represented in FIG. 27 is a simple pattern signal with particularly long marks and spaces, a disc recorder having a non-flat group delay characteristic produces a read signal that has a slope even in space components where the signal should be flat regardless of the shape of the mark. The flatness of the group delay characteristic can be detected by detecting this slope.

Figure 28A:
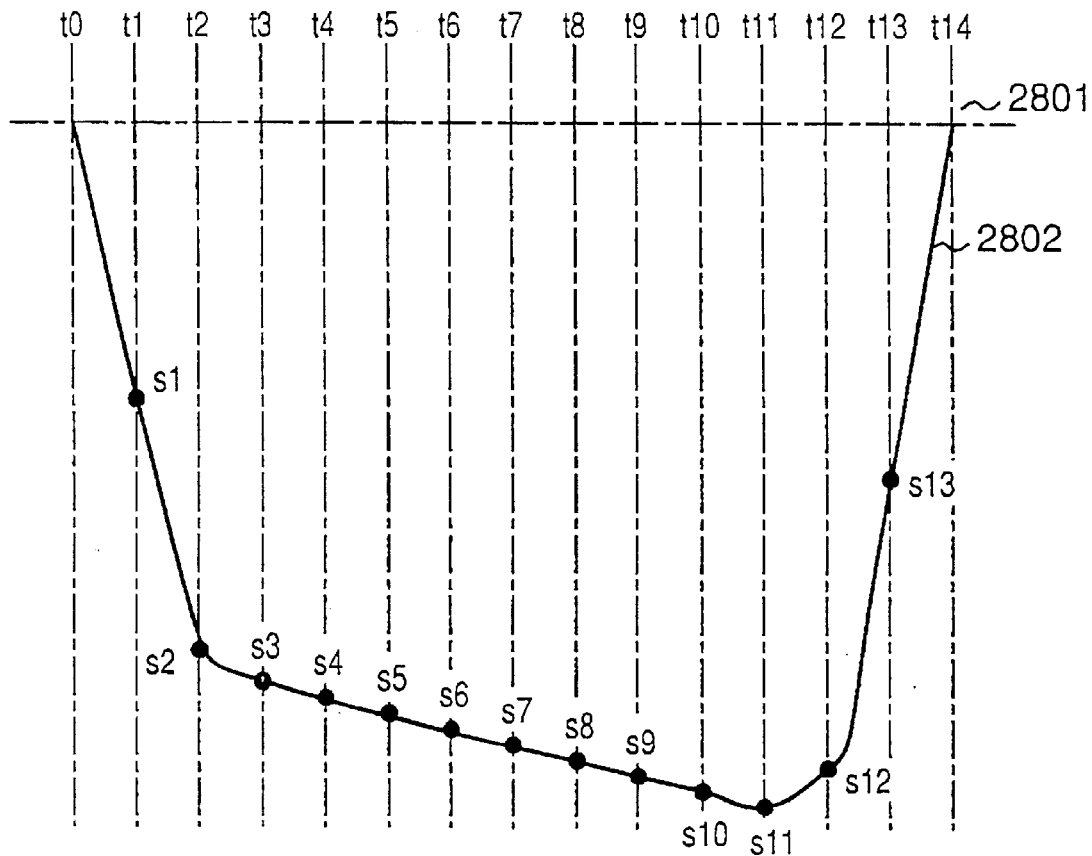
FIGS. 28A and 28B show a method of detecting group delay in a preferred embodiment of the present invention.
Figure 28B:
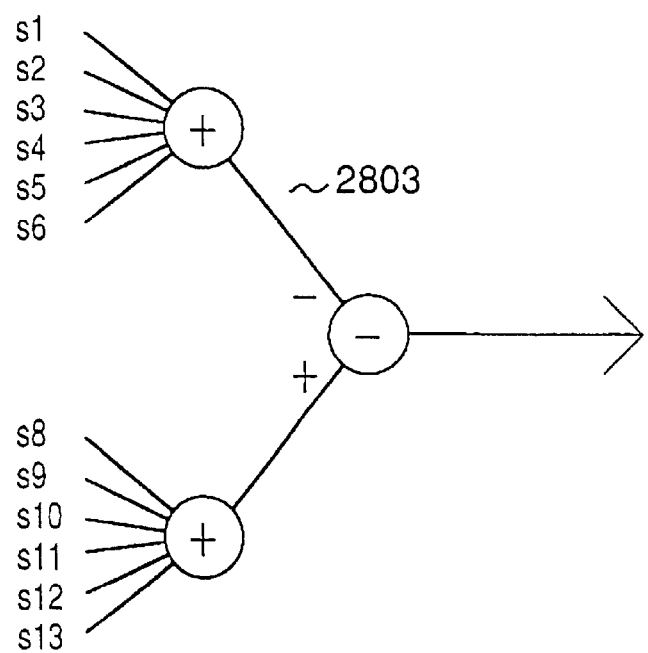

FIG. 28(*a*) shows an exemplary method of detecting signal flatness using a test signal comprising long spaces. This signal is preferably an embossed pit sequence formed at the inside circumference of the recording medium, but can be for example, a signal with a constant 14T space period used as a frame synchronization signal, a signal prerecorded to a specific area of the disc, or a signal recorded by the disc recorder. What is important is that the test signal contain long spaces of, for example, 7T to 14%.

Line 2801 in FIG. 28 indicates the slice level of the digitizing circuit, and curve 2802 is the read signal of a 14T space test signal recorded to and then reproduced from the disc. Signal 2802 is sampled at times t0 to t14 based on a PLL clock, obtaining samples s1 to s13.

FIG. 28(*b*) shows a sampling operator 2803 for processing samples s1 to s13 to obtain a sample value. More specifically, the sampling operator 2803 adds samples s1 and 26, and s8 to s13, and then obtains the difference between the two sums. If the signal 2802 has a wave form as shown in FIG. 28, the output from sampling operator 2803 will be a negative value; if the wave slope is the reverse of that shown in FIG. 28, the result will be positive.

It is to be noted that while it is herein assumed that this sampling circuit and operator are digital circuits, the present invention shall not be so limited insofar as a slope as shown by curve 2802 is output as a negative (or positive) value, and the opposite slope is output as a positive (or negative) value.

Figure 29A:
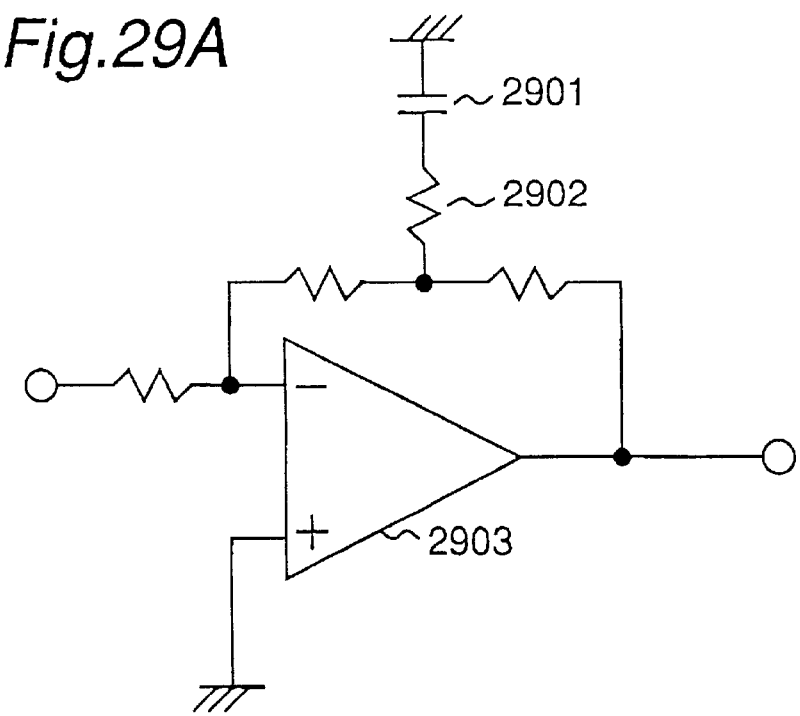
FIGS. 29A and 29B are block diagrams of a group delay compensation circuit in a preferred embodiment of the present invention.
Figure 29B:
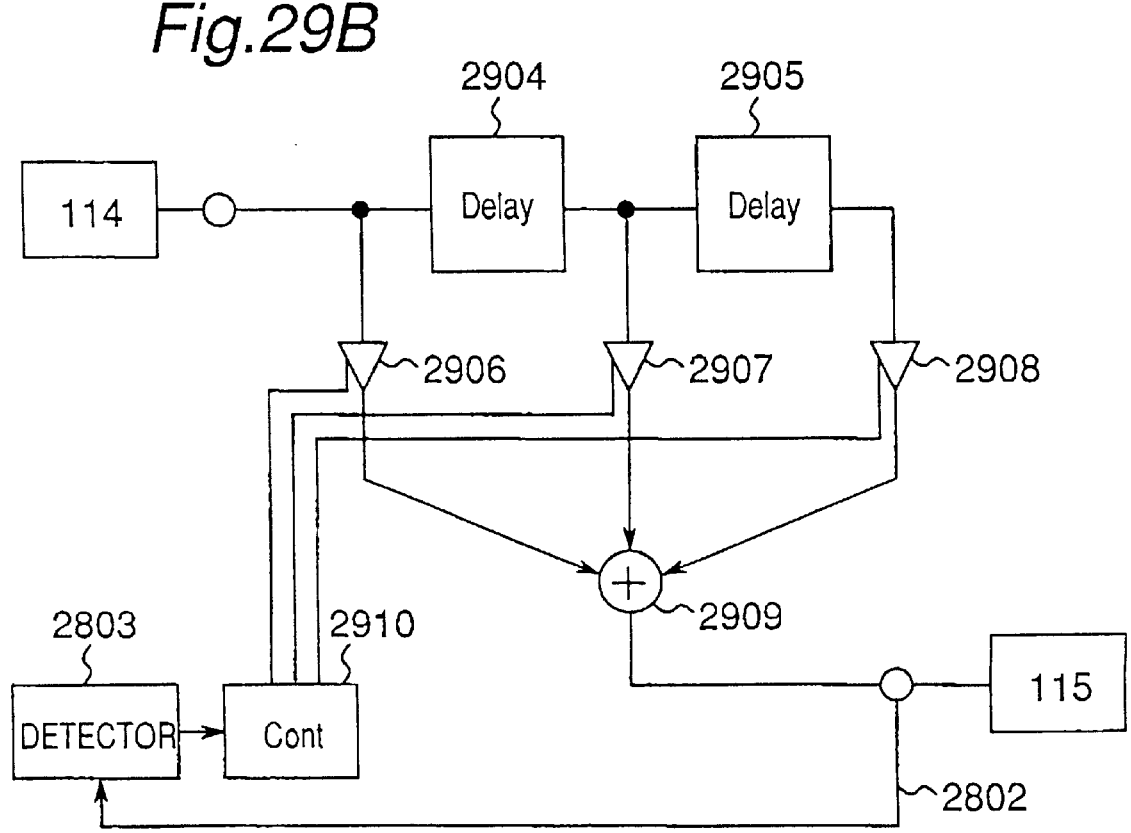

FIGS. 29(*a*) and (*b*) show a group delay compensation circuit for a group delay with a specific frequency characteristic.

FIG. 29(*a*) shows an op-amplifier circuit, capacitor 2901 is inserted through resistor 2902 to apply a specific frequency characteristic to the feedback resistance of a normal inverting op-amplifier 2903. A desirable group delay characteristic in which the high frequency side is delayed can be achieved by appropriately setting the resistance of resistor 2902 and the capacitance of capacitor 2901. If it is desirable to delay the low frequency side, capacitor 2901 can be replaced by an inductor.

FIG. 29(*b*) is a block diagram of an exemplary group delay compensation circuit. The read signal is delayed by delays 2904 and 2905. The original signal, the signal delayed by delay 2904, and the signal delayed by delay 2905 are respectively weighted by weighting coefficient 2906, 2907, and 2908, and the weighted signals are then added by adder 2909. Signal 2802 is the signal shown in FIG. 28(*a*). Detector 2803 is the operator shown in FIG. 28(*b*), for example. Controller 2910 outputs a coefficient based on the output value from the detector 2803 to control the amplification rate of amplifiers 2908, 2907, and 2908. After amplification, that is, weighting, by amplifiers 2906, 2907, and 2908, the signals are added by adder 2909, thereby assuring a flat group delay characteristic for the signal reproduction system, including the group delay compensation circuit.

It is known that if coefficients 2906 and 2908 are equal in this circuit, the group delay characteristic will be flat, and that if they are not equal a frequency characteristic is imparted to the group delay. It is therefore possible by appropriately selecting the coefficients to achieve an equivalent circuit with the desired group delay characteristic.

The group delay characteristic of the entire reproduction system can also be made flat by detecting the flatness of the space component shown in FIG. 28(*a*) and controlling the group delay compensation shown in FIGS. 29(*a*) and (*b*) and inserted somewhere in the reproduction system. By then determining Tu and Td, edge shifting when the disc is reproduced by another disc recorder can be minimized, and greater compatibility can be achieved for reproducing the disc in different disc recorders.

Figure 30:
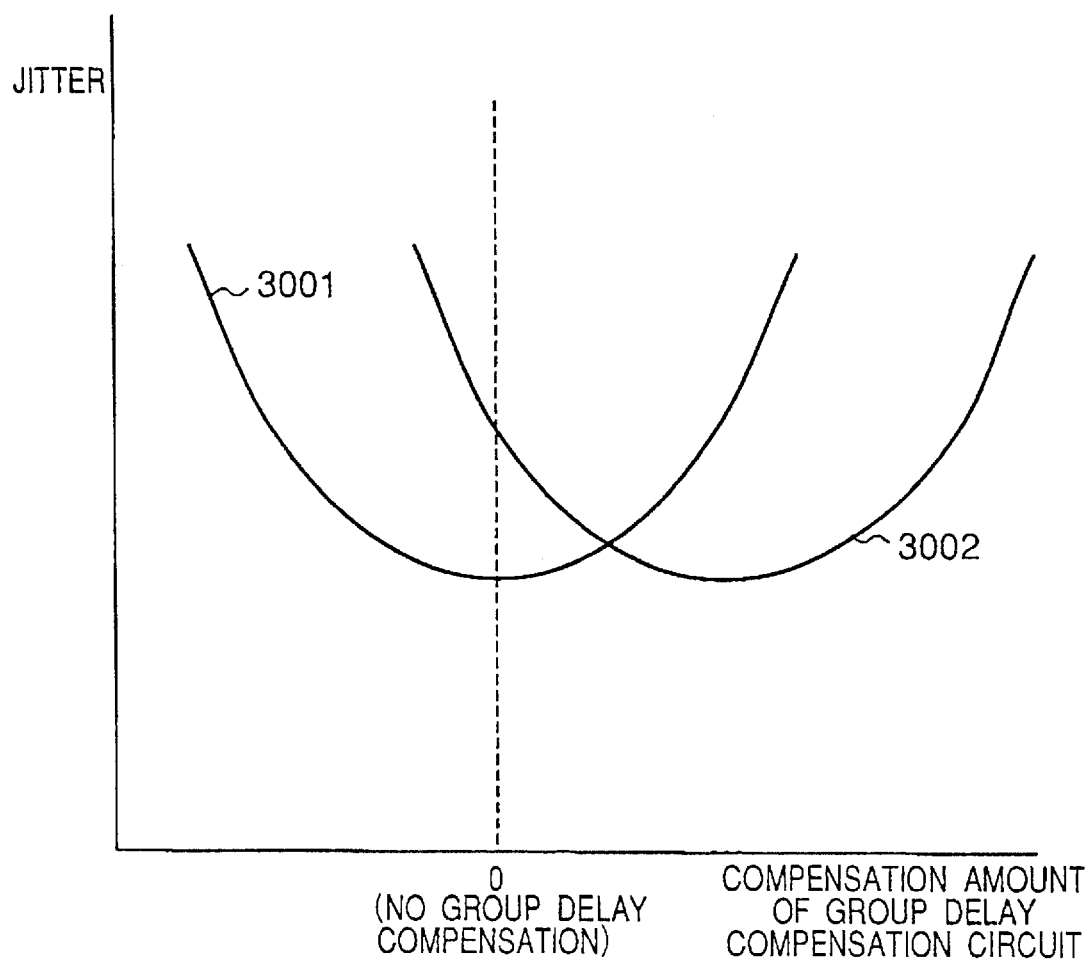
FIG. 30 shows the relationship between jitter and group delay compensation in a preferred embodiment of the present invention.
Figure 31B:
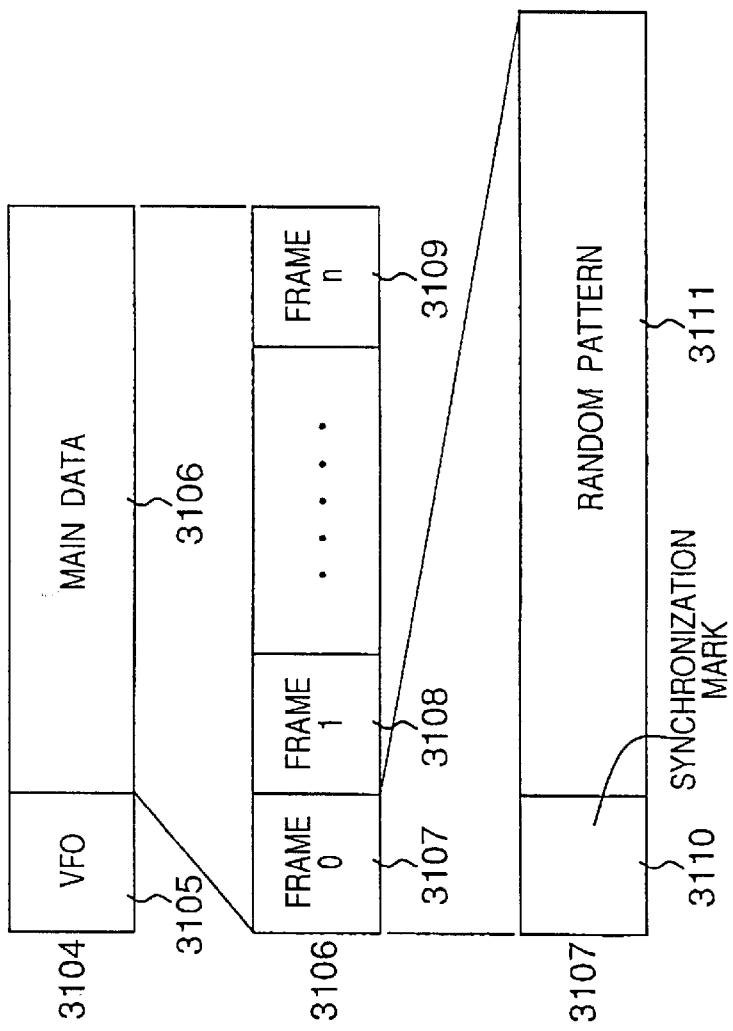
FIGS. 31A, 31B and 31C show the user data format in a typical optical disc.
Figure 31A:
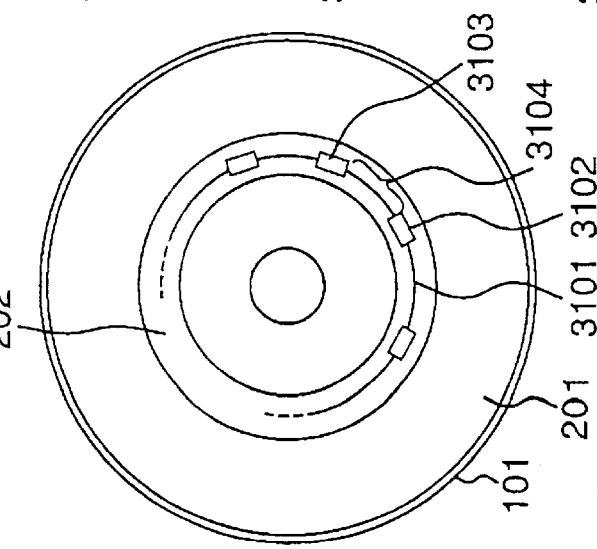
Figure 31C:
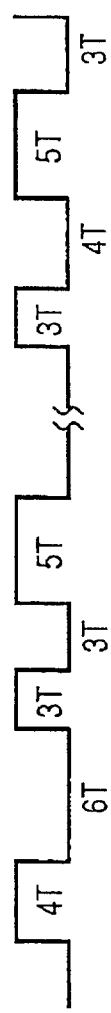

FIG. 30 shows the jitter in the read signal when the group delay compensation of the circuit shown in FIG. 29 is changed. It is to be noted that this read signal is preferably obtained from a pit sequence formed at the inside circumference of the recording medium. However, it can alternatively be a signal recorded to a specific area of the recording medium by the disc recorder in which Tu and Td are set to prevent edge shifting.

Curve 3001 results from a reproduction system with a flat group delay characteristic; curve 3002 when the group delay characteristic is not flat. As noted above, edge shifting occurs when the group delay characteristic of the entire reproduction system is not flat. This degrades the read performance, and leads to a higher error rate and jitter. If the group delay characteristic is flat, the error rate and jitter are least as shown by curve 3001 when there is no group delay compensation applied by the compensation circuit, but jitter increases as group delay composition increases.

However, if the disc recorder has a specific group delay characteristic in its reproduction system jitter will be least when a certain group delay compensation is applied. Because there is the least edge shifting when compensation is applied to minimize jitter, it can also be concluded that the group delay characteristic is substantially flat. It is therefore possible to minimize edge shifting when a disc recorded on one machine is reproduced on another, and thus assure the greatest read compatibility, by controlling the group delay compensation so as to minimize jitter as shown in FIG. 29 while detecting jitter in a feedback loop, and then determine Tu and Td. It will also be obvious to one with ordinary skill in the related art that the invention shall not be limited to detecting jitter in this feedback loop, and the error rate or other characteristic that varies with the group delay characteristic and edge shifting can be alternatively used.

It should also be noted that if the specific group delay characteristic of the disc recorder does not change over time, the same effect can be achieved by compensating for the group delay characteristic in the signal process. Furthermore, if the group delay characteristic is not device-dependent and has a specific characteristic, the same effect can be achieved by compensating for the group delay characteristic using a typical compensation value.

As described above, a recording method for information according to line present invention can compensate at the time data is recorded for the effects of thermal accumulation and thermal interference during recording, and thereby record data with little jitter, by determining before data recording the position of the leading edge of each mark based on the length of the mark to be recorded and the length of the preceding space, and determining the position of the trailing edge of each mark based on the length of the mark to be recorded and the length of the following space.

It is yet further possible to optimize recording by determining the optimum laser power settings to be used for test recording before the test recording operation whereby the above-noted optimum leading and trailing mark edge positions are determined.

It is yet further possible to further optimize recording by determining the optimum laser power settings to be used for data recording after determining the optimum leading and trailing mark edge positions as described above.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A data recording medium having a plurality of concentric or spiral tracks for recording information represented as marks and spaces between the marks, the marks being formed by emitting to a track recording an optical beam modulated by a plurality of drive pulses where the drive pulse count is adjusted according to a length of a mark part in the original signal to be recorded to the track, said data recording medium comprising:

a control data zone for storing control data formed by pits, said control data comprising:
at least one of a first pulse movement for modifying a first pulse of said drive pulses, and a last pulse movement for modifying a last pulse of said drive pulses;
a temporary power information including at least one of the following: a peak power setting, bias power setting, and asymmetry, said temporary power information indicative of light beam power used for determining at least said first pulse movement TF or last pulse movement TL; and
an operational power information including at least one of the following: a peak power setting, bias power setting, and margin constant, said operational power information indicative of light beam power used for recording actual data to the data area.

2. A data recording medium as claimed in claim 1, wherein said first pulse movement and last pulse movement indicate either a pulse shift amount for shifting said first and last pulses, respectively, or a pulse width amount for changing the pulse width of sail first and last pulses respectively; and wherein said control data in said control data zone further comprises a code indicating a method for using said first pulse movement and last pulse movement either as a pulse shift amount or as a pulse width amount.

3. A data recording medium as claimed in claim 1, wherein said control data in said control data zone further comprises margin constant as one of said temporary power information.

4. A data recording medium as claimed in claim 1, wherein said control data in said control data zone further comprises asymmetry for determining said pulse position.

5. A recording and reproducing apparatus for recording and reproducing a data recording medium, said data recording medium having a plurality of concentric or spiral tracks for recording information represented as marks and spaces between the marks, the marks being formed by emitting to a track recording surface an optical beam modulated by a plurality of drive pulses where the drive pulse count is adjusted according to a length of a mark part in the original signal to be recorded to the track, said data recording medium comprising;

a control data zone for storing control data formed by pits, said control data comprising:

at least one of a first pulse movement for modifying a first pulse of said drive pulses, and a last pulse movement for modifying a last pulse of said drive pulses;

a temporary power information including at least one of the following a peak power setting, bias power setting and asymmetry, said temporary power information indicative of light beam power used for determining at least said first pulse movement or last pulse movement; and an operational power information including at least one of the following a peak power setting, bias power setting, and margin constant, said operational power information indicative of light beam power used for recording actual data to the data area;

said recording and reproducing apparatus comprising:

a first reading system that reads said temporary power information, including at least one of peak power, bias power, and asymmetry data;

a first determining system that determines at least first pulse movement or last pulse movement, and determining a drive pulse position, based on the read temporary power information;

a second reading system that reads operational power information including at least one of peak power, bias power, and margin constant data; and a second determining system that determines drive pulse emission power based on the read operational power information.

6. A recording and reproducing apparatus as claimed in claim 5, wherein said control data in said control data zone further comprises asymmetry for determining said pulse position, and wherein said first determining system determines the drive pulse position based on said asymmetry used for determining said pulse position.

7. A recording and reproducing apparatus as claimed in claim 5, wherein said second determining system for determining drive pulse emission power has a random signal generator for generating a random signal.

8. A recording and reproducing apparatus as claimed in claim 5, wherein said second determining system for determining drive pulse emission power has a simple pattern signal generator for generating a simple pattern signal that is a signal having a single period.

9. A recording and reproducing method for recording and reproducing a data recording medium, said data recording medium having a plurality of concentric or spiral tracks for recording information represented as marks and spaces between the marks, the marks being formed by emitting to a track recording surface an optical beam modulated by a plurality of drive pulses where the drive pulse count is adjusted according to a length of a mark part in the original signal to be recorded to the track, said data recording medium comprising:

a control data zone for storing control data formed by pits, said control data comprising:

at least one of a first pulse movement for modifying a first pulse of said drive pulses, and a last pulse movement for modifying a last pulse of said drive pulses;

a temporary power information including at least one of the following a peak power setting, bias power setting, and asymmetry, said temporary power information indicative of light beam power used for determining at least said fast pulse movement or last pulse movement; and an operational power information including at least one of the following: a peak power setting, bias power setting, and margin constant, said operational power information indicative of light beam power used for recording actual data to the data area;

said recording and reproducing method comprising:

a first reading step that reads said temporary power information, including at least one of peak power, bias power, and asymmetry data;

a first determining step that determines at least first pulse movement of last pulse movement, and determining a drive pulse position, based on the read temporary power information;

a second reading step that reads operational power information including at least one of peak power, bias power, and margin constant data; and a second determining step that determines drive pulse emission power based on the read operational power information.

10. A recording and reproducing method as claimed in claim 9, wherein said control data in said control data zone further comprises asymmetry for determining said pulse position, and wherein said first determining step determines the drive pulse position based on said asymmetry used for determining said pulse position.

11. A recording and reproducing method as claimed in claim 9, wherein said second determining step for determining drive pulse emission power has a generating step for generating a random signal.

12. A recording and reproducing method as claimed in claim 9, wherein said second determining step for determining drive pulse emission power has generating step for generating a simple pattern signal that is a signal having a single period.

* * * * *

UNITED STATES PATENT AND TRADEMARK OFFICE
CERTIFICATE OF CORRECTION

PATENT NO. : 6,359,846 B1
DATED : March 19, 2002
INVENTOR(S) : Mamoru Shoji et al.

It is certified that error appears in the above-identified patent and that said Letters Patent is hereby corrected as shown below:

Title page, Item [54] and Column 1, lines 1-2,
Title, please replace "RECORDING MEDIUM RECORDING APPARATUS AND RECORDING METHOD" with -- RECORDING MEDIUM, RECORDING APPARATUS AND RECORDING METHOD --.

Column 1,
Line 52, please replace "inn part of" with -- in part of --.

Column 2,
Line 4, please replace "(kokal)" with -- (kokai) --.

Column 3,
Line 13, please replace "data." with -- date. --.

Column 6,
Line 27, please replace "recording medium." with -- recording medium, --.
Line 42, please replace "of concentric" with -- of concentric or --.
Line 48, please replace "to the track;" with -- to the track, --.

Column 8,
Line 59, please replace "area if further" with -- area is further --.

Column 13,
Line 26, please replace "position informatiohn" with -- position information --.

Column 14,
Line 48, please replace "sequency" with -- sequence --.
Line 53, please replace "marks parts" with -- mark parts --.

Column 15,
Line 4, please replace "an 403" with -- and 403 --.

Column 16,
Line 17, please replace "301, the" with -- 301, then --.
Line 66, please replace "components correspond" with -- components corresponding --.

UNITED STATES PATENT AND TRADEMARK OFFICE
CERTIFICATE OF CORRECTION

PATENT NO. : 6,359,846 B1
DATED : March 19, 2002
INVENTOR(S) : Mamoru Shoji et al.

It is certified that error appears in the above-identified patent and that said Letters Patent is hereby corrected as shown below:

Column 17,
Line 9, please replace "and the processing" with -- and then processing --.
Line 47, please replace "last pule position" with -- last pulse position --.

Column 18,
Line 19, please replace "FIG 7: types" with -- FIG 7; types --.
Line 28, please replace "therefore affected by" with -- therefore least affected by --.
Line 44, please replace "403 and the last" with -- 403 and last --.

Column 19,
Line 43, please replace "difference discs due" with -- different discs due --.

Column 20,
Line 13, please replace "jitter, in this" with -- jitter; in this --.

Column 22,
Line 14, please replace "5S4M and 5S5 M first pulse" with -- 5S4Mand 4S4M first pulse --.

Column 28,
Line 19, please replace "data areas" with -- data area --.

Column 29,
Line 32, please replace "determined, even" with -- determined; even --.
Line 37, please replace "signal is recorded" with -- signal, is recorded --.

Column 31,
Line 33, please replace "(such a 1.2)" with -- (such as 1.2) --.

Column 33,
Line 9, please replace "the sing of" with -- the sign of --.

Column 34,
Line 3, please replace "area 1064" with -- area 1604 --.

Column 36,
Line 8, please replace "such a the specific" with -- such the specific --.
Line 23, please replace "production data" with -- production date --.
Line 29, please replace "leading ad" with -- leading and --.

UNITED STATES PATENT AND TRADEMARK OFFICE
CERTIFICATE OF CORRECTION

PATENT NO. : 6,359,846 B1
DATED : March 19, 2002
INVENTOR(S) : Mamoru Shoji et al.

It is certified that error appears in the above-identified patent and that said Letters Patent is hereby corrected as shown below:

Column 38,
Line 31, please replace "setting of the" with -- setting for the --.

Column 39,
Line 4, please replace "data ad" with -- data and --.
Line 18, please replace "the margin" with -- this margin --.
Line 26, please replace "outputs a random a random" with -- outputs a random --.
Line 62, please replace "quality. The" with -- quality, the --.

Column 41,
Line 47, please replace "When the optical" with -- When this optical --.

Column 42,
Line 29, please replace "(such as peak power, bias power, margin constant" with -- (such as peak power, bias power, margin constant) --.
Line 59, please replace "production data" with -- production date --.
Line 60, please replace "disc formal," with -- disc format, --.

Column 43,
Line 67, please replace "frequency characteristics" with -- frequency characteristic --.

Column 44,
Line 27, please replace "be for example" with -- be, for example --.
Line 31, please replace "7T to 14%" with -- 7T to 14T --.
Line 40, please replace "26 and s8" with -- s6 and s8 --.
Line 53, please replace "circuit, capacitor" with -- circuit; capacitor --.
Line 66, please replace "weighting coefficient" with -- weighting coefficients --.

Column 45,
Line 5, please replace "amplifiers 2908" with -- amplifiers 2906 --.
Line 45, please replace "reproduction system jitter" with -- reproduction system, jitter --.

Column 46,
Line 2, please replace "according to line present" with -- according to the present --.
Line 32, please replace "recording an optical" with -- recording surface an optical --.
Line 58, please replace "width of sail first" with -- width of said first --.

UNITED STATES PATENT AND TRADEMARK OFFICE
CERTIFICATE OF CORRECTION

PATENT NO. : 6,359,846 B1
DATED : March 19, 2002
INVENTOR(S) : Mamoru Shoji et al.

It is certified that error appears in the above-identified patent and that said Letters Patent is hereby corrected as shown below:

<u>Column 47,</u>
Lines 22 and 28, please replace "following a peak power" with -- following: a peak power --.

<u>Column 48,</u>
Line 19, please replace "following a peak power" with -- following: a peak power --.
Line 34, please replace "movement of last pulse movement" with -- movement or last pulse movement --

Signed and Sealed this

Seventeenth Day of August, 2004

JON W. DUDAS
*Acting Director of the United States Patent and Trademark Office*